US00RE37444B1

(19) United States
(12) Reissued Patent
Kanazawa

(10) Patent Number: US RE37,444 E
(45) Date of Reissued Patent: Nov. 13, 2001

(54) METHOD AND APPARATUS FOR DRIVING DISPLAY PANEL

(75) Inventor: Yoshikazu Kanazawa, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

(21) Appl. No.: 08/815,974

(22) Filed: Mar. 13, 1997

Related U.S. Patent Documents

Reissue of:
(64) Patent No.: 5,420,602
Issued: May 30, 1995
Appl. No.: 07/995,293
Filed: Dec. 21, 1992

(30) Foreign Application Priority Data

Dec. 20, 1991 (JP) ..... 3-338342
Sep. 21, 1992 (JP) ..... 4-251228
Oct. 20, 1992 (JP) ..... 4-281459

(51) Int. Cl.[7] ..... G09G 3/28
(52) U.S. Cl. ..... 345/67; 345/60
(58) Field of Search ..... 345/60, 61, 62, 345/63, 64, 66, 67, 68, 69, 70, 84; 315/169.1, 169.2, 169.4

(56) References Cited

U.S. PATENT DOCUMENTS 4,045,790 * 8/1977 Miller ..... 345/67
4,072,937 2/1978 Chu .
4,180,762 * 12/1979 Weber ..... 345/60
4,189,729 2/1980 Baker et al. .
4,247,802 * 1/1981 Kurokawa ..... 345/62
4,315,259 * 2/1982 McKee et al. ..... 345/67
4,554,537 * 11/1985 Dick ..... 345/67
4,638,218 1/1987 Shinoda et al. .
4,684,849 * 8/1987 Otsuka et al. ..... 345/169.4
4,737,687 * 4/1988 Shinoda et al. ..... 345/169.4
4,900,987 * 2/1990 Otsuka et al. ..... 345/169.4
5,210,468 * 5/1993 Yoshioka ..... 345/67
5,446,344 8/1995 Kanazawa .

FOREIGN PATENT DOCUMENTS 61-67094 4/1986 (JP) .
62-55696 3/1987 (JP) .
64-8348 2/1989 (JP) .
64-8349 2/1989 (JP) .
3-219286 9/1991 (JP) .
4-195188 * 7/1992 (JP) .
7-160218 6/1995 (JP) .
8-63123 3/1996 (JP) .

* cited by examiner

*Primary Examiner*—Xiao Wu
(74) *Attorney, Agent, or Firm*—Staas & Halsey LLP

(57) ABSTRACT

An apparatus and method for driving a display panel, e.g., AC PDP, having a first substrate, at least one display line including first electrodes and second electrodes disposed in parallel with each other on the first substrate, a second substrate facing the first substrate, and third electrodes disposed on the second substrate and extending orthogonally to the first and second electrodes, in which write operation of the display data by a light emission is executed by carrying out a selective write discharge utilizing a memory function, are adapted to execute a write discharge for all cells and to execute an erase discharge for all cells before the selective write discharge, to thereby accumulate wall charges over the third electrodes in advance.

55 Claims, 61 Drawing Sheets

Fig. 22

ONE DRIVE CYCLE

ONE DRIVE CYCLE

TIME →

| | | | | | | | | | | | |
|---|---|---|---|---|---|---|---|---|---|---|---|
| $7_1$ → | W | S | S | S | S | S | S | S | S | S | S |
| $7_2$ → | s | W | S | S | S | S | S | S | S | S | S |
| $7_3$ → | s | s | W | S | S | S | S | S | S | S | S |
| $7_4$ → | s | s | s | W | S | S | S | S | S | S | S |
| $7_5$ → | s | s | s | s | W | S | S | S | S | S | S |
| $7_6$ → | w | s | s | s | s | W | S | S | S | S | S |
| $7_7$ → | S | w | s | s | s | s | W | S | S | S | S |
| $7_8$ → | S | S | w | s | s | s | s | W | S | S | S |
| $7_9$ → | S | S | S | w | s | s | s | s | W | S | S |
| $7_{10}$ → | S | S | S | S | w | s | s | s | s | W | S |
| $7_{11}$ → | S | S | S | S | S | w | s | s | s | s | W |

$V_y = V_a$

Fig. 54 PRIOR ART

DISPLAY LINE ⇓ ONE DRIVE CYCLE ⟷ → TIME

| | | | | | | | | | | | | | | |
|---|---|---|---|---|---|---|---|---|---|---|---|---|---|---|
| 1 | W | S | S | S | S | S | S | S | S | S | S | S | S | S |
| 2 | s | W | S | S | S | S | S | S | S | S | S | S | S | S |
| 3 | s | s | W | S | S | S | S | S | S | S | S | S | S | S |
| 4 | s | s | s | W | S | S | S | S | S | S | S | S | S | S |
| 5 | s | s | s | s | W | S | S | S | S | S | S | S | S | S |
| 6 | s | s | s | s | s | W | S | S | S | S | S | S | S | S |
| 7 | s | s | s | s | s | s | W | S | S | S | S | S | S | S |
| 8 | s | s | s | s | s | s | s | W | S | S | S | S | S | S |
| 9 | s | s | s | s | s | s | s | s | W | S | S | S | S | S |
| 10 | s | s | s | s | s | s | s | s | s | W | S | S | S | S |
| 11 | s | s | s | s | s | s | s | s | s | s | W | S | S | S |
| 12 | s | s | s | s | s | s | s | s | s | s | s | W | S | S |
| 13 | s | s | s | s | s | s | s | s | s | s | s | s | W | S |
| 14 | s | s | s | s | s | s | s | s | s | s | s | s | s | W |
| ⋮ | | | | | | | | | | | | | | |

··· DISCHARGE PERIOD (ON PERIOD)

· · · TOTAL WRITE
· · · ADDRESSING
} ADDRESSING PERIOD

· · · SUSTAIN DISCHARGE PERIOD

SF1 ~ SF4 · · · SUBFRAME $N_{SF1} \sim N_{SF4}$ · · · NUMBER OF SUSTAIN DISCHARGE CYCLES $N_{SF1}:N_{SF2}:N_{SF3}:N_{SF4} = 1:2:4:8$

METHOD AND APPARATUS FOR DRIVING DISPLAY PANEL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a technique of driving a display panel composed of display elements having a memory function, and particularly, to a method of and an apparatus for driving an alternating current (AC) plasma display panel (PDP), which provides multiple intensity levels and adjusts the luminance of a full color image plane.

2. Description of the Related Art

In the AC PDP, voltage waveforms are alternately applied to sustain two discharge electrodes, to maintain discharge and to display an image by emission. Each shot of discharge lasts several microseconds after the application of a pulse. Ions, i.e., positive charge produced by the discharge are accumulated over an insulation layer on an electrode of negative voltage. Electrons, i.e., negative charges produced by the discharge accumulate over an insulation layer on an electrode of positive voltage.

At first, a pulse (a write pulse) having a high voltage (a write voltage) is applied to cause discharge and produce wall charges. Thereafter, a pulse (a sustain discharge pulse) having a low voltage (a sustain discharge voltage) whose polarity is opposite to that of the high voltage and which is lower than the high voltage is applied to enhance the accumulated wall charges. As a result, the potential of the wall charges with respect to a discharge space exceeds a discharge threshold voltage to start discharging. In this way, once the wall charges are accumulated in a cell by the write discharge, the cell can continuously discharge if sustain discharge pulses, having opposite polarities, are alternately applied to the cell. This phenomenon is called a memory effect or a memory drive. The AC PDP enables various image data to be displayed by utilizing such a memory effect.

These kinds of AC PDPs are classified into a two-electrode type employing two electrodes for carrying out selectively discharge (addressing discharge) and sustain discharge, and a three-electrode type additionally employing a third electrode to carry out addressing discharge. Among such AC PDPs, in the AC PDP displaying color images (full color images) with multiple intensity levels, i.e., a color PDP, a phosphor located within each cell is excited by ultraviolet rays generated due to a discharge between different kinds of electrodes. However, this phosphor is relatively fragile against a hitting of ions, i.e., positive charges are also generated due to the discharge. The former two-electrode type PDP has a construction such that the ions collide directly with the phosphor, and therefore the life of the phosphor is likely to become shortened. On the other hand, in the latter three-electrode PDP, a surface-discharge with high voltage is carried out between a first-electrode and a second electrode, each located in the same plane. In such a construction, the phosphor at the side of the third electrode is avoided from the direct and strong bombardment of ions, and consequently a life of the phosphors is likely to become longer. Namely, the three-electrode PDP is advantageous in displaying color (full color) image with multiple intensity levels. Accordingly, as the color PDP, the three-electrode type is currently used. The amount of emission (luminance) of the three-electrode PDP is determined by the number of pulses applied to the PDP.

FIG. 1 is a plan view schematically showing a conventional three-electrode and surface-discharge PDP.

In FIG. 1, numeral 1 is a panel, 2 is an X electrode, $\mathbf{3}_1$, $\mathbf{3}_2$, - - - $\mathbf{3}_K$, - - - $\mathbf{3}_{1000}$ are Y electrodes, and $\mathbf{4}_1$, $\mathbf{4}_2$, - - - $\mathbf{4}_K$, - - - $\mathbf{4}_M$ are addressing electrodes. A cell 5 is formed at each intersection where a pair of the X and Y electrodes crosses one of the addressing electrodes, to provide M×1000 cells 5 in total. Numeral 6 is a wall for partitioning the cells 5, and $\mathbf{7}_1$ to $\mathbf{7}_{1000}$ are display lines.

FIG. 2 is a sectional view schematically showing the basic structure of the cell 5. Numeral 8 is a front glass substrate, 9 is a rear glass substrate, 10 is a dielectric layer for covering the X electrode 2 and Y electrode $\mathbf{3}_K$, 11 is a protective film of an MgO film or the like, 12 is a phosphor, and 13 is a discharge space.

FIG. 3 shows the conventional PDP of FIG. 1 and its peripheral circuits. Numeral 14 is an X driver circuit for supplying a write pulse and a sustain discharge pulse to the X electrodes 2, $\mathbf{15}_1$ to $\mathbf{15}_4$ are Y driver ICs for supplying addressing pulses to the Y electrodes $\mathbf{3}_1$ to $\mathbf{3}_{1000}$, 16 is a Y driver circuit for supplying pulses other than the addressing pulses to the Y electrodes $\mathbf{3}_1$ to $\mathbf{3}_{1000}$, $\mathbf{17}_1$ to $\mathbf{17}_5$ are addressing driver ICs for supplying addressing pulses to the addressing electrodes $\mathbf{4}_1$ to $\mathbf{4}_M$, and 18 is a control circuit for controlling the X driver circuit 14, Y driver ICs $\mathbf{15}_1$ to $\mathbf{15}_4$, Y driver circuit 16, and addressing driver ICs $\mathbf{17}_1$ to $\mathbf{17}_5$.

FIG. 4 is a waveform diagram showing a first conventional method of driving the PDP of FIG. 1. More precisely, this figure shows a drive cycle of a conventional "sequential line driving and self-erase addressing" method.

This method selects one of the display lines to write display data thereto during the drive cycle. The Y electrode of the selected line is set to a ground level (GND: 0 V), and the Y electrodes of the other display lines (unselected lines) are set to a potential level of Vs. A write pulse 19 having a voltage of Vw is applied to the X electrode 2, to discharge all cells of the selected line. At this time, a voltage difference between the X and Y electrodes of the selected line is Vw, and a voltage difference between the X and Y electrodes of the unselected lines is Vw−Vs. By setting Vw>Vf>Vw−Vs (where Vf is a discharge start voltage), all cells of the selected line will discharge.

As the discharge progresses, the protective film, 11, e.g., an MgO film over the X electrode 2 of the selected line accumulates negative wall charges, and the MgO film over the Y electrode of the selected line accumulates positive wall charges. Since the polarities of these wall charges are to reduce an electric field in the discharge space, the discharge quickly converges and ends within about a microsecond.

Sustain discharge pulses 20 and 21 are alternately applied to the X and Y electrodes of the selected line, so that the accumulated wall charges are added to the voltages applied to the electrodes, to repeat sustain discharge in cells except those that are not turned ON (not in light emission).

For the cells that are not turned ON, the first sustain discharge pulse 20a is applied to the X electrode 2, to accumulate positive wall charges in the MgO film over the X electrode 2 of the selected line, and negative wall charges in the MgO film over the Y electrode of the selected line. In synchronism with the first sustain discharge pulse 21a, applied to the Y electrode of the selected line, an addressing pulse (an erase pulse) 22 having a positive voltage of Va is selectively applied to the addressing electrodes of the cells not to be turned ON.

At this time, sustain discharge occurs in every cell of the selected line, and in particular, the cells that have received the positive addressing pulse 22 through the addressing electrodes cause discharge between the addressing electrodes and the Y electrode, to excessively accumulate positive wall charges in the MgO film over the Y electrode.

If the voltage Va is set such that the voltage of the wall charges exceeds the discharge start voltage, the voltage of the wall charges induces discharge when the external voltage are removed, i.e., when the potential of the X and Y electrodes is returned to Vs and that of the addressing electrodes to GND. This causes self-erase discharge to dissipate the wall charges in the cells not to be turned ON. Accordingly, from this moment, the sustain discharge pulses 20 and 21 will never cause sustain discharge in the cells not to be turned ON.

For the cells to be turned ON, the erase pulse (addressing pulse) 22 is not applied to the corresponding addressing electrodes, to cause no self-erase discharge in these cells. Accordingly, the sustain discharge pulses 20 and 21 repeatedly cause sustain discharge in the cells turned ON. Numeral 23 is a sustain discharge pulse applied to the Y electrodes of the unselected lines.

In this way, display data are written to a selected line in each drive cycle. In the example mentioned above, the write operation is carried out on the display lines by line by line. FIG. 5 is a time chart showing the write operation. In the figure, "W" is a write cycle, "S" is a sustain discharge cycle, and "s" is a sustain discharge cycle of a preceding frame (field).

FIG. 6 is a waveform diagram showing a second conventional method of driving the PDP of FIG. 1. More precisely, the figure shows a frame of a conventional "separately addressing and sustain-discharging type self-erase addressing" method.

This method divides the frame into a total write period, an addressing period, and a sustain discharge period. During the total write period, the potential of the Y electrodes $\mathbf{3}_1$ to $\mathbf{3}_{1000}$ is set to GND, and a write pulse 24 having a voltage of Vw is applied to the X electrode 2, to cause discharge in all cells of all of the display lines. The Y electrodes $\mathbf{3}_1$ to $\mathbf{3}_{1000}$ are then returned to Vs, and a sustain discharge pulse 25 is applied to the X electrode 2, to cause sustain discharge in every cell.

During the addressing period, display data are sequentially written to the display lines from the display line $\mathbf{7}_1$. At first, an addressing pulse $\mathbf{26}_1$ having a level of GND is applied to the Y electrode $\mathbf{3}_1$, and an addressing pulse 27 having a voltage of Va is applied to selected ones of the addressing electrodes $\mathbf{4}_1$ to $\mathbf{4}_M$ that correspond to cells not to be turned ON of the display line $\mathbf{7}_1$, to cause self-erase discharge in these cells. This completes the write operation of the display line $\mathbf{7}_1$.

The same operation is carried out for the display lines $\mathbf{7}_2$ to $\mathbf{7}_{1000}$ sequentially, to write new data to all of the display lines $\mathbf{7}_1$ to $\mathbf{7}_{1000}$. Numerals $\mathbf{26}_2$ to $\mathbf{26}_{1000}$ are addressing pulses sequentially and separately applied to the Y electrodes $\mathbf{3}_2$ to $\mathbf{3}_{1000}$.

During the sustain discharge period, sustain discharge pulses 28 and 29 are alternately applied to the Y electrodes $\mathbf{3}_1$ to $\mathbf{3}_{1000}$ and X electrode 2, to carry out sustain discharge to display an image for the frame. According to the separately addressing and sustain-discharging type self-erase addressing method, the length of the sustain discharge period determines luminance.

The separately addressing and sustain-discharging type self-erase addressing method, therefore, is used for displaying an image with multiple intensity levels. For example, this method is disclosed in Japanese Unexamined Patent Publication (KOKAI) No. 4-195188. FIG. 7 shows a method of realizing 16 intensity levels as an example of the multiple intensity level displaying technique. In this example, a frame is divided into four subframes (subfields) SF1, SF2, SF3, and SF4.

In the subframes SF1, SF2, SF3, and SF4, total write periods Tw1, Tw2, Tw3, and Tw4 are equal to one another, and addressing periods Ta1, Ta2, Ta3, and Ta4 are also equal to one another. Sustain discharge periods Td1, Td2, Td3, and Td4 are at a ratio of 1:2:4:8. The 16 intensity levels are achieved by selectively combining the subframes to turn cells ON.

FIG. 8 is a waveform diagram showing a third conventional method of driving the PDP of FIG. 1. More precisely, the figure shows a drive cycle of a conventional "sequential line driving and selective-write addressing" method. In this method, generally, a negative voltage ($-V_s$) is applied to X and Y electrodes. Therefore, in FIG. 8, each potential of X and Y electrode is set to GND level or ($-V_s$).

This method applies a narrow erase pulse 30 to the Y electrode of a selected line, to turn OFF cells that are ON. An addressing pulse (a write pulse) 31 of a voltage ($-V_s$) is applied to the Y electrode of the selected line, while the potential of the Y electrodes of the other unselected lines is kept at a ground (GND) level. An addressing pulse (a write pulse) 32 having a voltage of Va is applied to the addressing electrodes of cells to be turned ON, to discharge these cells.

Sustain discharge pulses 33 and 34 are alternately applied to the X electrode and the Y electrode of the selected line, to repeatedly cause sustain discharge to write display data to the selected display line. Numeral 35 is a sustain discharge pulse applied to the Y electrodes of the unselected lines.

However, the following problems have existed in the above-mentioned driving methods of PDP (prior arts).

First Problem

According to the driving method of FIG. 4 (the sequential line driving and self-erase addressing method) and the driving method of FIG. 6 (the separately addressing and sustain-discharging type self-erase addressing method), display data are written by self-erase discharge. The self-erase discharge occurs in the vicinity of the X and Y electrodes of each target cell at first, and gradually expands outwardly. If the cell in question has a high discharge start voltage, the cell does not accumulate sufficient wall charges, to insufficiently cause self-erase discharge. This causes an erase error, which leads to a write error of display data.

Second Problem

According to the driving method of FIG. 8 (the sequential line driving and selective-write addressing method), wall charges remaining in a cell in which neutralizing erase discharge has been just completed with the narrow erase pulse 30 may differ from wall charges remaining in a cell which has been OFF during a preceding frame.

Neutralizing wall charges produced in a cell by the application of the narrow erase pulse 30 do not always completely remove the wall charges. Namely, the erasing will be successful if a sum of the potential of the remaining wall charges and the potential of a sustain discharge pulse does not exceed the discharge start voltage. Namely, the erasing may be complete with some wall charges being left. This is the reason why wall charges remaining in a cell in which neutralizing erase discharge has been just completed by applying the narrow erase pulse 30 sometimes differ from wall charges remaining in a cell which has been OFF in a preceding frame.

If a cell adjacent to a given cell whose wall charges have been erased continues to discharge, spatial charges produced by the discharge may move toward the given cell and couple with the remaining wall charges of the given cell, to nearly zero the wall charges of the given cell.

In this case, unlike a cell that has just received the narrow erase pulse 30 and holds residual wall charges, the given cell must receive a higher voltage ($V_w>V_f$, $V_x=V_a+V_s$) to start discharging. On the other hand, the cell that has just received the narrow erase pulse 30 and holds residual wall charges may start discharging at a lower voltage (Vw=Vf, Vw>Vf) than that of the given cell, if the voltage applied has a polarity that enhances the residual wall charges.

This phenomenon fluctuates write voltages in cells, so that some cells may be correctly written but others may not at the same voltage, to thereby cause a write error of display data.

Third Problem

Since parallel display panels such as PDP mostly employ digital control, it is preferable to adjust luminance by digital control.

However, the above-mentioned luminance adjusting method causes problems when controlling intensity levels with use of separate addressing and sustain emission periods mentioned above. When the frequency of sustain discharge operations is about 30 KHz at the maximum, the number of sustain discharge cycles in subframes achieving 256 intensity levels are 2, 4, 8, 16, 32, 64, 128, and 256, respectively, became each cycle always involves two discharge operations. Namely, the number of the sustain discharge cycles is 510 in total, and if the frequency of frames is 60 Hz, the maximum frequency of sustain discharge operations will be 30.6 KHz. With the respective subframes involving these numbers of sustain discharge cycles, the minimum (LSB) subframe involves only two sustain discharge cycles, so that luminance is adjustable only in two levels between a maximum level and a half level. This is quite inconvenient.

To provide a display comparable to a CRT, the display must have a function of linearly adjusting luminance in multiple levels. This is a difficult function to achieve Further, full color display data are usually provided as analog signals, so that a display unit such as a PDP employing digital control converts the analog signals into digital signals. In this case, the analog signals may be amplified by 0% to 100%, to adjust luminance. This sort of processing of analog signals is not preferable because it may deteriorate the quality of the original signals.

Furthermore, according to such luminance adjusting method, the number of sustain discharge cycles is unchanged even when the luminance is adjusted. Therefore, a number of unnecessary sustain discharge pulses, each of which is not concerned with the discharge in actual, are periodically applied to electrodes. Thus, it will be difficult for the useless power consumption generated by these sustain discharge pulses to be reduced. Furthermore, even if the number of sustain discharge pulses can be successfully decreased, the number of total write operations for all cells remains unchanged. Accordingly, the relative ratio of luminance in total write period is likely to be increased as a whole. Consequently, in the case where the display is executed under lower luminance as a whole, the contrast is likely to become lower.

SUMMARY OF THE INVENTION

Accordingly, a first object of the present invention is to provide a method and an apparatus for driving a display panel such as a PDP, in which a write error of display data occurred due to an insufficiency of a self-erase discharge, etc., can be prevented and in which an image of excellent quality can be displayed.

A second object of the present invention is to provide an apparatus and method for driving a display panel utilizing a novel AC PDP of three-electrode and surface-discharge type, in which a write error occurred due to an insufficiency of a self-erase discharge, etc., can be prevented and in which an image of excellent quality can be displayed.

A third object of the present invention is to provide an apparatus and method for driving a display panel, in which the electric power consumption can be reduced and in which the lowering of contrast in the image plane can be prevented, in the case where the luminance control with multiple levels is carried out by driving the AC PDP of three-electrode and surface-discharge type advantageous for a full color display with multiple intensity levels.

To attain these objects, the present invention is directed to an apparatus and method for driving the display panel having a first substrate, at least one display line involving first electrodes (e.g., X electrodes) and second electrodes (e.g., Y electrodes) disposed in parallel with each other on the first substrate, a second substrate facing the first substrate, and third electrodes (e.g., addressing electrodes) disposed on the second substrate and extending orthogonally to the first and second electrodes, in which the display by means of a light emission and write operation of the display data are executed by carrying out a write discharge utilizing a memory function for cells of at least one display line and by carrying out a sustain discharge for sustaining the write discharge.

Preferably, the display panel according to the present invention is constituted by AC PDP in which the memory function of each cell can be realized by wall charges accumulated by means of the write discharge.

The method for driving the display panel according to the present invention includes a step of executing a write discharge for all cells of at least one display line selected by either one of the first and second electrodes and by the third electrode with use of the first and second electrodes; and a step of executing an erase discharge for all cells of said selected display line with use of the first and second electrodes, before the write discharge is carried out.

Further, preferably, the method for driving the display panel sequentially selects the display lines one by one, carries out write discharge in all cells of the selected display line with use of the X and Y electrodes, carries out or does not carry out sustain discharge, applies an erase pulse to the X and Y electrode of the selected display line, to carry out erase discharge in all cells of the selected display line, and carries out write discharge in cells to be turned ON of the selected display line with use of the Y and addressing electrodes, to thereby write display data to the selected display line.

Further, preferably, the method for driving the display panel sequentially selects a plurality of the display lines, carries out write discharge in all cells of the selected display lines with use of the X and Y electrodes, carries out or does not carry out sustain discharge, applies an erase pulse to the X and Y electrodes of the selected display lines, to carry out erase discharge in all cells of the selected display lines, and carries out write discharge in cells to be turned ON of the selected display lines with use of the Y and addressing electrodes, to thereby write display data to the selected display lines.

Further, preferably, the method for driving the display panel carries out write discharge in all cells of all of the display lines with use of the X and Y electrodes, carries out or does not carry out sustain discharge, applies an erase pulse to the X or Y electrode of every display line, to carry out erase discharge in all cells of all of the display lines, sequentially selects the display lines one by one, carries out write discharge in cells to be turned ON of the selected display line with use of the Y and addressing electrodes, to thereby write display data to the selected display line, and after display data are written to all of the display lines, carries out sustain discharge in the cells turned ON of all of the display lines with use of the X and Y electrodes.

Further, preferably, the method for driving the display panel carries out write discharge in all cells of all of the display lines with use of the X and Y electrodes, carries out or does not carry out sustain discharge, applies an erase pulse to the X and Y electrode of every display line, to carry out erase discharge in all cells of all of the display lines, sequentially selects the display lines one by one, carries out write discharge in cells to be turned ON of the selected display line with use of the Y and addressing electrodes, to thereby write display data to the selected display line, immediately applies a sustain discharge pulse to the x electrode, to carry out sustain discharge for stabilizing wall charges, and after display data are written to all of the display lines, carries out sustain discharge in the cells turned ON of all of the display lines with use of the X and Y electrodes.

Further, preferably, the method for driving the display panel provides a plasma display panel comprising a first substrate, display lines each involving X and Y electrodes disposed in parallel with each other on the first substrate, a second substrate facing the first substrate, and addressing electrodes disposed on the second substrate and extending orthogonally to the X and Y electrodes. The display lines are grouped into a plurality of blocks. The X electrodes are connected together in each of the blocks. The Y electrodes disposed in the respective display lines are independent of one another.

Further, preferably, the method for driving the display panel carries out write discharge in all cells of all of the display lines with use of the X and Y electrodes, carries out or does not carry out sustain discharge, applies an erase pulse to the X or Y electrode of every display line, to carry out erase discharge in all cells of all of the display lines, sequentially selects the display lines one by one, carries out write discharge in cells to be turned ON of the selected display line with use of the Y and addressing electrodes, to thereby write display data to the selected display line, immediately applies a sustain discharge pulse to the X electrode of the block that contains the cells just turned ON, to carry out sustain discharge for stabilizing wall charges, and after display data are written to all of the display lines, carries out sustain discharge in the cells turned ON of all of the display lines with use of the X and Y electrodes.

Further, preferably, the method for driving the display panel provides a method of driving a plasma display panel having a plurality of second electrodes that are sequentially selected and driven line by line and first electrodes that are driven by a single driver circuit and are disposed between every two adjacent ones of the second electrodes. The method sets a voltage applied to the second electrode of unselected lines to be lower than the potential of a sustain discharge pulse, of equal to an addressing voltage.

Further, preferably, in the method for driving the display panel, erase discharge is carried out with use of the first and second electrodes, just before the write discharge for all cells is executed.

Further, preferably, in the method for driving the display panel, the sustain discharge is carried out by applying a narrow pulse such that the erase discharge is not executed, immediately after the write discharge for all cells is executed.

On the other hand, the apparatus for driving the display panel comprises driving means which supplies a plurality of driving voltage pulses for executing write operation of the display data for the first, second and third electrodes; and control means which controls a sequence of supplying these plurality of driving voltage pulses. Further, the control means is operative to apply a write pulse for executing a write discharge for all cells of at least one display line selected by either one of the first and second electrodes and by the third electrode with use of the first and second electrodes, and to apply an erase pulse for executing an erase discharge for all cells of said selected display line with use of the first and second electrodes.

Further, preferably, in the apparatus for driving the display panel, the control means is operative to sequentially select the display lines one by one, to apply a write pulse for carrying out write discharge in all cells of the selected display line with use of the first and second electrodes, to apply a sustain pulse selectively for carrying out sustain discharge, to apply an erase pulse to the second or first electrode of the selected display line, to apply an erase pulse for carrying out erase discharge in all cells of the selected display line, and to carry out write discharge in cells to be turned ON of the selected display line with use of the second and third electrodes, to thereby write display data to the selected display line, by the driving means.

Further, preferably, in the apparatus for driving the display panel, the control means is operative to sequentially select a plurality of the display lines, to apply a write pulse for carrying out write discharge in all cells of the selected display lines with use of the first and second electrodes, to apply a sustain pulse selectively for carrying out sustain discharge, to apply an erase pulse to the second or first electrodes of the selected display lines, to apply an erase pulse for to carrying out erase discharge in all cells of the selected display lines, and to apply a write pulse for carrying out write discharge in cells to be turned ON of the selected display lines with use of the second and third electrodes, to thereby write display data to the selected display lines, by means of the driving means.

Further, preferably, an insulation layer, which separate the third electrode from the discharge space formed between the third electrode and the first and second electrodes, is provided, so that the wall charges can be accumulated on the insulation layer.

Further, preferably, in the method for driving the display panel comprised of a set of display elements having a memory function, a frame that forms an image plane is made of a plurality of subframes, each of the subframes provides different luminance and includes an addressing period for rewriting display data and a sustain emission period for repeating an emission display operation according to the rewritten data, and the addressing and sustain emission periods are temporally separated from each other over the display elements, to provide the display elements with intensity levels and to enable the adjustment of luminance of the image plane. In this case, the method is adapted to increase or decrease the numbers of sustain emission operations of the respective subframes at the same ratio, thereby controlling the luminance of the image plane.

Further, preferably, in the method for driving the display panel, when the display elements with intensity levels are provided, the number of sustain emission operations of a given subframe is determined according to the number of sustain emission operations of another subframe whose weight of luminance is one rank heavier than that of the given subframe, namely, the number of sustain emission operations of a subframe whose weight of luminance is the heaviest among the subframes is determined at first, and according to this number, the number of sustain emission operations of another subframe whose weight of luminance is the second heaviest among the subframes is determined, and so on.

Further, preferably, in the method for driving the display panel, the number of sustain emission operations of a given subframe is set to be half of that of another subframe whose weight of luminance is one rank heavier than that of the given subframe.

Further, preferably, in the method for driving the display panel, fractions, if any, are rounded up or discarded when halving the number of sustain emission operations of a subframe whose weight of luminance is one rank heavier than that of a given subframe.

Further, preferably, in the apparatus for driving the display panel composed of a set of display elements having a memory function, a frame that forms an image plane is made of a plurality of subframes, each of the subframes provides different luminance and includes an addressing period for rewriting display data and a sustain emission period for repeating an emission display operation according to the rewritten data, and the addressing and sustain emission periods are temporally separated from each other over the display elements, to provide the display elements with intensity levels and enable the adjustment of luminance of the image plane. In this case, the apparatus comprises first means for determining the number of sustain emission operations of a subframe whose weight of luminance is the heaviest among the subframes; and second means for determining, according to the above determined number, the number of sustain emission operations of a subframe whose weight of luminance is the next heaviest among the subframes.

Further, preferably, the apparatus further comprises means for stopping operations carried out in a subframe, if the number of sustain emission operations to be carried out in this subframe is zero as a result of luminance adjustment carried out by the first and second means.

Further, preferably, the apparatus further comprises means for holding data according to which the number of sustain emission operations of the next subframe is determined; means for counting the number of sustain emission operations carried out in the present subframe; means for comparing the count with the held data; and means for providing an instruction to start the next subframe if the comparison means indicates agreement.

Further, preferably, wherein the above-mentioned first means has means for optionally setting the number of sustain emission operation of a subframe whose weight of luminance is the heaviest.

BRIEF DESCRIPTION OF THE DRAWINGS

The above objects and the present invention will be more apparent from the following description of the preferred embodiments with reference to the accompanying drawings, wherein:

FIG. 22 is a time chart showing an example of a method of selecting display lines according to a fourth embodiment of the present invention;

FIG. 54 is a timing chart explaining a conventional method of driving a PDP without adjusting luminance;

DESCRIPTION OF THE PREFERRED EMBODIMENTS

Before describing the embodiments of the present invention, an operational model for a display panel according to the present invention will be described with reference to the accompanying drawings, compared with conventional operational models according to the prior art.

Figure 9:
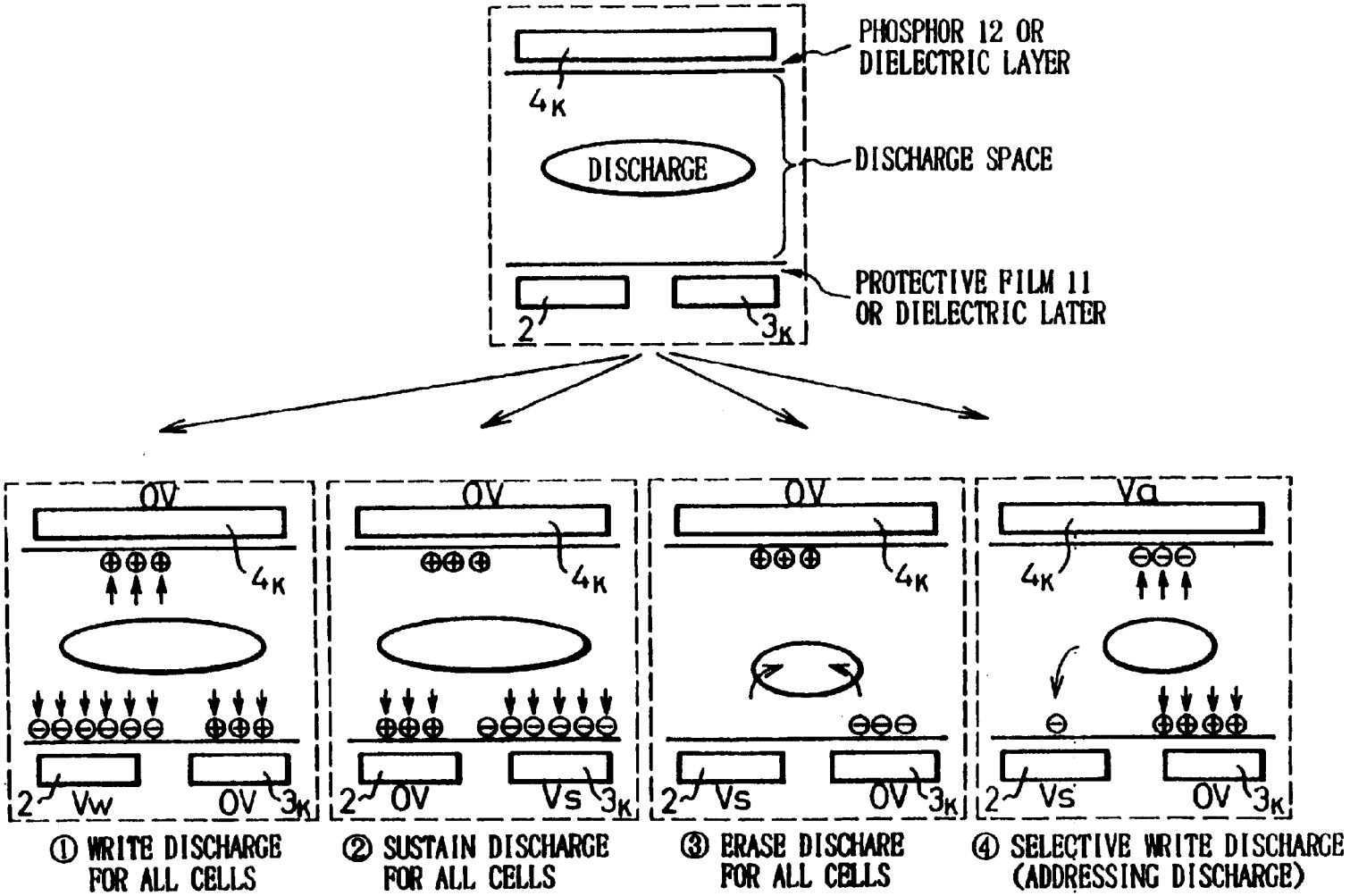
Fig. 9 PRIOR ART
FIG. 9 is a schematic view showing an operational model in driving a display panel of the present invention.
Figure 10:
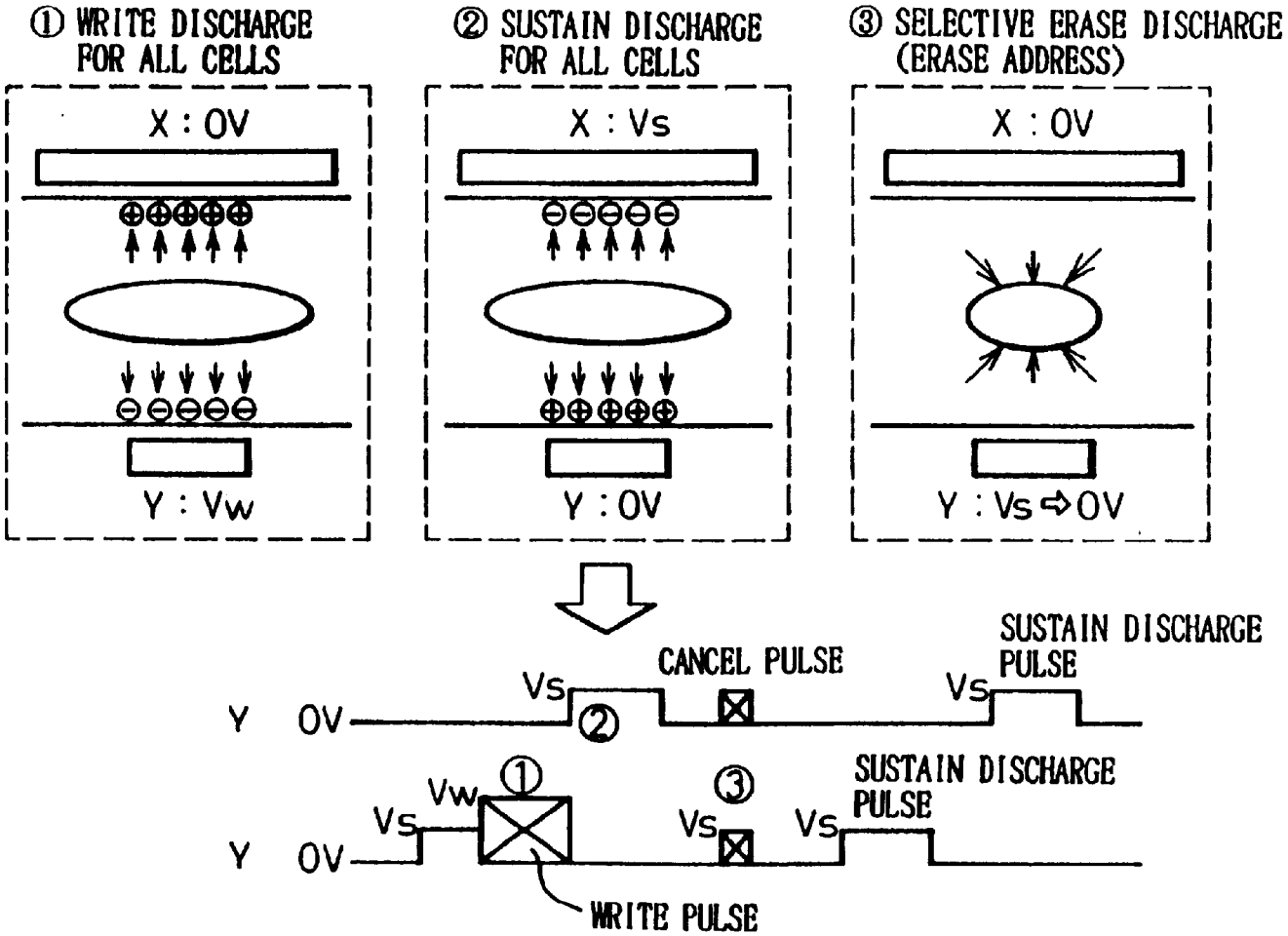
Fig. 10 PRIOR ART
FIG. 10 is a schematic view showing an operational model and drive waveform in driving a conventional two-electrode type PDP.
Figure 11:
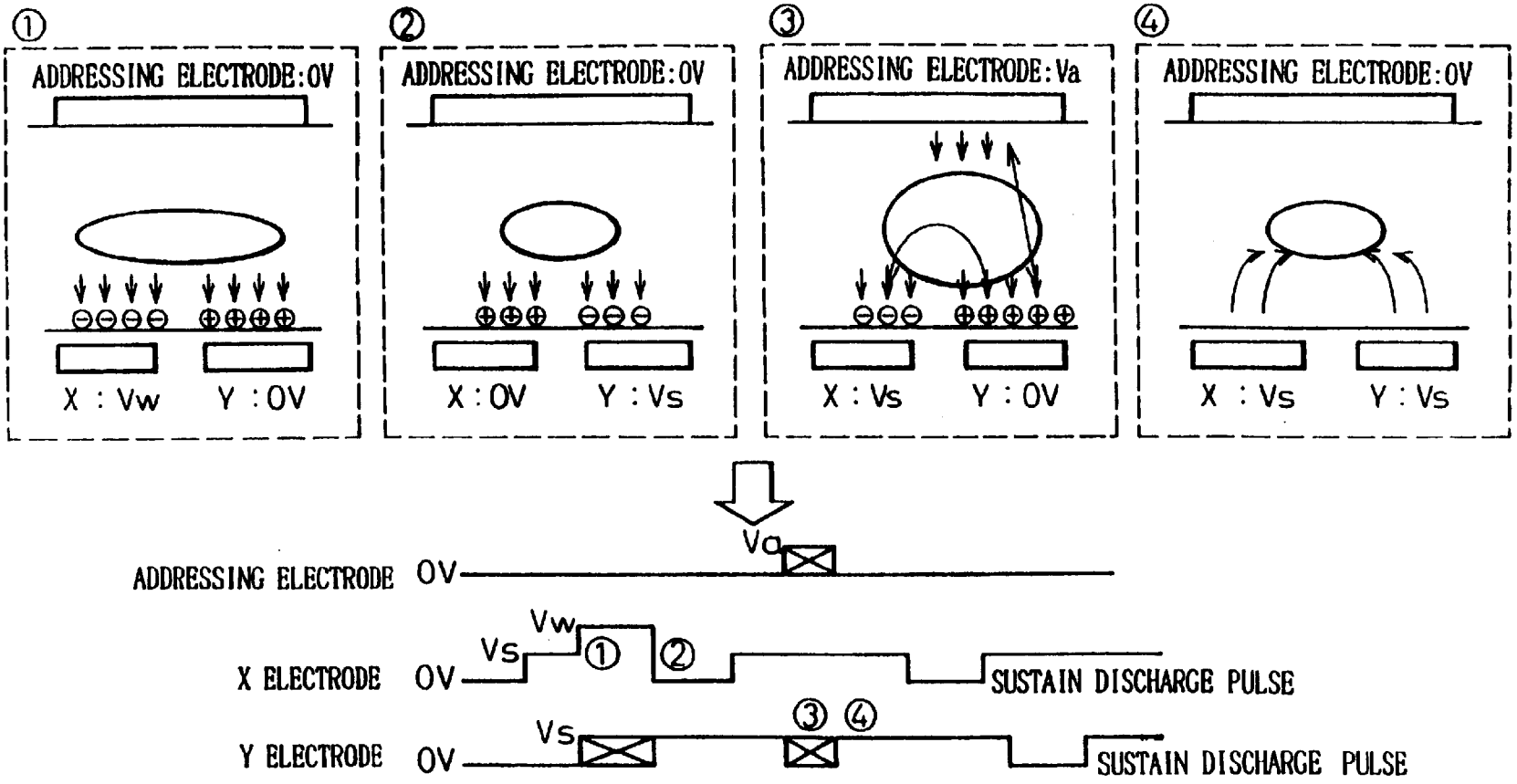
Fig.11 PRIOR ART
FIG. 11 is a schematic view showing an operational model and drive waveform in driving a conventional PDP of three-electrode and self-erase addressing type.
Figure 12:
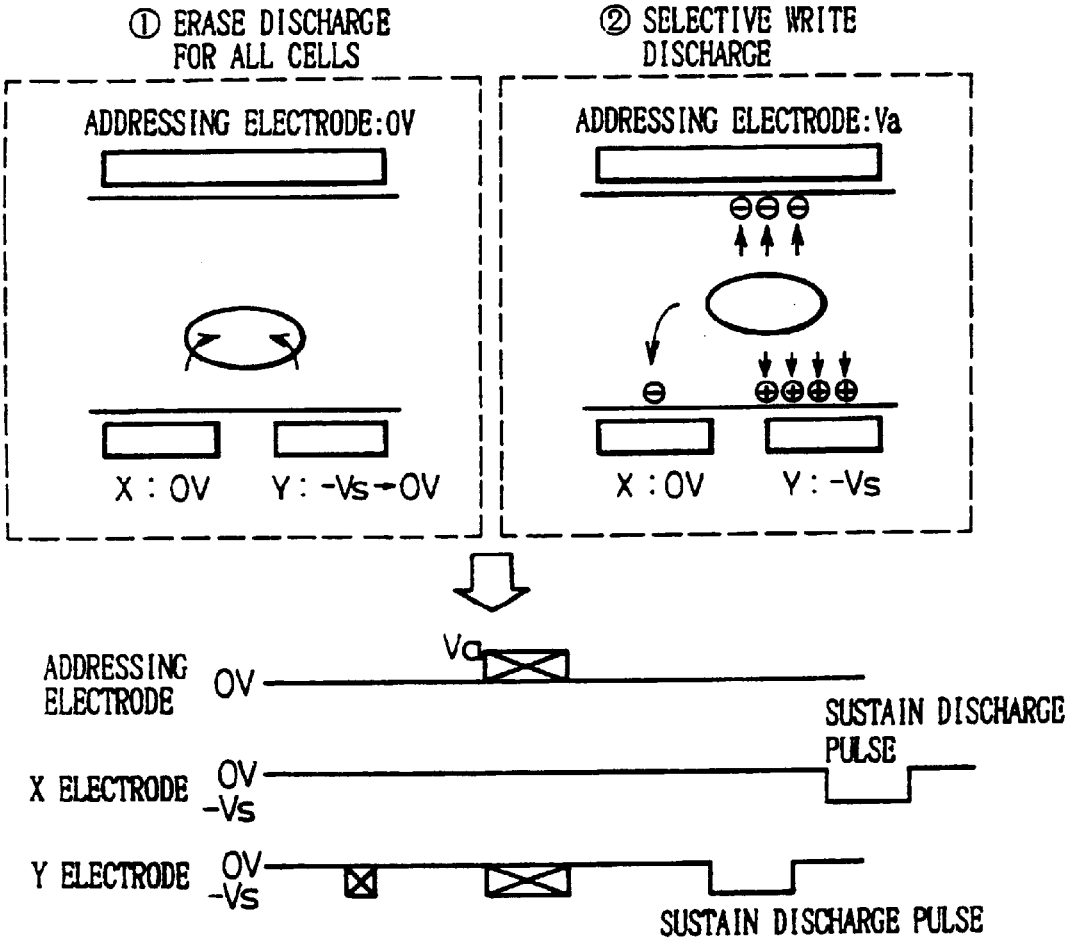
Fig. 12 PRIOR ART
FIG. 12 is a schematic view showing an operational model and drive waveform in driving a conventional PDP of three-electrode and selective-write addressing type.

FIG. 9 is a schematic view showing an operational model in driving a display panel of the present invention. In this case, the display panel of AC PDP will be illustrated representatively. Further, to clarify the characteristics of the present invention, an operational model and drive waveforms for a conventional two-electrode type PDP are illustrated in FIG. 10. Further, an operational model and drive waveform for a conventional PDP of three-electrode and self-erase addressing type are illustrated in FIG. 11. Further, no operational model and drive waveform for a conventional PDP of three-electrode and selective-write addressing type are illustrated in FIG. 12.

In FIG. 9, AC PDP has a first substrate (not shown in FIG. 9), display lines each involving first electrode (X electrode 2 in FIG. 9) and second electrode (Y electrode $\mathbf{3}_k$ in FIG. 9) disposed in parallel with each other on the first substrate, a second substrate (not shown in FIG. 9) facing the first substrate, and third electrodes (addressing electrode $\mathbf{4}_k$ in FIG. 9) disposed on the second substrate and extending orthogonally to the first and second electrodes. Further, in a discharge space of each cell formed between the first and second electrodes and the third electrode. Further, an insulation layer (a phosphor 12 or an insulation layer), which separates the addressing electrode $\mathbf{4}_k$ from the discharge space, is provided. Also, another insulation layer (a protective film 11 or an insulation layer), which separates the X electrode 2 and Y electrode $\mathbf{3}_k$ from the discharge space, is provided.

Here, when a write discharge is executed by selecting the cell by the Y electrode $\mathbf{3}_k$ and addressing electrode $\mathbf{4}_k$, at the first step (①), a write pulse of a voltage $V_w$ is applied to the X electrode, and then a write discharge is performed between the X electrode 2 and the Y electrode $\mathbf{3}_k$ of the ground GND (0 V). Namely, the write discharge for all the cells of the selected display line is performed, and positive charge (ions) are accumulated over the addressing electrode $\mathbf{4}_k$. Next, at the second stage (②), a sustain discharge pulse of a voltage $V_s$ ($V_s<V_w$) is applied to the electrode $\mathbf{3}_k$, and then a sustain discharge for all the cells of the selected display line is performed. Further, at the third stage (③), an erase pulse of a voltage $V_s$ (or lower than $V_s$) is applied to the X electrode 2, and then an erase discharge for all cells of the selected display line. Namely, wall charges at the sustain discharge electrode (over Y and X electrode) are forced to be decreased, so that the write discharge does not occur even if the sustain discharge is applied to the Y electrode $\mathbf{3}_k$. At this stage, if negative wall charges (electrons) are accumulated over the Y electrode, these wall charges can work effectively on a selective write discharge of the next fourth stage. At the fourth stage (④), the addressing pulse of a voltage $V_a$ is applied to the addressing electrode $\mathbf{4}_k$ and the selective write discharge (addressing discharge) of the selected cell is performed utilizing the wall charges that have been accumulated over the addressing electrode $\mathbf{4}_k$.

Namely, it is the main characteristics of the method for driving a PDP according to the present invention that the wall charges, which work effectively on the selective write discharge, are accumulated over the addressing electrode (phosphor 12 or dielectric layer), before the selective write discharge is executed. Further, if the charges having the opposite polarity to the charges at the addressing electrodes are accumulated over the sustain discharge electrode (Y electrode of X electrode), such wall charges further work on the selective write discharge. As a measure for realizing such a process of wall charge accumulation, it is necessary for the write discharge for all the cells and erase discharge for all the cells to be carried out.

On the other hand, in a conventional two-electrode type PDP as shown in FIG. 10 (e.g., a monochrome PDP of neo orange lamp), a write discharge for all the cells is executed at the first stage (①), and then a sustain discharge for all the cells is executed at the second stage (②). Further, at the third stage (③), a narrow erase pulse is applied to the selected cell and a selective erase discharge (erase address discharge) is performed. The unselected cell (the cell that is turned ON) is prevented from being turned OFF due to the erase discharge, by applying a cancel pulse of a voltage $V_s$ to the X electrode. In this case, by utilizing electrons and ions generated in an ON stage of the first stage remain for relatively long time as the residual space charges, the selective erase discharge is performed. However, in this method, a process of accumulating wall charges over the addressing electrode is not carried out at all, before the selective erase discharge (selective write discharge) is executed, different from the method of the present invention.

Further, in a conventional PDP of three electrode and self-erase addressing type shown in FIG. 11, a write discharge for all the cells is executed at the first stage (①), and then a sustain discharge for all the cells is executed at the second stage (②). Further, at the third stage (③), the sustain discharge is executed between X and Y electrodes and simultaneously a selective write discharge is executed between addressing electrode and Y electrode. Due to this selective write discharge, large amounts of wall charges are generated. Further, at the fourth stage (④), when a voltage difference between X and Y electrodes is set to zero (0), the discharge is started by virtue of the voltage generated only from the wall charges. In this case, there is no voltage difference between X and Y electrodes, the space charges that was generated due to the discharge are neutralized and dissipated. At this time, a process of selective erase discharge (self-erase discharge) is completed. Also, in this case, a process of accumulating wall charges over the addressing electrode is not carried out at all, before the selective erase discharge is executed.

Further, in a conventional PDD of three-electrode and selective-write addressing type shown in FIG. 12, an erase discharge for all the cells of the selected display line is executed at the first stage (①), so that all the wall charges can be dissipated assuredly. Next, at the second stage (②), an addressing pulse is applied to the addressing electrode, and then the selective write discharge (addressing discharge) is executed. Also, in this case, a process of accumulating the wall charges over the addressing electrode is not carried out.

As described before, in any case of such prior arts, the characteristics of the present invention, that the wall charge are accumulated in advance of the selective write discharge by carrying out the write discharge for all cells and the erase discharge for all cells, is not utilized effectively.

Hereinafter, an abnormal discharge which is likely to occur in an AC PDP will be explained in detail. The applicant has proposed, in Japanese Patent Application No. 4-3234 filed on Jan. 10, 1992, a display unit that employs a novel arrangement of Y and X electrodes, to suppress reactive power caused by parasitic capacitance between the electrodes.

Figure 13:
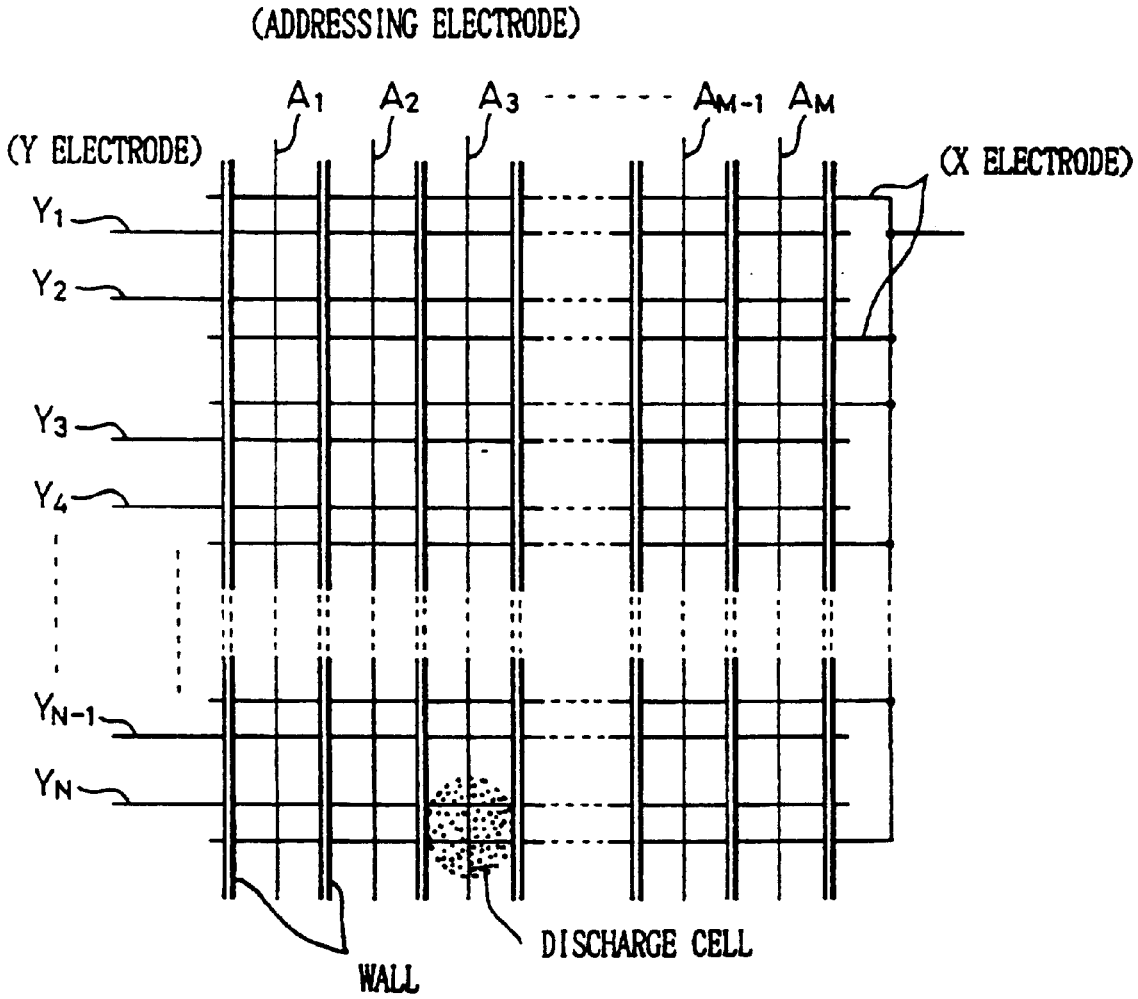
FIG. 13 is the layout of an X-Y-Y-X arrangement.

This arrangement is an X-Y-Y-X arrangement shown in FIG. 13. In the figure, two Y electrodes (for example, $Y_1$ and $Y_2$, $Y_3$ and $Y_4$, . . . , $Y_{N-1}$ and $Y_N$) are disposed between X electrodes that are orthogonal to addressing electrodes $A_1$ to $A_M$.

Compared with a usual arrangement (an X-Y-X-Y arrangement) of X and Y electrodes, the proposed arrangement can halve a distance between opposing X and Y electrodes, to thereby suppress parasitic capacitance and reactive power. This arrangement, however, causes inconvenience depending on driving methods.

Figure 14A:
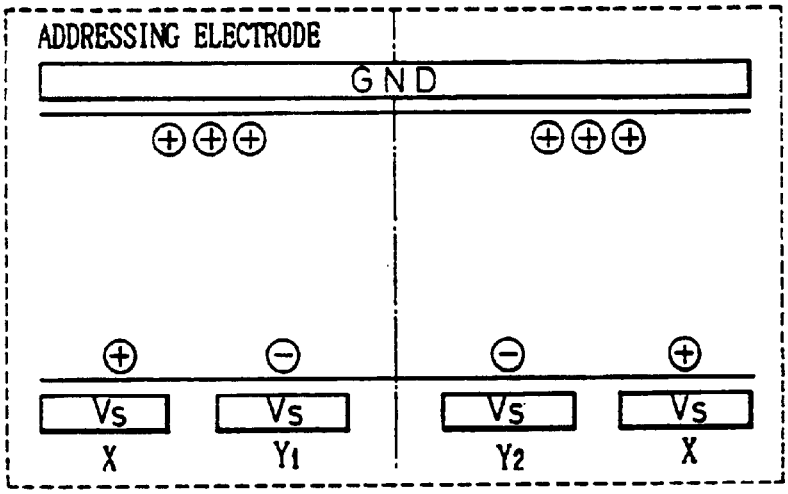
FIGS. 14(a) and 14(b) are first models for explaining abnormal discharge.
Figure 14B:
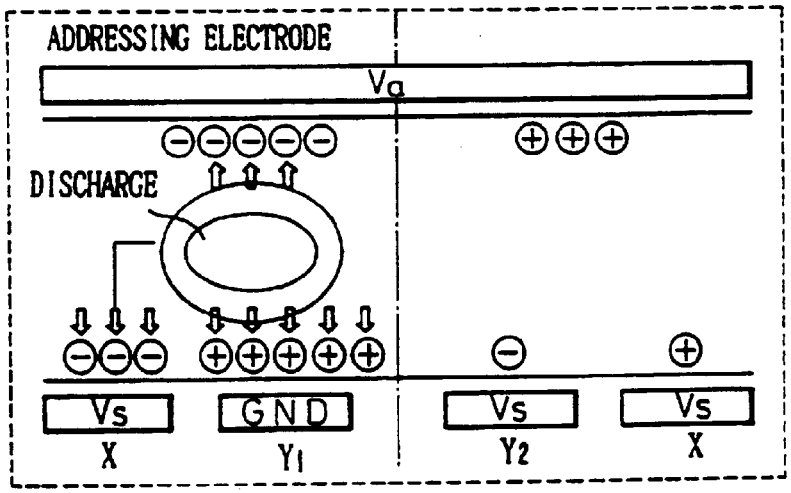
Figure 15A:
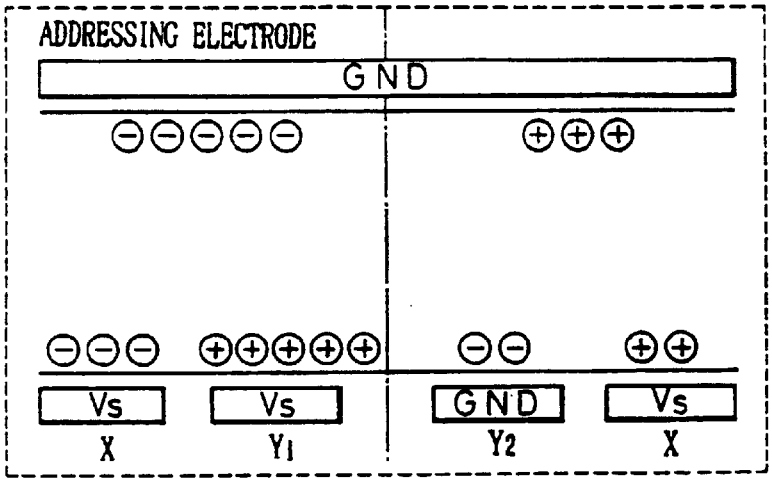
FIGS. 15(a) and 15(b) are second models for explaining abnormal discharge.
Figure 15B:
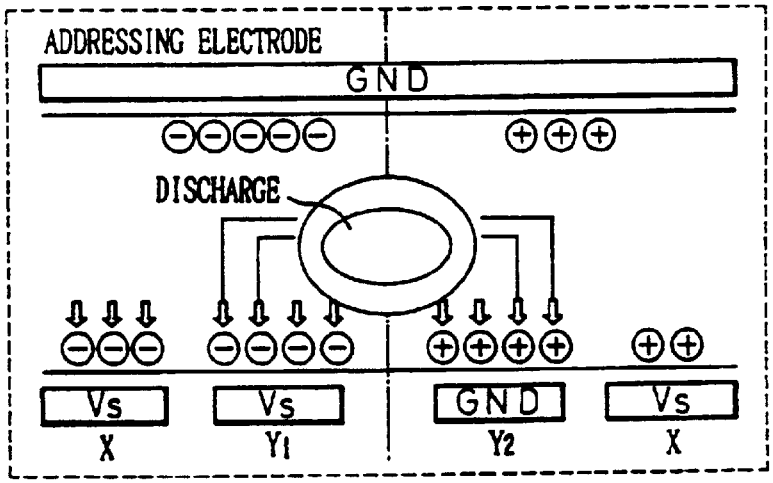

In FIGS. 14(a) and 14(b), an area surrounded by a dotted line shows a sectional model of two discharge cells included in the X-Y-Y-X arrangement. In FIG. 14(a), a ground (GND) voltage is applied to an addressing electrode, and a voltage of $V_s$ is applied to the X-Y-Y-X electrodes. In FIG. 14(b) a voltage of Va is applied to the addressing electrode, and a potential of GND (a selection pulse) is applied to a selected Y electrode ($Y_1$). The cell of the electrode $Y_1$ then discharges to produce positive wall charges. Under this state, if the GND (a selection pulse) is applied to the adjacent electrode ($Y_2$) as shown in FIG. 15(a), abnormal discharge occurs between the cell of the electrode $Y_1$ that has already carried out write discharge and produced the wall charges and the cell of the electrode $Y_2$, as shown in FIG. 15(b). As a result, the cell of the electrode $Y_1$ excessively accumulates negative wall charges, to hinder sustain discharge thereafter. Although this explanation is related to a write addressing method, the same is applicable for an erase addressing method.

Figure 16A:
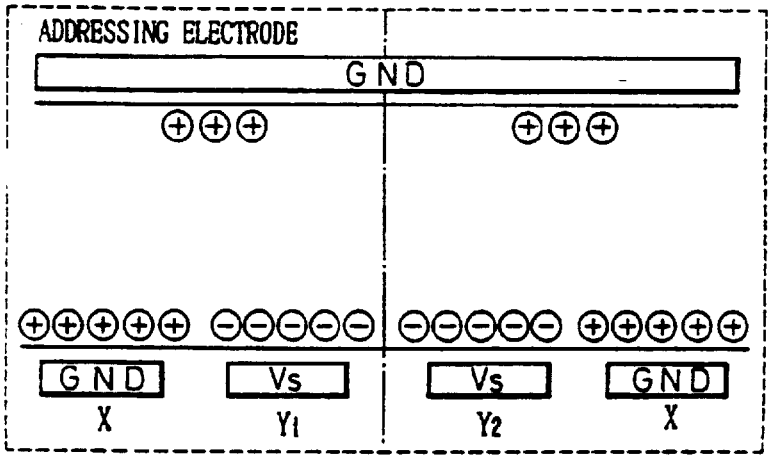
FIGS. 16(a) and 16(b) are third models for explaining abnormal discharge.
Figure 16B:
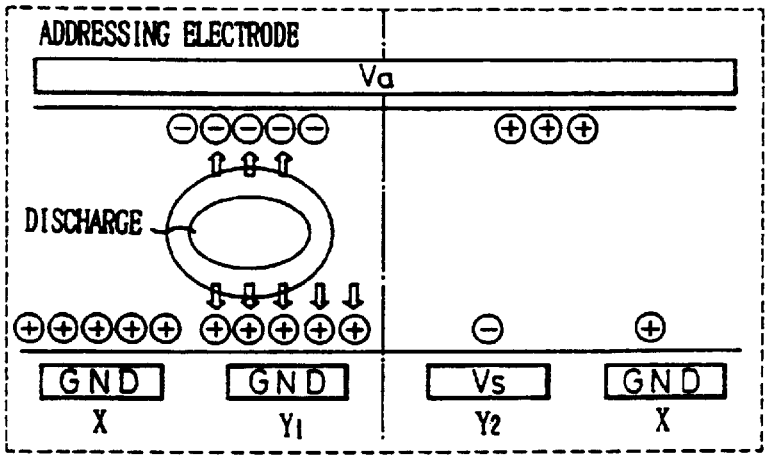
Figure 17A:
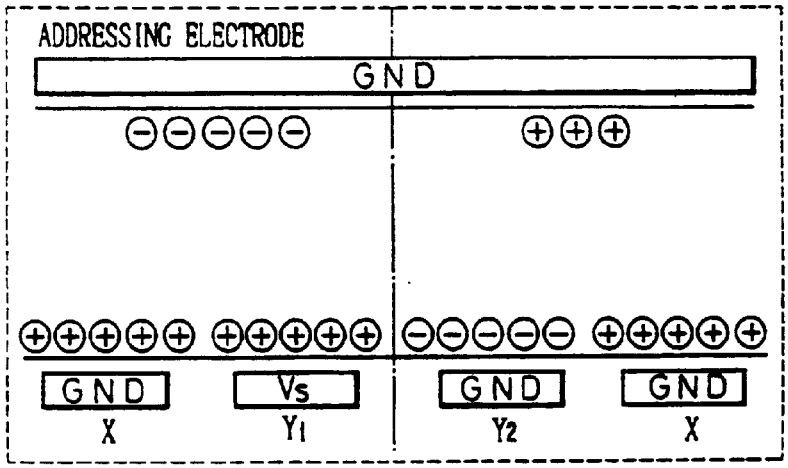
FIGS. 17(a) and 17(b) are fourth models for explaining abnormal discharge.
Figure 17B:
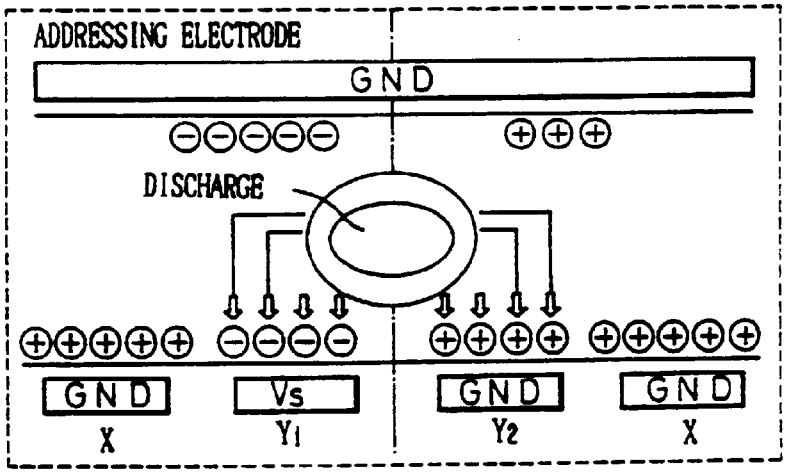

In FIG. 16(a), the voltage GND is applied to the addressing and X electrodes, and the voltage Vs is applied to the Y electrodes. Thereafter, the voltage Va is applied to the addressing electrode, and the GND (a selection pulse) is applied to a selected Y electrode ($Y_1$), as shown in FIG. 16(b). The cell of the electrode $Y_1$ discharges to produce positive wall charges. At this time, the GND (a selection pulse) is applied to the adjacent electrode $Y_2$ as shown in FIG. 17(a). Then, as shown in FIG. 17(b), abnormal discharge occurs between the cell of the electrode $Y_1$ that has already carried out write discharge and produced the wall charges and the cell of the electrode $Y_2$. As a result, the cell of the electrode $Y_1$ enables sustain discharge, while the cell of the electrode $Y_2$ is extinguished to disable sustain discharge.

Such an abnormal discharge in the X-Y-Y-X arrangement is avoidable by lowering the voltage applied to the Y electrodes of unselected lines less than the potential of a sustain discharge pulse, or by equalizing the same with an addressing voltage, to thereby suppress an effective voltage applied to a discharge cavity between adjacent Y electrodes below a discharge start voltage.

First to eighth embodiments of the present invention will be explained with reference to FIGS. 18 to 51.

Figure 18:
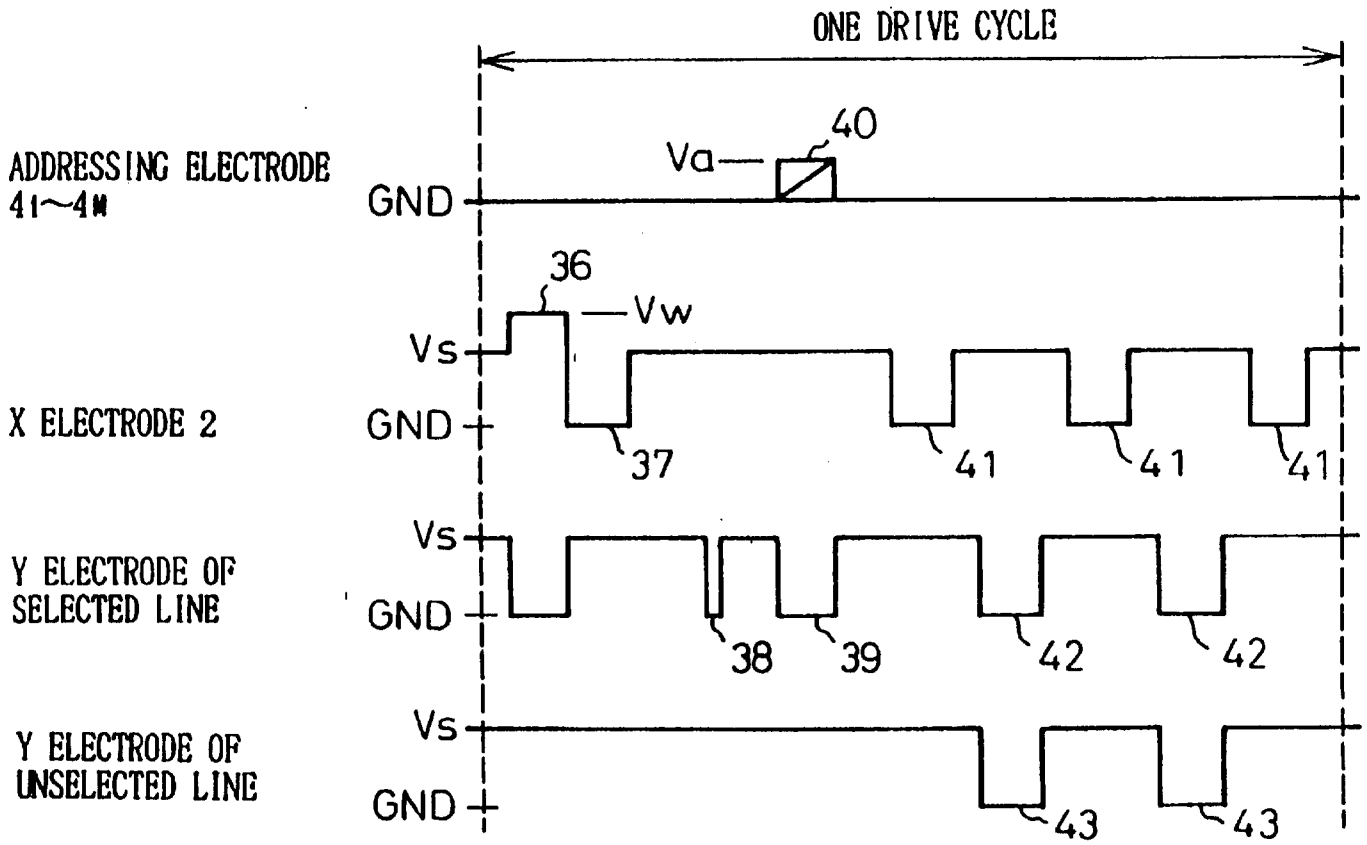
FIG. 18 is a waveform diagram showing a first embodiment of the present invention.

First Embodiment of FIG. 18

Figure 1:
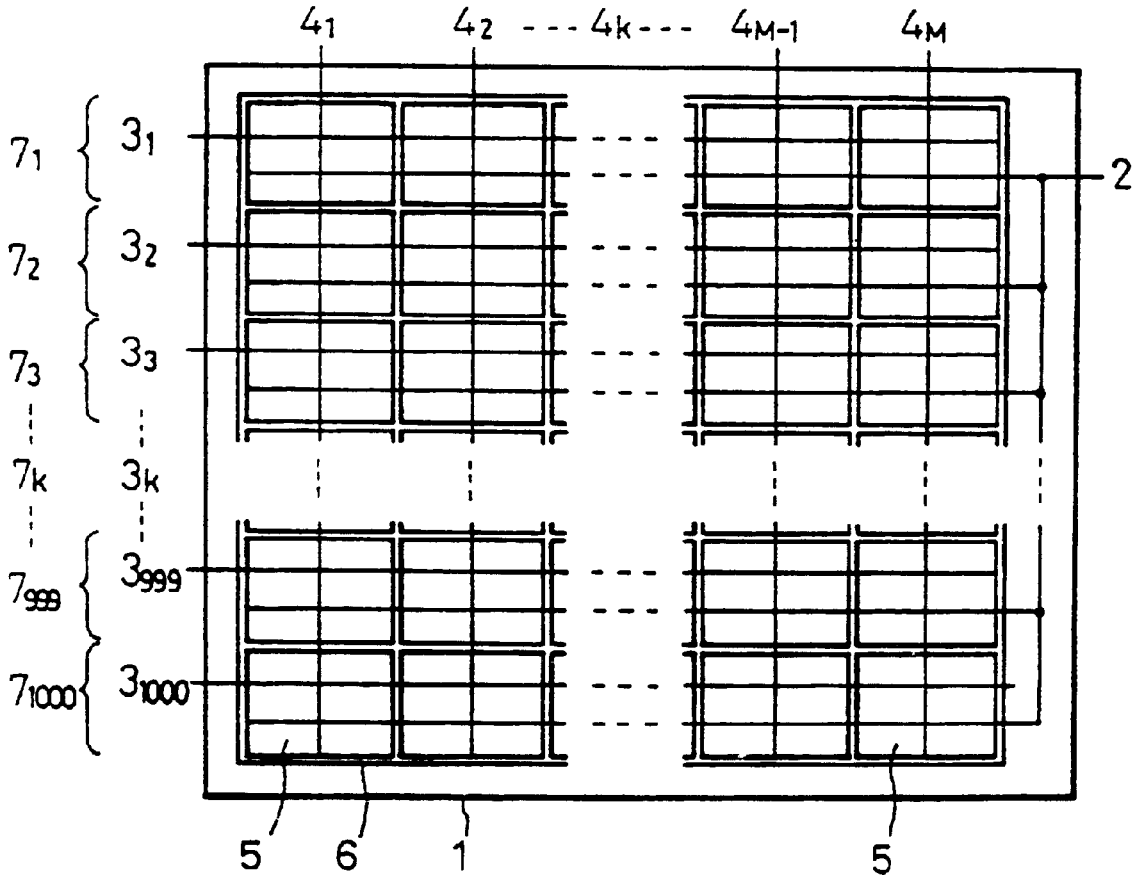
Fig. 1 PRIOR ART
FIG. 1 is a plan view schematically showing an example of a conventional PDP.
Figure 2:
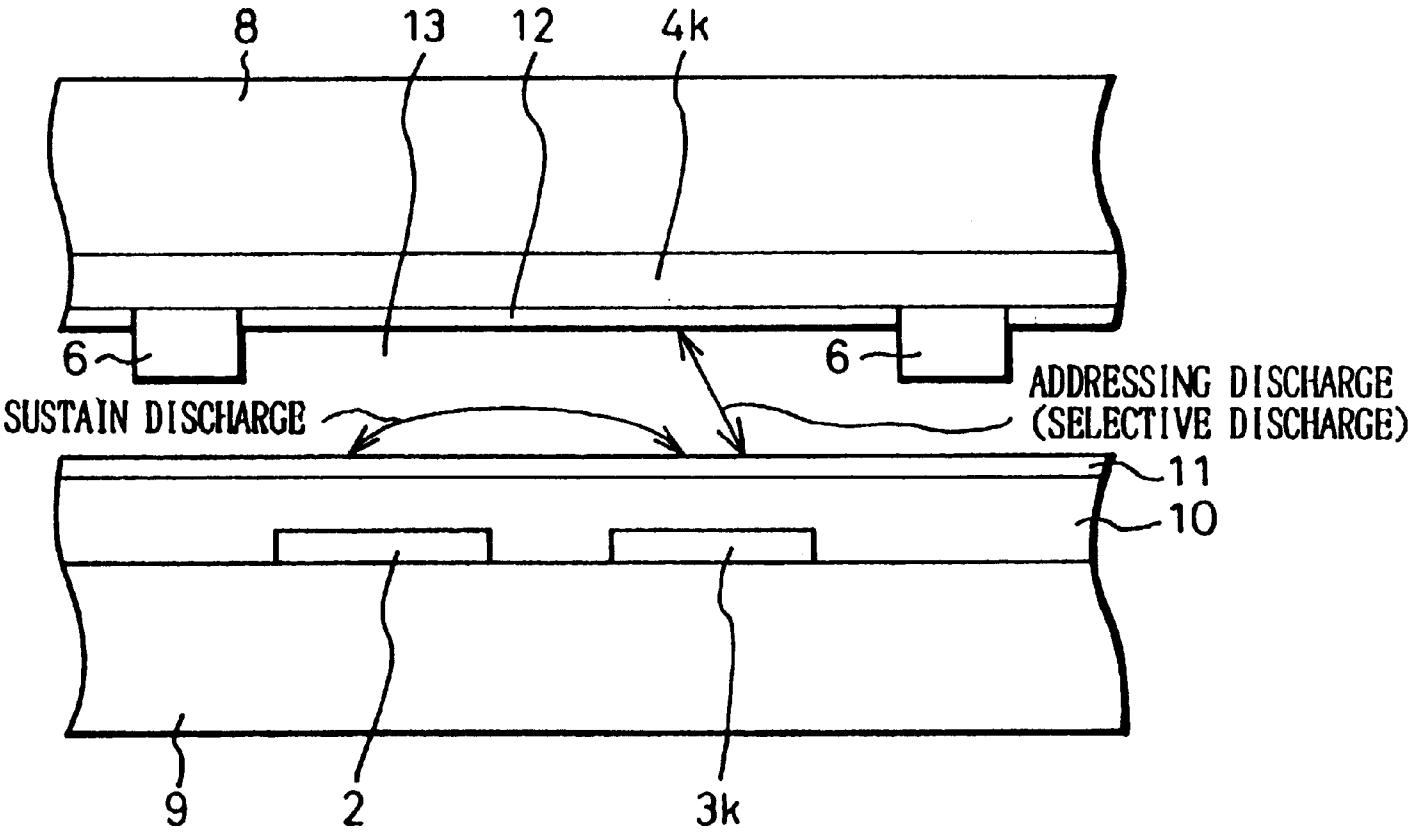
Fig. 2 PRIOR ART
FIG. 2 is a sectional end view schematically showing the basic structure of a cell.
Figure 3:
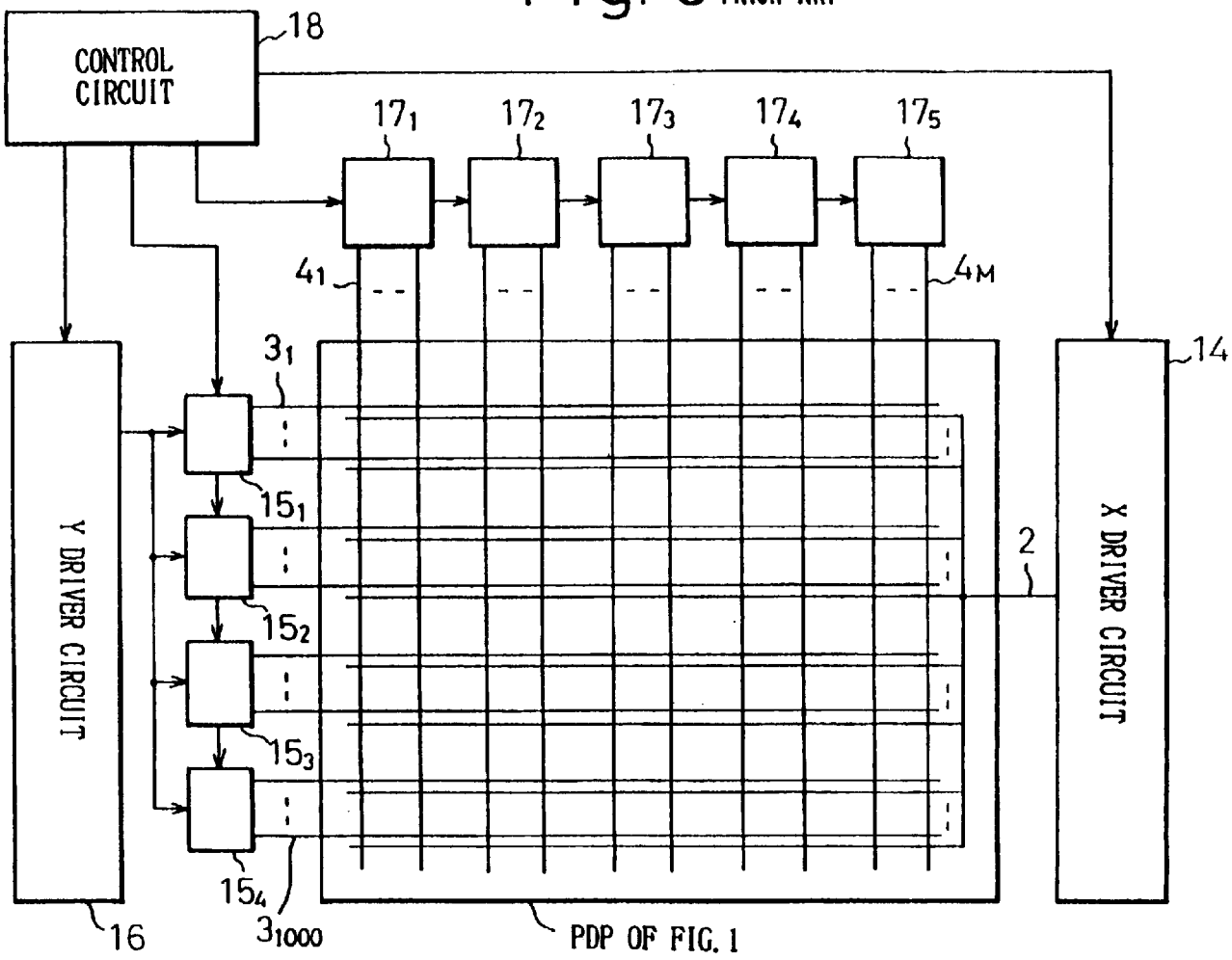
Fig. 3 PRIOR ART
FIG. 3 is a view showing the conventional PDP of FIG. 1 and peripheral circuits thereof.
Figure 4:
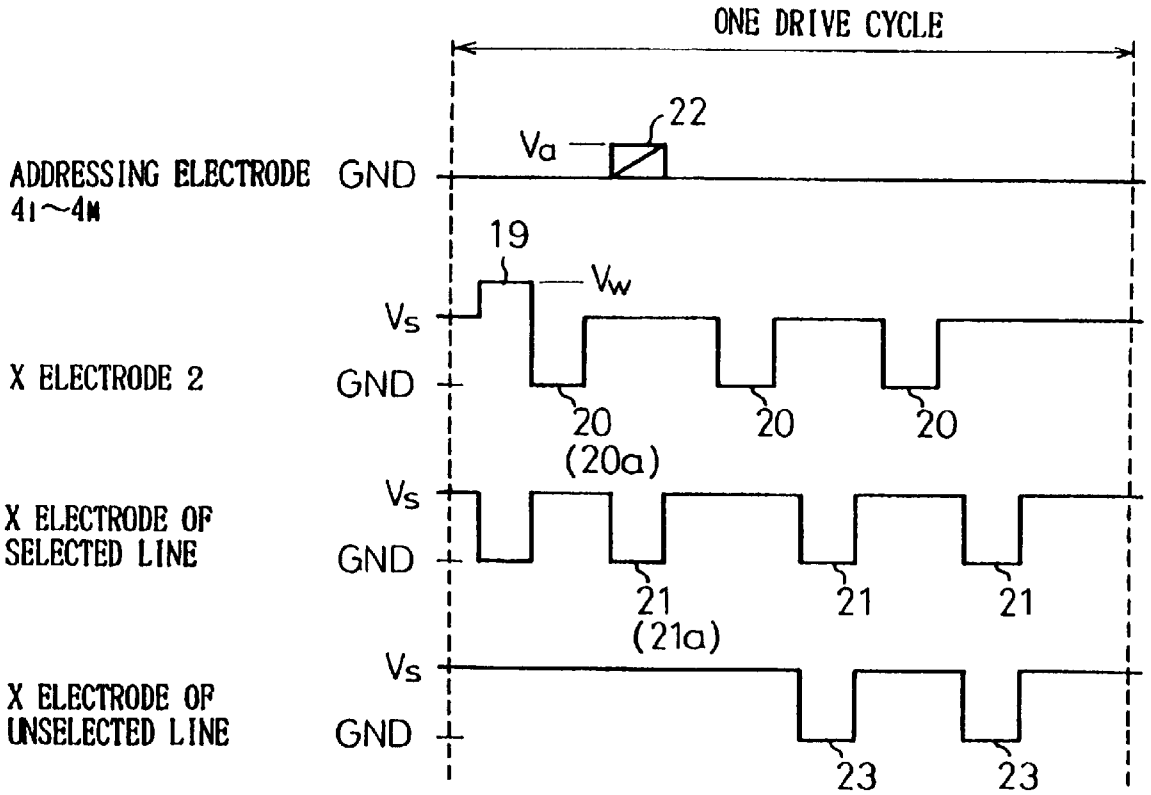
Fig. 4 PRIOR ART
FIG. 4 is a waveform diagram showing a first conventional method for driving the PDP of FIG. 1.
Figure 5:
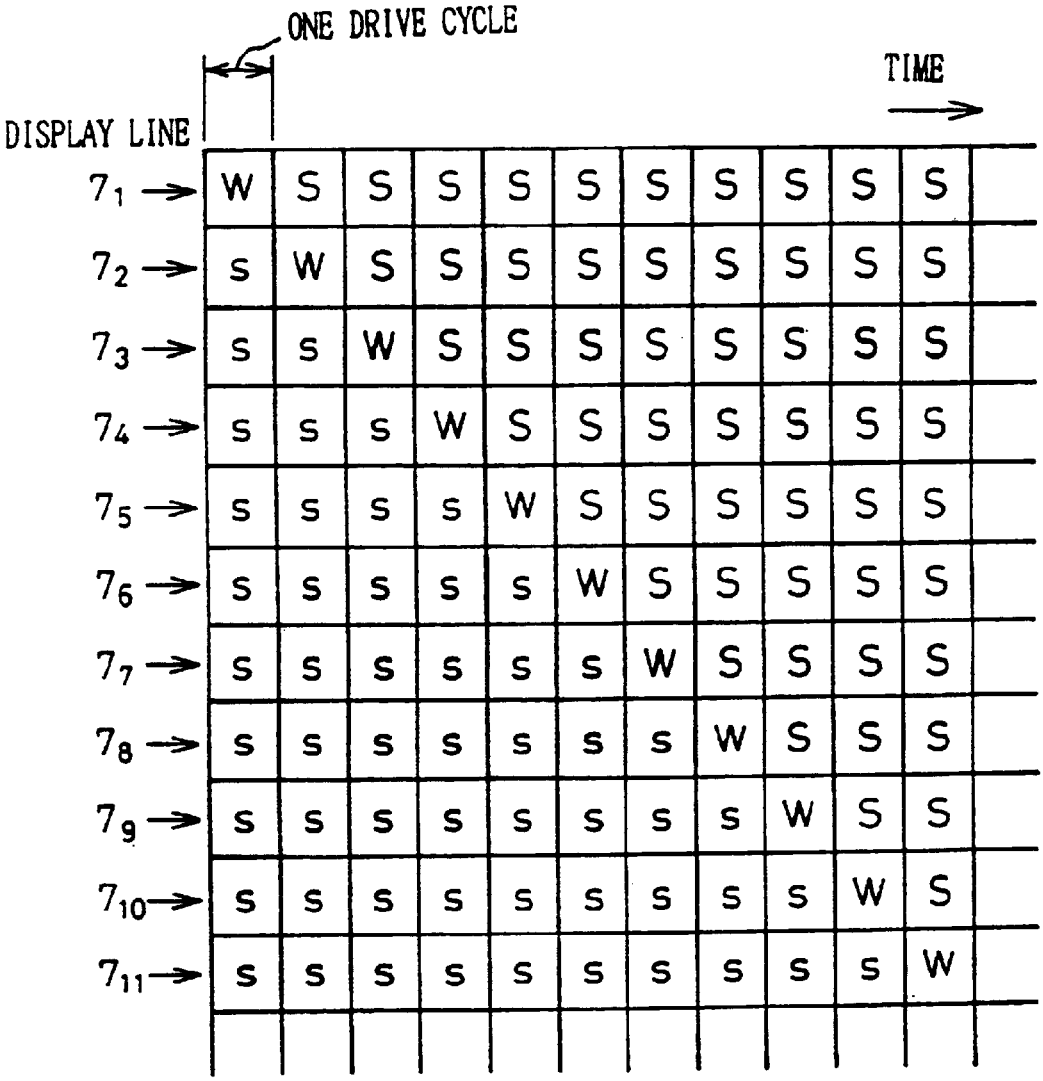
Fig. 5 PRIOR ART
FIG. 5 is a time charge showing a method of selecting display lines.
Figure 6:
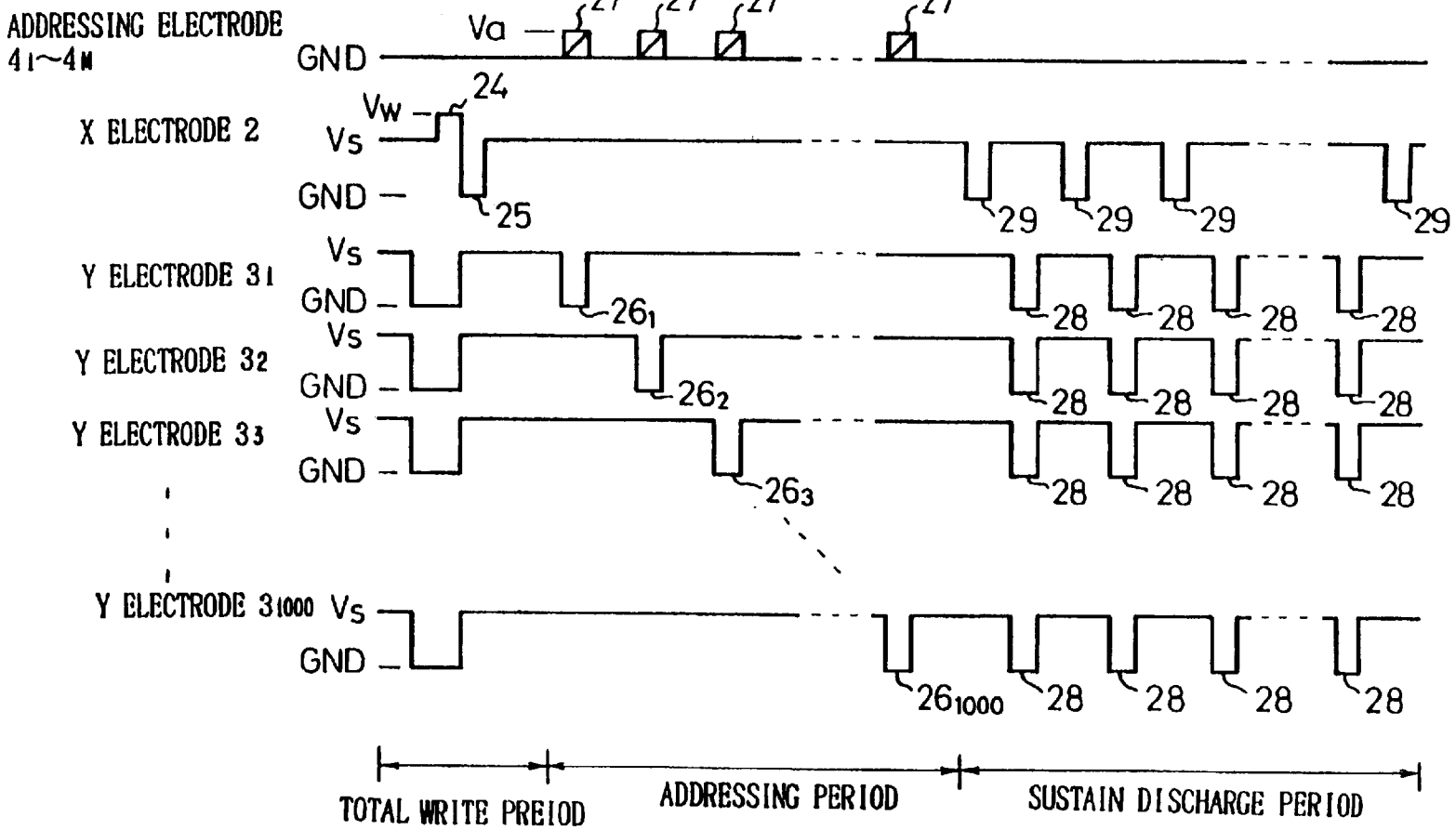
Fig. 6 PRIOR ART
FIG. 6 is a waveform diagram showing a second conventional method of driving the PDP of FIG. 1.

FIG. 18 is a waveform diagram showing the first embodiment of the present invention. The figure shows one drive cycle. This embodiment drives the PDP of FIG. 1 according to the sequential line driving method.

According to this embodiment, the potential of the Y electrode of a selected line is set to GND, the potential of the Y electrodes of unselected lines is set to Vs, and a write pulse 36 having a voltage of Vw is applied to the X electrode 2, to discharge all cells of the selected line.

Thereafter, the potential of the Y electrode of the selected line is returned to Vs, and a sustain discharge pulse 37 is applied to the X electrode 2, to carry out sustain discharge. A narrow erase pulse 38 is applied to the Y electrode of the selected line, to carry out erase discharge in all cells of the selected line.

An addressing pulse (a write pulse) 39 having a potential level of GND is applied to the Y electrode of the selected line. The Y electrodes of the unselected lines are kept at Vs. An addressing pulse (a wide pulse) 40 having a voltage of Va is applied to the addressing electrodes that correspond to cells to be turned ON of the selected line, to discharge these cells.

Sustain discharge pulses 41 and 42 are alternately applied to the X electrode 2 and the Y electrode of the selected line, to repeatedly carry out sustain discharge. Consequently, display data is written to the selected line. Numeral 43 is a sustain discharge pulse applied to the Y electrodes of the unselected lines.

In this way, the first invention carries out write discharge and then erase discharge in all cells of a selected display line, to equalize these cells before writing display data thereto. The sequential line driving method according to the first invention, therefore, prevents a write error of display data and displays a quality image.

Figure 19:
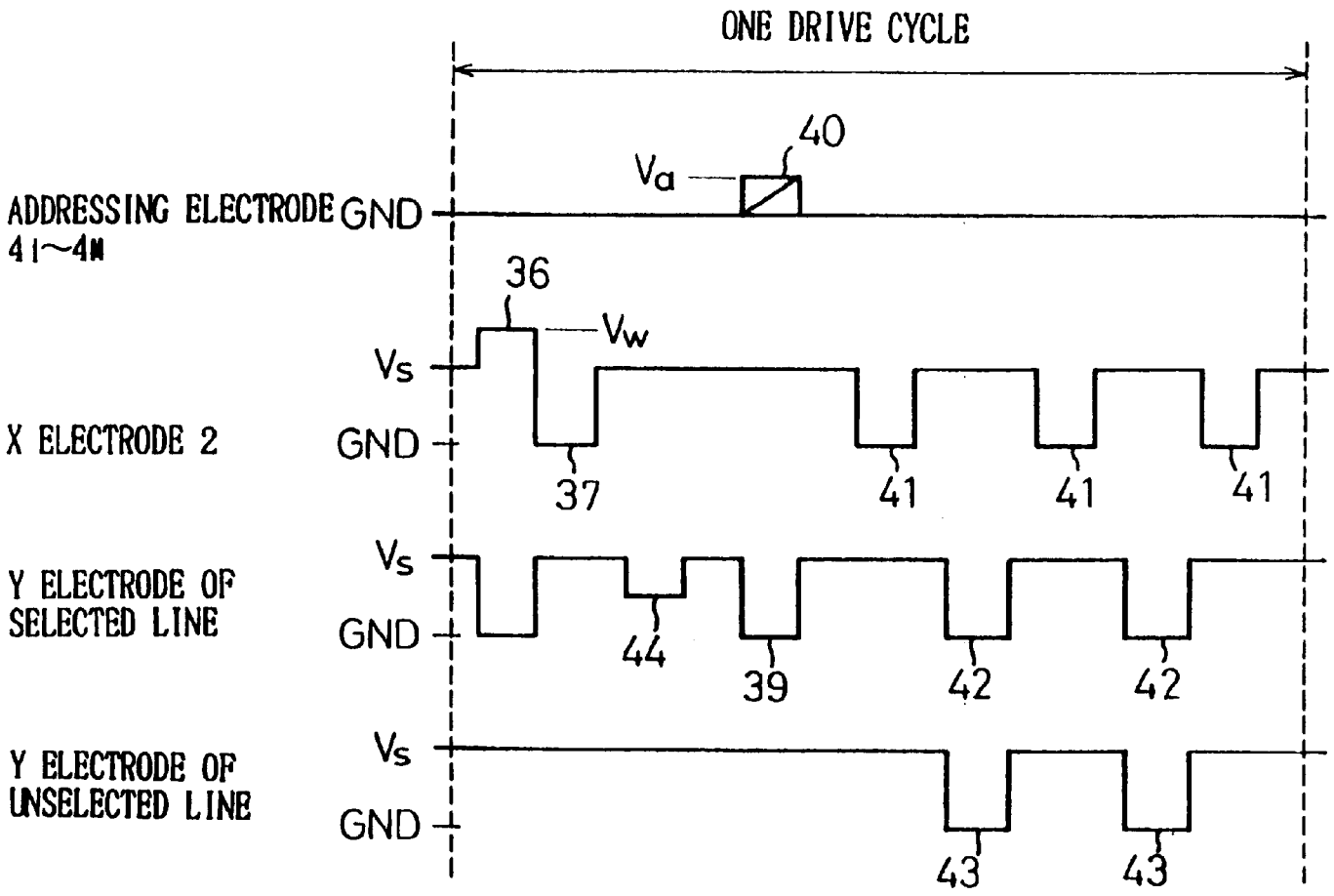
FIG. 19 is a waveform diagram showing a second embodiment of the present invention.

Second Embodiment of FIG. 19

FIG. 19 is a waveform diagram showing a second embodiment of the present invention. The figure shows one drive cycle. Similar to the first embodiment, the second embodiment drives the PDP of FIG. 1 according to the sequential line driving method.

The second embodiment applies a wide erase pulse 44 to the Y electrode of a selected line. The rest of this embodiment is the same as the first embodiment.

The second embodiment equalizes all cells of a selected line before writing display data thereto. Similar to the first embodiment, the sequential line driving method according to the second embodiment prevents a write error and displays a quality image.

Figure 20:
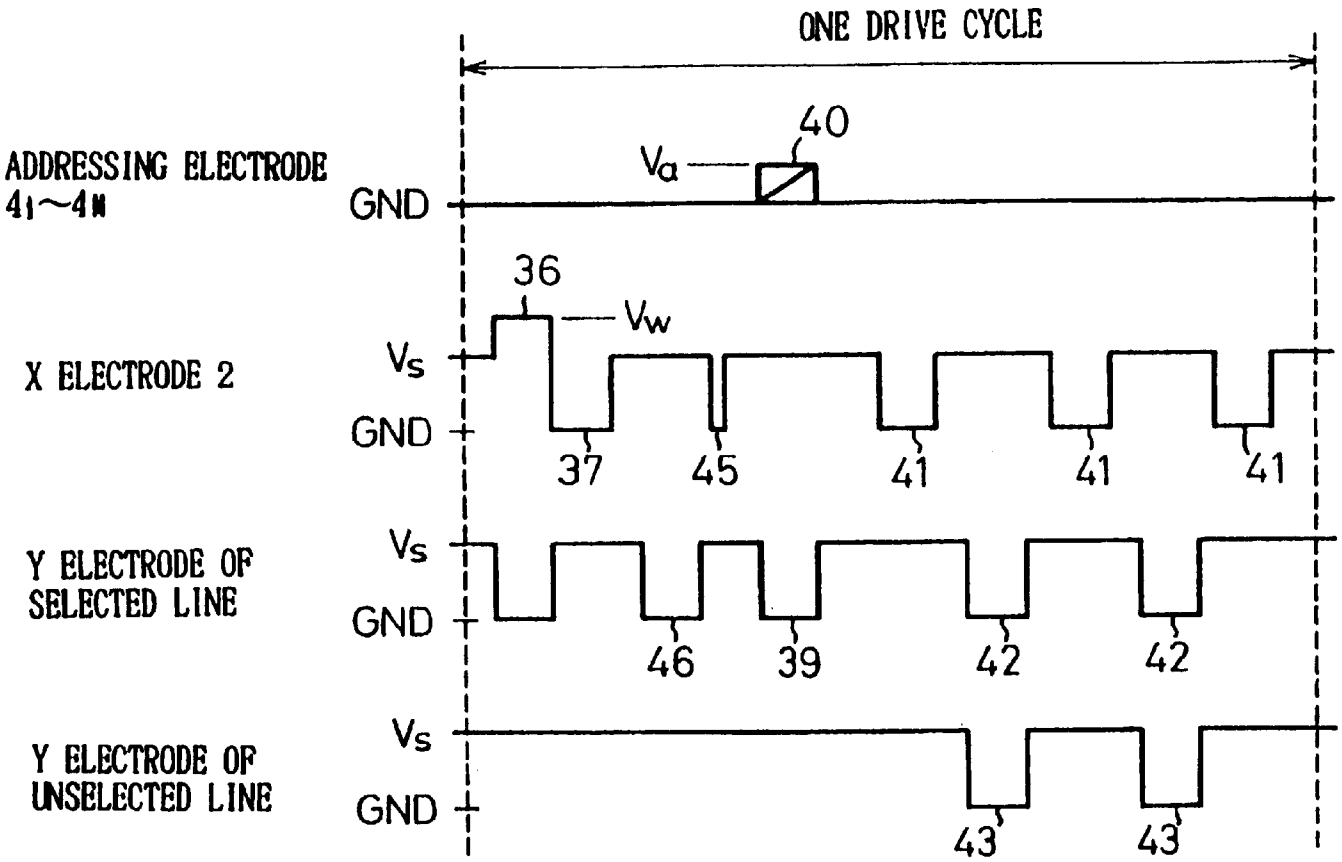
FIG. 20 is a waveform diagram showing a third embodiment of the present invention.

Third Embodiment of FIG. 20

FIG. 20 is a waveform diagram showing a third embodiment of the present invention. The figure shows one drive cycle. Similar to the first embodiment, the third embodiment drives the PDP of FIG. 1 according to the sequential line driving method.

Instead of the narrow erase pulse 38 of FIG. 18, the third embodiment applies a narrow erase pulse 45 to the X electrode 2. Before the narrow erase pulse 45 to the X electrode 2, a sustain discharge pulse 46 is applied to the Y electrode of a selected line, to accumulate negative wall charges in the MgO film over the X electrode of the selected line as well as positive wall charges in the MgO film over the Y electrode of the selected line, so that the narrow erase pulse 45 may trigger erase discharge. The rest of this embodiment is the same as the first embodiment.

The third embodiment equalizes all cells of a selected line before writing display data thereto. Similar to the first embodiment, the sequential line driving method according to the third embodiment prevents a write error and displays a quality image.

Figure 21:
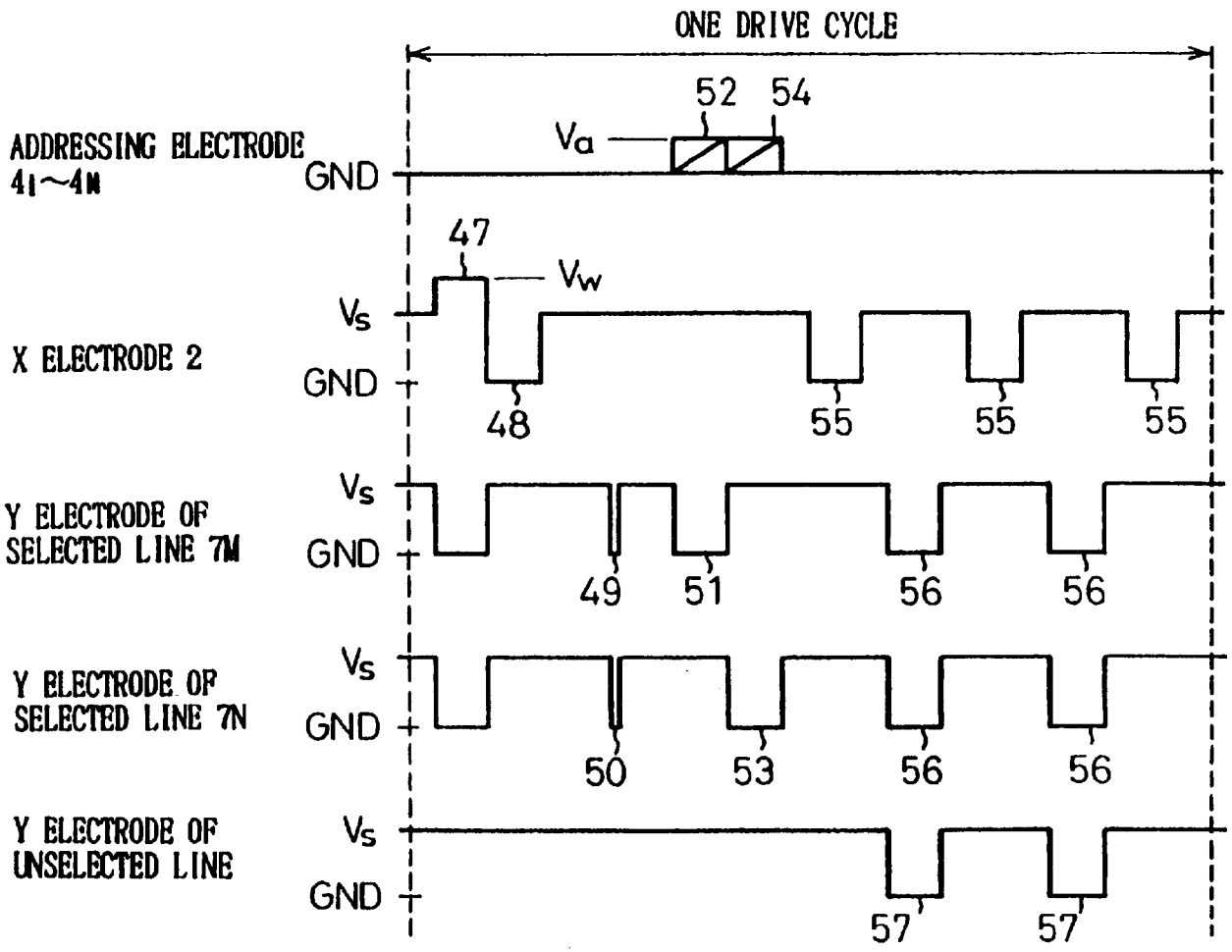
FIG. 21 is a waveform diagram showing a fourth embodiment of the present invention.

Fourth Embodiment of FIGS. 21 and 22

FIG. 21 is a waveform diagram showing a fourth embodiment of the present invention. The figure shows one drive cycle. Similar to the first embodiment, the fourth embodiment drives the PDP of FIG. 1 according to, unlike the first embodiment, the sequential multiple line driving method.

According to the fourth embodiment, two display lines 7m and 7n are selected, the Y electrodes of the selected lines 7m and 7n are set to GND, the Y electrodes of unselected lines are kept at Vs, and a write pulse 47 having a voltage of Vw is applied to the X electrode 2, to discharge all cells of the selected lines 7m and 7n.

Thereafter, the potential of the Y electrodes of the selected lines 7m and 7n is returned to Vs. A sustain discharge pulse 48 is applied to the X electrode 2, to carry out sustain discharge. Narrow erase pulses 49 and 50 are applied to the Y electrodes of the selected lines 7m and 7n, to carry out erase discharge in all cells of the selected lines 7m and 7n.

An addressing pulse (a write pulse) 51 having a potential level of GND is applied to the Y electrode of one selected line 7m. The Y electrode of the other selected line 7n and the Y electrodes of unselected lines are kept at Vs. An addressing pulse (a write pulse) 52 having a voltage of Va is applied to addressing electrodes that correspond to cells to be turned ON of the selected line 7m, to discharge these cells.

An addressing pulse (a write pulse) 53 having a potential level of GND is applied to the Y electrode of the other selected line 7n. The Y electrode of the selected line 7m and the Y electrodes of the unselected lines are kept at Vs. An addressing pulse (a write pulse) 54 having a voltage of Va is applied to addressing electrodes that correspond to cells to be turned ON of the selected line 7n, to discharge these cells.

Sustain discharge pulses 55 and 56 are alternately applied to the X electrode 2 and the Y electrodes of the selected lines 7m and 7n, to repeatedly carry out sustain discharge. Consequently, display data are written to the selected lines 7m and 7n. Numeral 57 is a sustain discharge pulse applied to the Y electrodes of the unselected lines.

FIG. 22 is a time chart showing the display lines sequentially selected. In the figure, "W" is a write cycle of a present frame, "S" is a sustain discharge cycle of the present frame, "w" is a write cycle of a preceding frame, and "s" is a sustain discharge cycle of the preceding frame.

In this way, the sequential multiple line driving method according to the fourth embodiment equalizes all cells of selected lines before writing display data thereto, to thereby prevent a write error and display a quality image.

According to the fourth embodiment, the narrow erase pulses 49 and 50 are applied to the Y electrodes of the selected lines 7m and 7n. Instead, wide erase pulses may be applied to the Y electrodes of the selected lines and a narrow erase pulse to the X electrode.

Figure 23:
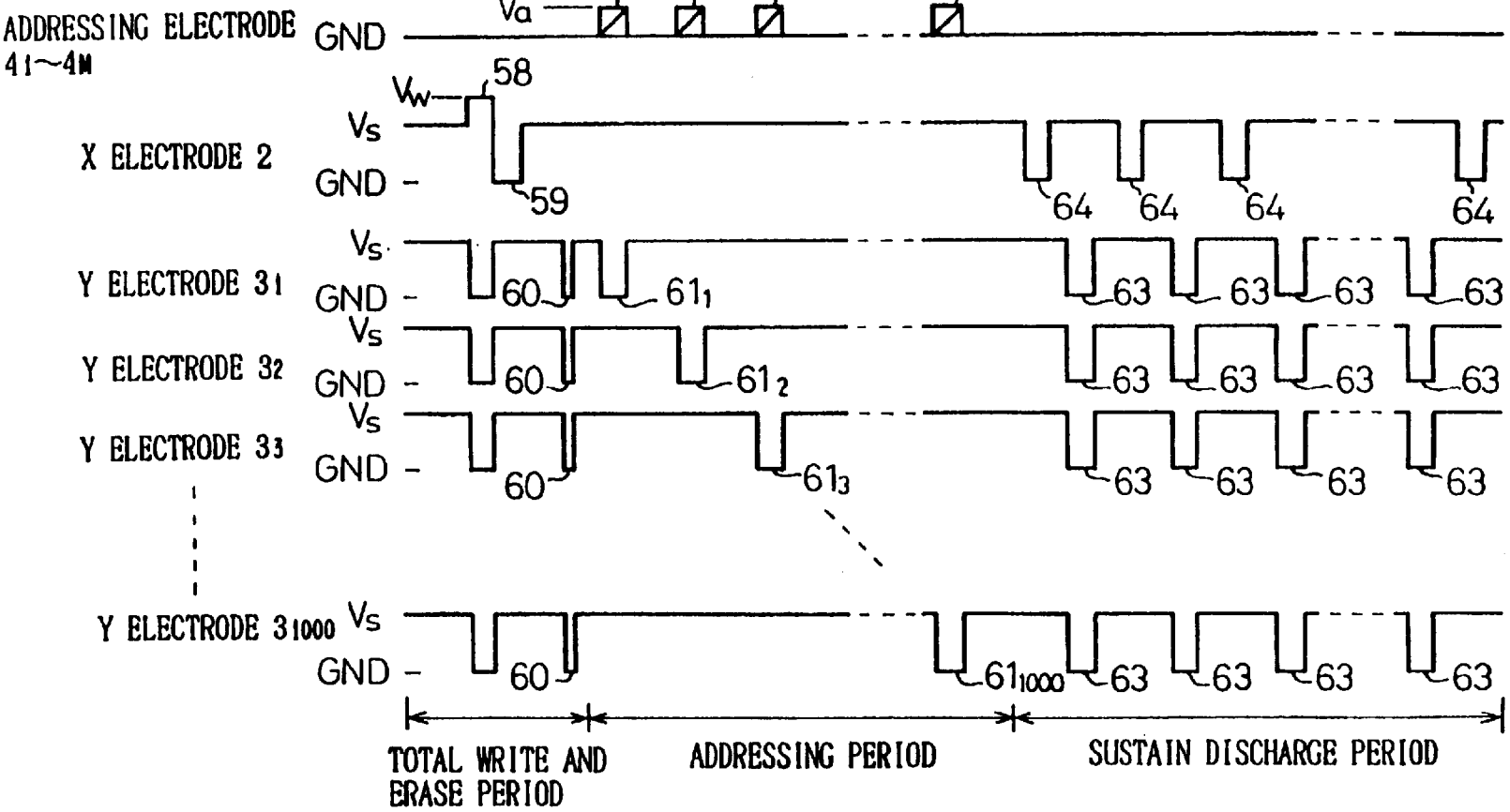
FIG. 23 is a waveform diagram showing a fifth embodiment of the present invention.

Fifth Embodiment of FIG. 23

FIG. 23 is a waveform diagram showing a fifth embodiment of the present invention. The figure shows one drive cycle. Similar to the first embodiment, the fifth embodiment drives the PDP of FIG. 1 according to, unlike the first embodiment, the separately addressing and sustain-discharging method.

According to the fifth embodiment, a frame is divided into a total write and erase period, an addressing period, and a sustain discharge period. The total write and erase period deals with discharge cells that have been ON in a preceding frame as well as discharge cells that have been OFF in the preceding frame, to equalize all discharge cells, i.e., to eliminate wall charges from all discharge cells.

During the total write and erase period, the Y electrodes $\mathbf{3}_1$ to $\mathbf{3}_{1000}$ are set to GND, and a write pulse 58 having a voltage of Vw is applied to the X electrode 2, to discharge all cells.

The potential of the Y electrodes $3_1$ to $3_{1000}$ is then returned to Vs, and a sustain discharge pulse 59 is applied to the X electrode 2, to carry out sustain discharge. A narrow erase pulse 60 is applied to the Y electrodes $3_1$ to $3_{1000}$, to carry out erase discharge. This completes the total write and erase operation.

During the addressing period, display data are sequentially written to the display lines from the display line $7_1$. At first, an addressing pulse $61_1$ having a potential level of GND is applied to the Y electrode $3_1$. An addressing pulse 62 having a voltage of Va is applied to selected ones of the addressing electrodes $4_1$ to $4_M$ that correspond to cells to be turned ON of the display line $7_1$, to discharge these cells. This completes the writing operation of display data to the display line $7_1$.

The above operation is repeated on the display lines $7_2$ to $7_{1000}$ sequentially, to write display data to all of the display lines $7_1$ to $7_{1000}$. Numerals $61_2$ to $61_{1000}$ are addressing pulses applied to the Y electrodes $3_2$ to $3_{1000}$, respectively.

During the sustain discharge period, sustain discharge pulses 63 and 64 are alternately applied to the Y electrodes $3_1$ to $3_{1000}$ and X electrode 2, to carry out sustain discharge and display an image for one frame.

In this way, the fifth embodiment carries out write discharge and then erase discharge in all cells of all display lines, to equalize these cells before writing display data thereto. The separately addressing and sustain-discharging method according to the fifth embodiment thus prevents a write error and displays a quality image.

Figure 24:
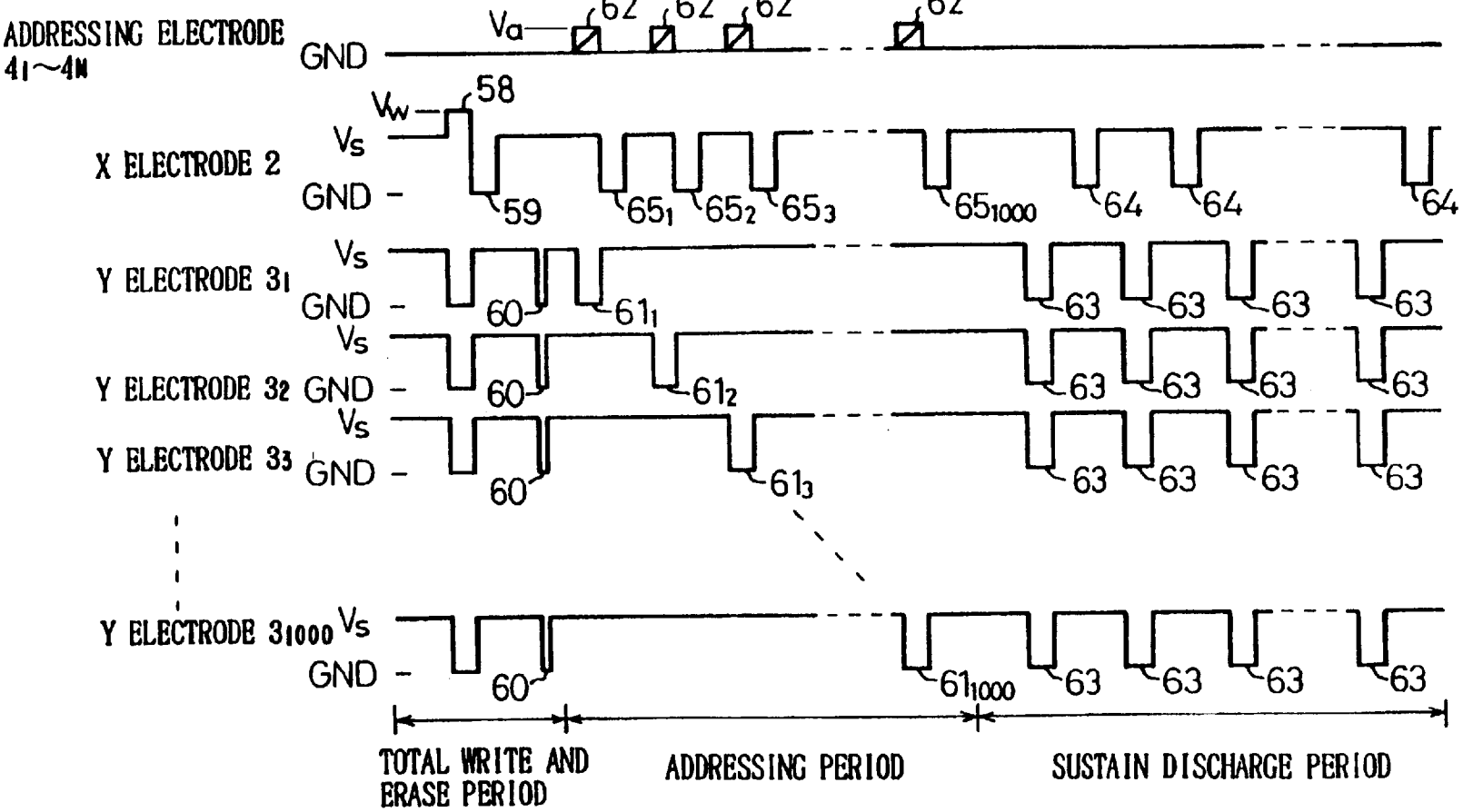
FIG. 24 is a waveform diagram showing a sixth embodiment of the present invention.

Sixth Embodiment of FIG. 24

FIG. 24 is a waveform diagram showing a sixth embodiment of the present invention. The figure shows one drive cycle. Similar to the first embodiment, the sixth embodiment drives the PDP of FIG. 1 according to, unlike the first embodiment, the separately addressing and sustain-discharging method.

The fifth embodiment (FIG. 23) applies the addressing pulses $61_1$ to $61_{1000}$ to the Y electrodes $3_1$ to $3_{1000}$, respectively, and the addressing pulse 62 to the addressing electrodes, to discharge and write display data to the display lines.

Such discharge may excessively accumulate wall charges, which will be destabilized by the application of the addressing pulse $61_1$, to cause discharge just after the application of the addressing pulse $61_1$ only with the voltage of the wall charges. If this happens, the wall charges will be neutralized.

The sixth embodiment is intended to solve this problem. Just after the application of each of the addressing pulses $61_1$ to $61_{1000}$, the sixth embodiment applies a corresponding one of the sustain discharge pulses $65_1$ to $65_{1000}$ to the X electrode 2, to stabilize wall charges up to the sustain discharge period.

Similar to the fifth embodiment, the separately addressing and sustain-discharging method according to the sixth embodiment prevents a write error, displays a quality image, and stabilizes wall charges after the writing of display data up to the sustain discharge period.

The sixth embodiment, however, sequentially applies the sustain discharge pulses $65_1$ to $65_{1000}$ to the X electrodes 2 after the respective write addressing operations during the addressing period, even to cells of display lines where no display data are written.

For example, when display data is written to the display line $7_1$, the sustain discharge pulse $65_1$ is applied even to the display lines $7_2$ to $7_{1000}$ to which no display data are written. Similarly, when display data is written to the display line $7_2$, the sustain discharge pulse $65_2$ is applied even to the display lines $7_1$ and $7_3$ to $7_{1000}$ to which no display data are written.

Figure 25:
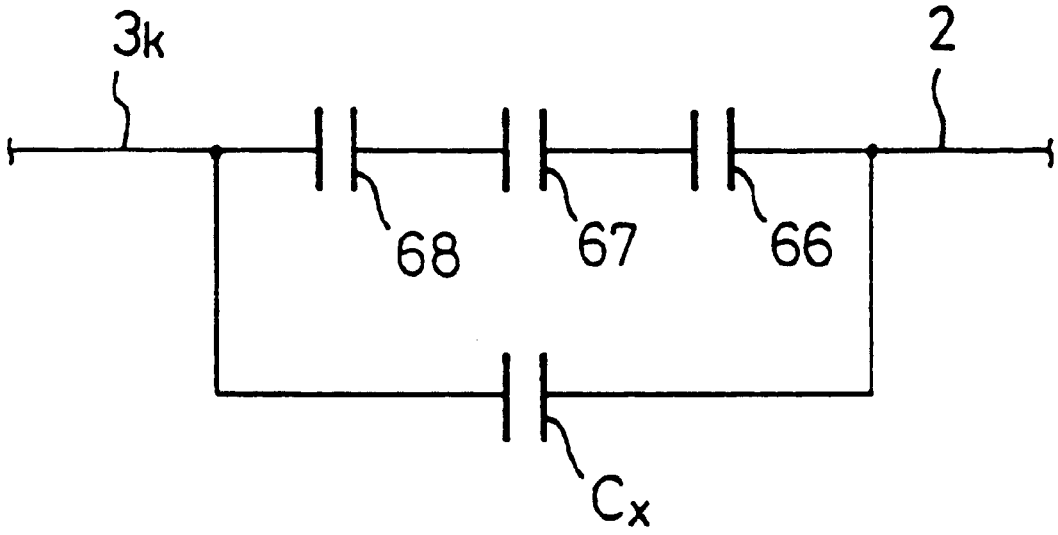
FIG. 25 is a view showing capacitance present between X and Y electrodes.

As shown in FIG. 25, a gap between the X electrode 2 and the Y electrode $3_K$ involves capacitance 66 due to the dielectric layer between the X electrode 2 and the discharge space, capacitance 67 due to the discharge cavity between the surface of the dielectric layer over the X electrode 2 and the surface of the dielectric layer over the Y electrode $3_K$, and capacitance 68 due to the dielectric layer between the Y electrode $3_K$ and the discharge cavity. Also, capacitance Cx that does not involve the discharge cavity is present between the X electrode 2 and the Y electrode $3_K$ because these electrodes are formed on the same substrate.

When a sustain discharge pulse is applied to discharge cells of display lines to which no display data are written during an addressing period, a charging or discharging current flows to the capacitance (the capacitance Cx that does not involve the discharge space) of the cells of the display lines where no display data are written, to thereby increase power consumption. The seventh embodiment explained below is to reduce such power consumption.

Seventh Embodiment of FIGS. 26 to 29

Figure 26:
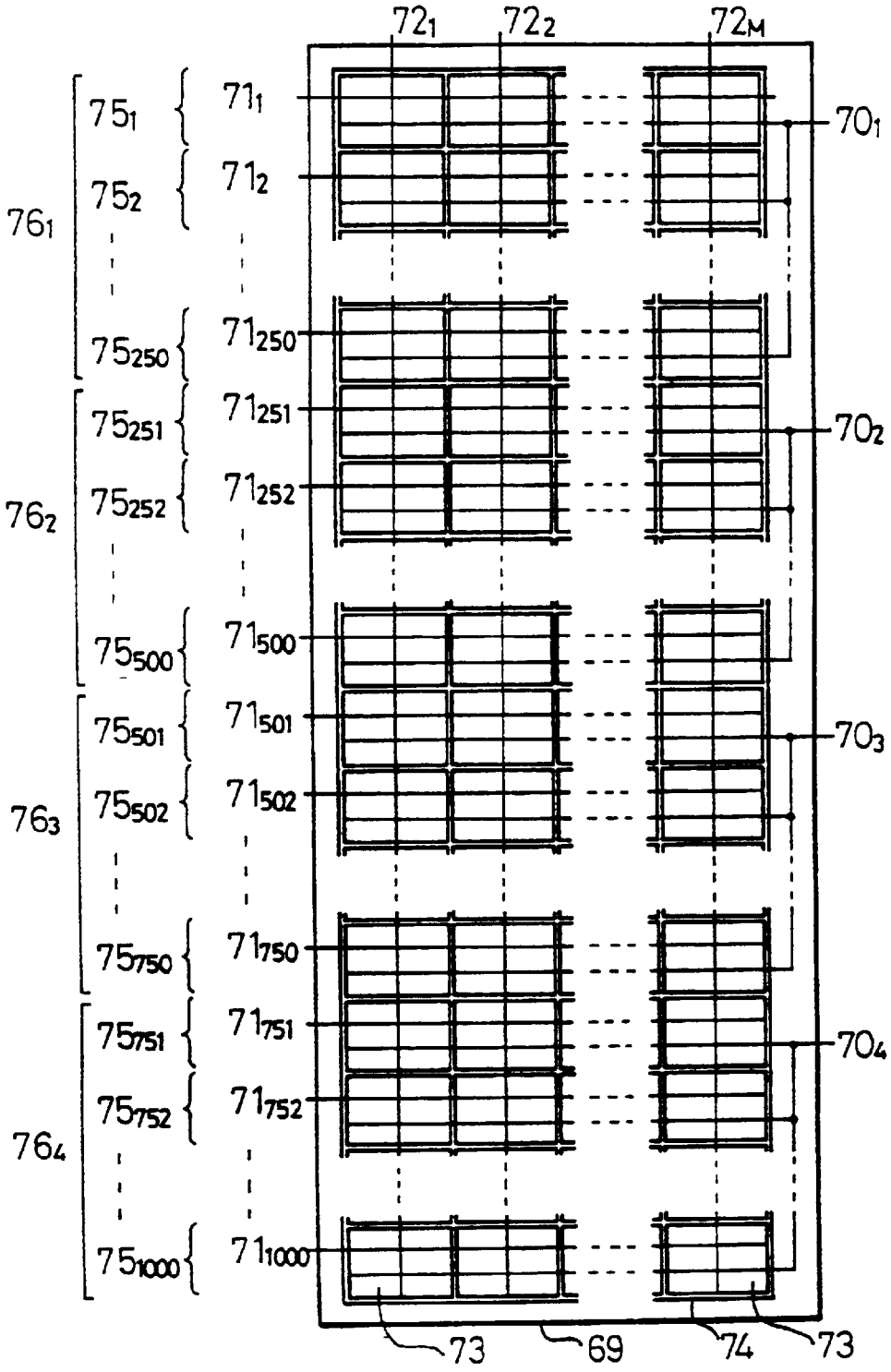
FIG. 26 is a plan view schematically showing a seventh embodiment of the present invention.

FIG. 26 is a plan view schematically showing a seventh embodiment of the present invention. In the figure, numeral 69 is a panel, $70_1$ to $70_4$ are X electrodes, $71_1$ to $71_{1000}$ are Y electrodes, $72_1$ to $72_M$ are addressing electrodes, and 73 is a cell. There are M×1000 cells 73 each located at an intersection of a pair of the X and Y electrodes and one addressing electrode. Numeral 74 is a wall partitioning the cells 73, and $75_1$ to $75_{1000}$ are display lines.

According to the seventh embodiment, the display lines $75_1$ to $75_{1000}$ are grouped into four blocks $76_1$ to $76_4$ containing consecutive 250 display lines $75_1$ to $75_{250}$, $75_{251}$ to $75_{500}$, $75_{501}$ to $75_{750}$, and $75_{751}$ to $75_{1000}$, respectively. These blocks $76_1$ to $76_4$ have X electrodes $70_1$ to $70_4$, respectively.

Figure 27:
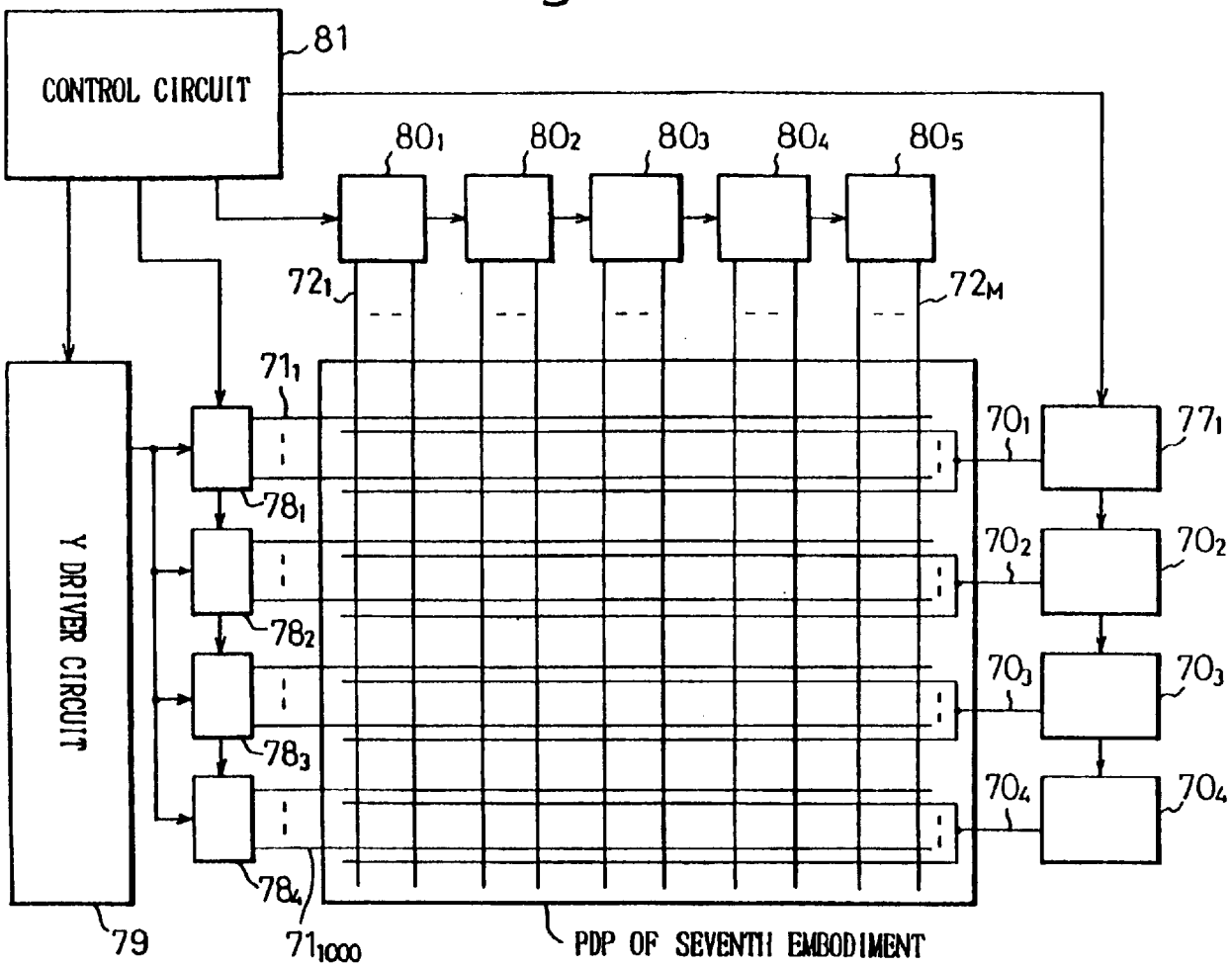
FIG. 27 is a view showing a seventh embodiment of the present invention and peripheral circuits thereof.

FIG. 27 shows the PDP according to the seventh embodiment and peripheral circuits thereof. In the figure, numerals $77_1$ to $77_4$ are X driver circuits for supplying write pulses and sustain discharge pulses to the X electrodes $70_1$ to $70_4$, $78_1$ is a Y driver IC for supplying addressing pulses to the Y electrodes $71_1$ to $71_{250}$, $78_2$ is a Y driver IC for supplying addressing pulses to the Y electrodes $71_{251}$ to $71_{500}$, $78_3$ is a Y driver IC for supplying addressing pulses to the Y electrodes $71_{501}$ to $71_{750}$, $78_4$ is a Y driver IC for supplying addressing pulses to the Y electrodes $71_{751}$ to $71_{1000}$, 79 is a Y driver circuit for supplying pulses other than the addressing pulses to the Y electrodes $71_1$ to $71_{1000}$, $80_1$ to $80_5$ are addressing driver ICs for supplying addressing pulses to the addressing electrodes $72_1$ to $72_M$, and 81 is a control circuit for controlling the X driver circuits $77_1$ to $77_4$, Y driver ICs $78_1$ to $78_4$, Y driver circuit 79, and addressing driver ICs $80_1$ to $80_5$.

Figure 28:
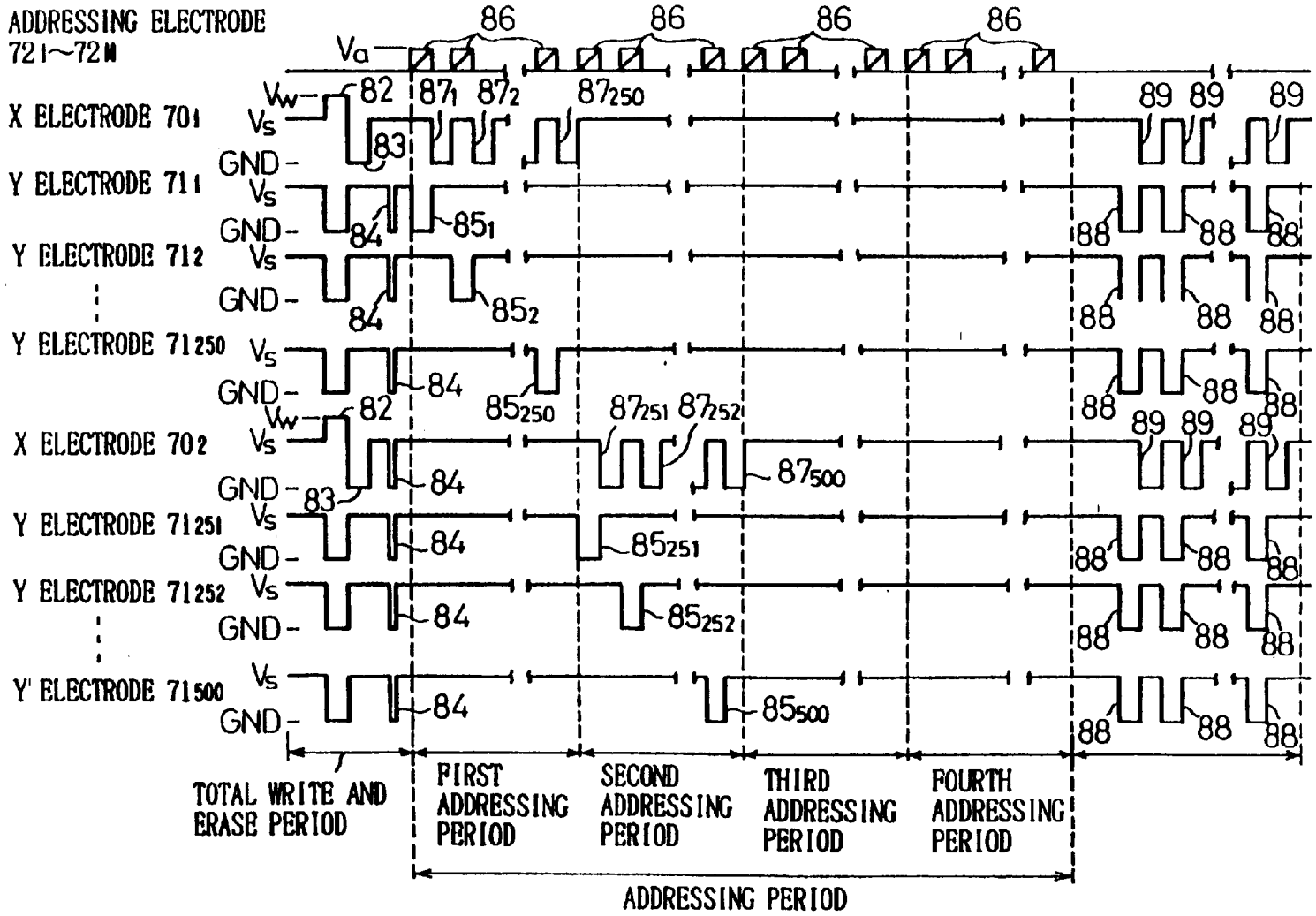
FIG. 28 is a waveform diagram showing a method of driving a seventh embodiment of the present invention.
Figure 29:
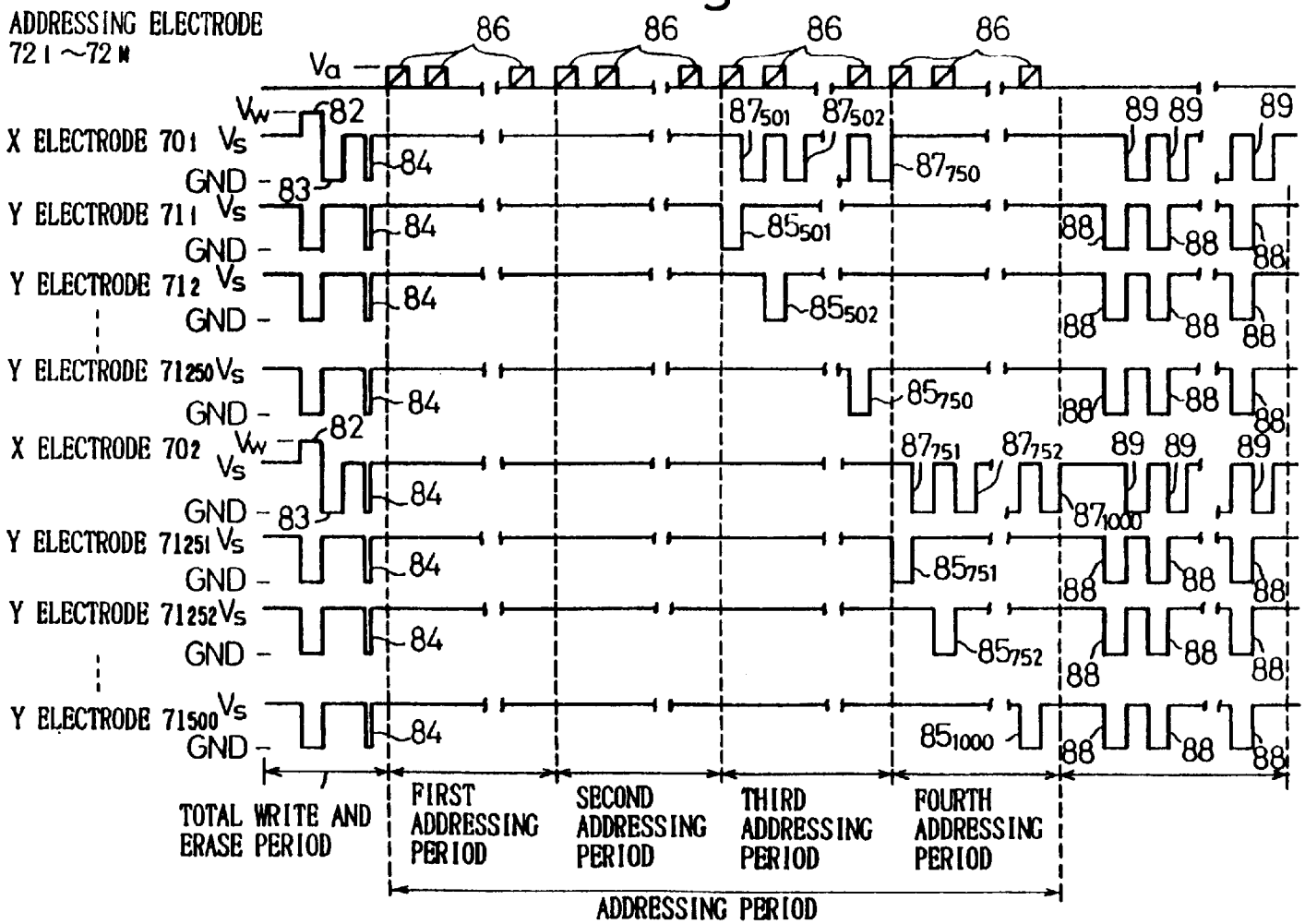
FIG. 29 is a waveform diagram showing a method of driving a seventh embodiment of the present invention.

FIGS. 28 and 29 are waveform diagrams each showing a method of driving the PDP of the seventh embodiment. According to this embodiment, a frame is divided into a total wire and erase period, an addressing period, and a sustain discharge period. The addressing period is further divided into first to fourth addressing periods.

During the total write and erase period, the potential of the Y electrodes $71_1$ to $71_{1000}$ is set to GND, and a write pulse 82 having a voltage of Vw is applied to the X electrodes $70_1$ to $70_4$, to discharge all cells of all of the display lines $75_1$ to $75_{1000}$.

The potential of the Y electrodes $71_1$ to $71_{1000}$ is then returned to Vs, and a sustain discharge pulse 83 is applied to the X electrodes $70_1$ to $70_4$, to carry out sustain discharge. A narrow erase pulse 84 is applied to the Y electrodes $71_1$ to $71_{1000}$, to carry out erase discharge. This completes the total write and erase operation.

During the addressing period, display data are written to the display lines sequentially from the display line $75_1$. During the first addressing period, an addressing pulse $85_1$ having a potential level of GND is applied to the Y electrode $71_1$. At the same time, an addressing pulse 86 having a voltage of Va is applied to selected ones of the addressing electrodes $72_1$ to $72_M$ that correspond to cells to be turned ON, to discharge these cells.

Immediately after that, a sustain discharge pulse $87_1$ is applied to the X electrode $70_1$, to carry out sustain discharge for stabilizing wall charges up to the sustain discharge period. This completes the writing of display data to the display line $75_1$.

The same operations are repeated for the display lines $75_2$ to $75_{250}$ sequentially, so that display data are written to all of the display lines $75_1$ to $75_{250}$ in the block $76_1$.

Numerals $85_2$ to $85_{250}$ are addressing pulses sequentially applied to the Y electrodes $71_2$ to $71_{250}$, respectively, and $87_2$ to $87_{250}$ are sustain discharge pulses sequentially applied to the X electrodes $70_1$ after the respective addressing pulses $85_2$ to $85_{250}$.

During the second addressing period, an addressing pulse $85_{251}$ having a potential level of GND is applied to the electrode $71_{251}$. At the same time, an addressing pulse 86 having a voltage of Va is applied to selected ones of the addressing electrodes $72_1$ to $72_M$ that correspond to cells to be turned ON, to discharge these cells.

Immediately after that, a sustain discharge pulse $87_{251}$ is applied to the X electrode $70_2$, to carry out sustain discharge for stabilizing wall charges up to the sustain discharge period. This completes the writing of display data to the display line $75_{251}$.

The same operations are repeated for the display lines $75_{252}$ to $75_{500}$ sequentially, so that display data are written to all of the display lines $75_{252}$ to $75_{500}$ in the block $76_2$.

Numerals $85_{252}$ to $85_{500}$ are addressing pulses sequentially applied to the Y electrodes $71_{252}$ to $71_{500}$, respectively, and $87_{252}$ to $87_{500}$ are sustain discharge pulses sequentially applied to the X electrodes $70_2$ after the respective addressing pulses $85_{252}$ to $85_{500}$.

During the third addressing period, an addressing pulse $85_{501}$ having a potential level of GND is applied to the Y electrode $71_{501}$. At the same time, an addressing pulse 86 having a voltage of Va is applied to selected ones of the addressing electrodes $72_1$ to $72_M$ that correspond to cells to be turned ON, to discharge these cells.

Immediately after that, a sustain discharge pulse $87_{501}$ is applied to the X electrode $70_3$, to carry out sustain discharge for stabilizing wall charges up to the sustain discharge period. This completes the writing of display data to the display line $75_{501}$.

The same operations are repeated for the display lines $75_{502}$ to $75_{750}$ sequentially, so that display data are written to all of the display lines $75_{502}$ to $75_{750}$ in the block $76_3$.

Numerals $85_{502}$ to $85_{750}$ are addressing pulses sequentially applied to the Y electrodes $71_{502}$ to $71_{750}$, respectively, and $87_{502}$ to $87_{750}$ are sustain discharge pulses sequentially applied to the X electrodes $70_3$ after the respective addressing pulses $85_{502}$ to $85_{750}$.

During the fourth addressing period, an addressing pulse $85_{751}$ having a potential level of GND is applied to the Y electrode $71_{751}$. At the same time, an addressing pulse 86 having a voltage of Va is applied to selected ones of the addressing electrodes $72_1$ to $72_M$ that correspond to cells to be turned ON, to discharge these cells.

Immediately after that, a sustain discharge pulse $87_{751}$ is applied to the X electrode $70_4$, to carry out sustain discharge for stabilizing wall charges up to the sustain discharge period. This completes the writing of display data to the display line $75_{751}$.

The same operations are repeated for the display lines $75_{752}$ to $75_{1000}$ sequentially, so that display data are written to all of the display lines $75_{752}$ to $75_{1000}$ in the block $76_4$.

Numerals $85_{752}$ to $85_{1000}$ are addressing pulses sequentially applied to the Y electrodes $71_{752}$ to $71_{1000}$, respectively, and $87_{752}$ to $87_{1000}$ are sustain discharge pulses sequentially applied to the X electrodes $70_4$ after the respective addressing pulses $85_{752}$ to $85_{1000}$.

Next, during the sustain discharge period, sustain discharge pulses 88 and 89 having a potential level of GND are alternately applied to the Y electrodes $71_1$ to $71_{1000}$ and X electrodes $70_1$ to $70_4$, to carry out sustain discharge to display an image for one frame.

In this way, the seventh embodiment carries out write discharge and then erase discharge in all cells of all display lines, to equalize these cells before writing display data thereto. The separately addressing and sustain-discharging method according to the seventh embodiment thus prevents a write error, displays a quality image, and maintains a stabilized state of wall charges up to a sustain discharge period after writing display data to the display lines.

As mentioned above, the seventh embodiment groups the display lines $75_1$ to $75_{1000}$ into the four blocks $76_1$ to $76_4$ containing the consecutive 250 display lines $75_1$ to $75_{250}$, $75_{251}$ to $75_{500}$, $75_{501}$ to $75_{750}$, and $75_{751}$ to $75_{1000}$, respectively. These blocks $76_1$ to $76_4$ have the X electrodes $70_1$ to $70_4$, respectively. During the addressing period, a sustain discharge pulse for stabilizing wall charges is applied only to the X electrode of the block that contains a display line to which display data is written.

Accordingly, during the first addressing period, the sustain discharge pulses $87_1$ to $87_{250}$ to the X electrode $70_1$ are applied only to the cells of the display lines $75_1$ to $75_{250}$ in the block $76_1$ but not to the cells of the display lines $75_{251}$ to $75_{1000}$ of the other blocks $76_2$, $76_3$, and $76_4$.

During the second addressing period, the sustain discharge pulses $87_{251}$ to $87_{500}$ to the X electrode $70_2$ are applied only to the cells of the display lines $75_{251}$ to $75_{500}$ in the block $76_2$ but not to the cells of the display lines $75_1$ to $75_{250}$, and $75_{501}$ to $75_{1000}$ of the other blocks $76_1$, $76_3$, and $76_4$.

During the third addressing period, the sustain discharge pulses $87_{501}$ to $87_{750}$ to the X electrode $70_3$ are applied only to the cells of the display lines $75_{501}$ to $75_{750}$ in the block $76_3$ but not to the cells of the display lines $75_1$ to $75_{500}$, and $75_{751}$ to $75_{1000}$ of the other blocks $76_1$, $76_2$, and $76_4$.

During the fourth addressing period, the sustain discharge pulses $87_{751}$ to $87_{100}$ to the X electrode $70_4$ are applied only to the cells of the display lines $75_{751}$ to $75_{1000}$ in the block $76_4$ but not to the cells of the display lines $75_1$ to $75_{750}$ of the other blocks $76_1$, $76_2$, and $76_3$.

In this way, according to the seventh embodiment, the sustain discharge pulses $87_1$ to $87_{1000}$ to the X electrodes $70_1$ to $70_4$ are applied only to the cells of corresponding 250 display lines during the addressing period, so that, compared with the sixth embodiment that applies sustain discharge pulses to all cells of all 1000 display lines, the seventh embodiment reduces the power consumption of sustain discharge pulses applied to the X electrodes to one fourth.

The seventh embodiment groups display lines into four blocks and provides each block with X electrodes connected together. According to the present invention, display lines may be grouped into "n" blocks ("n" being an optional number) each being provided with X electrodes connected together. In this case, the power consumption of sustain discharge pulses applied to the X electrodes during the addressing period can be reduced to 1/n of that of the sixth embodiment.

Figure 7:
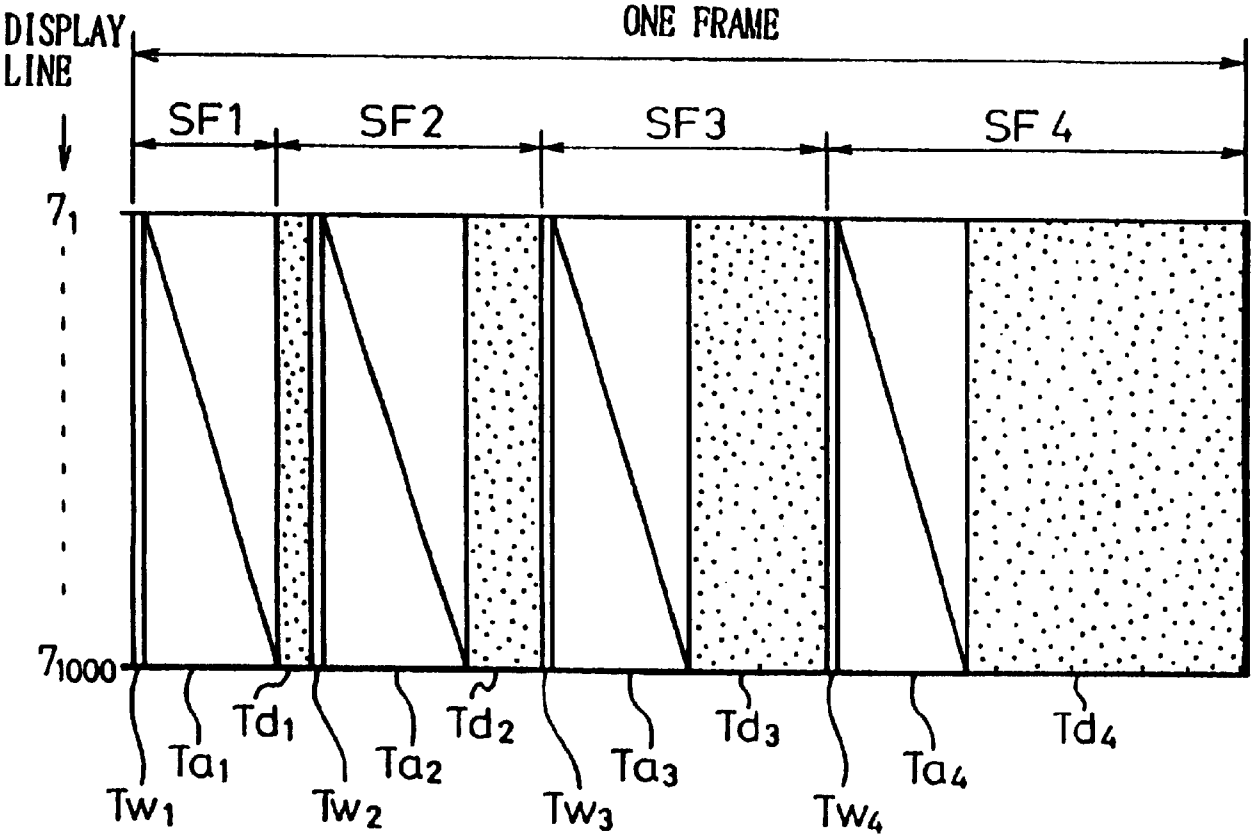
Fig. 7 PRIOR ART
FIG. 7 is a view explaining a method of displaying 16 intensity levels.
Figure 8:
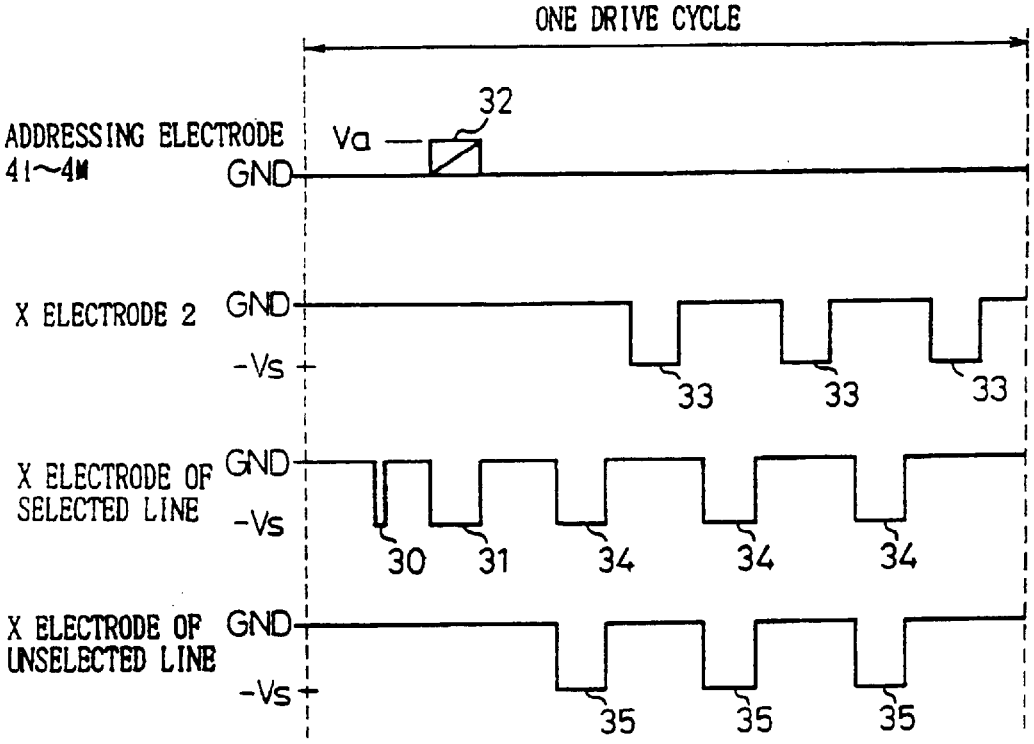
Fig. 8 PRIOR ART
FIG. 8 is a waveform diagram showing a third conventional method of driving the PDP of FIG. 1.

To provide multiple intensity levels, for example, 16 intensity levels, a frame is divided into four subframes SF1, SF2, SF3, and SF4 as shown in FIG. 7, and the operations explained above are carried out in each of the subframes. The number of sustain discharge pulses applied to the X electrode during an addressing period is larger than that of a single intensity level, so that the effect of reducing the power consumption in the multiple intensity levels is more conspicuous than in the single intensity level.

Eighth Embodiment of FIGS. 30 to 44

FIGS. 30 to 43 show an eighth embodiment of the present invention. This embodiment relates to a three-electrode surface-discharge AC PDP having sustain discharge electrodes of X-Y-Y-X arrangement (the arrangement of FIG. 13). To drive this PDP, the eighth embodiment turns ON all cells, erases all the cells, and addresses the cells to write display data thereto. This embodiment employs an addressing period and a sustain discharge period that are independent of each other.

Figure 30:
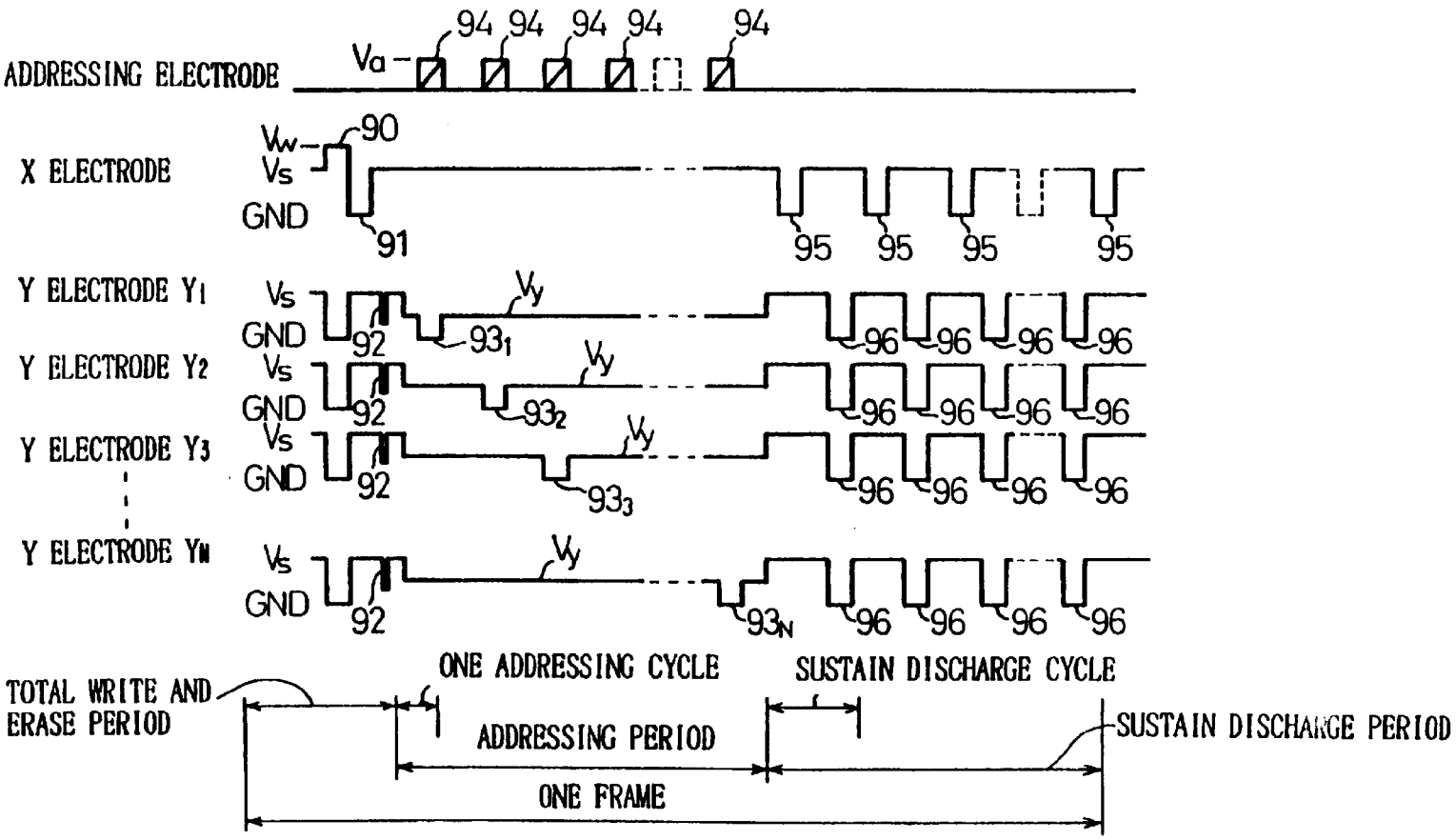
FIG. 30 is a waveform diagram showing an eighth embodiment of the present invention.

FIG. 30 is a waveform diagram showing the embodiment. The figure shows one drive cycle of a write addressing method according to the embodiment. Each frame comprises a total write and erase period, an addressing period, and a sustain discharge period. The total write and erase period deals with cells that have been ON in a preceding frame as well as cells that have been OFF in the preceding frame, to equalize all cells, i.e., to eliminate wall charges from all cells. Alternatively, the total write and erase period equalizes all cells with these cells keeping residual wall charges.

During the total write and erase period, the Y electrodes $Y_1$ to $Y_N$ are set to GND, and a write pulse 90 having a voltage of Vw is applied to the X electrode, to discharge all cells.

The potential of the Y electrodes $Y_1$ to $Y_N$ is then returned to Vs, and a discharge pulse 91 is applied to the X electrode, to carry out sustain discharge. A narrow erase pulse 92 is applied to the Y electrodes $Y_1$ to $Y_N$, to carry out erase discharge. This completes the total write and erase operation.

During the addressing period, display data are written to the display lines sequentially. At first, addressing pulses $\mathbf{93}_1$ to $\mathbf{93}_N$ having a potential level of GND are sequentially applies to the Y electrodes $Y_1$ to $Y_N$, respectively. In each of the addressing operations, an addressing pulse 94 having a voltage of Va is applied to selected ones of the addressing electrodes $A_1$ to $A_M$ that correspond to cells to be turned ON of the addressed display line, to discharge these cells. Consequently, display data are written to the display lines. During the sustain discharge period, sustain discharge pulses 95 and 96 are alternately applied to the Y electrodes $Y_1$ to $Y_N$ and X electrodes, to carry out sustain discharge and display an image for one frame.

During the addressing period, this embodiment changes the voltage applied to the Y electrodes $Y_1$ to $Y_N$ between the potential GND of the addressing pulses $\mathbf{93}_1$ to $\mathbf{93}_N$ and an intermediate potential Vy (preferably Vy=Va) that is intermediate between GND and Vs. Namely, this embodiment applies the addressing pulse of GND to the Y electrode of a selected line and the voltage Vy to the Y electrodes of the other unselected lines.

Figure 31A:
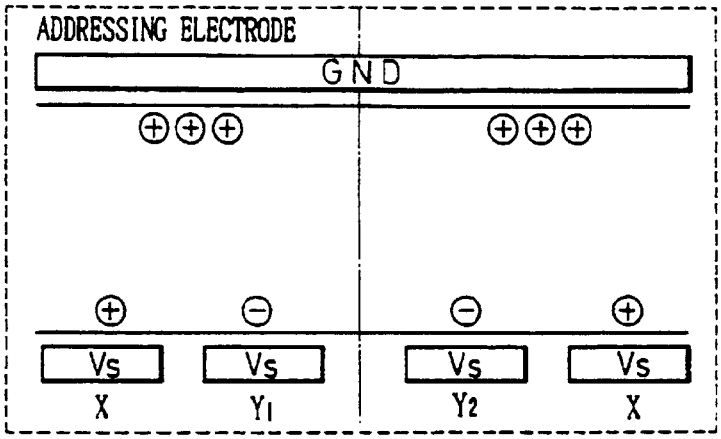
FIGS. 31(a) to 31(c) are models each showing an operation of an eighth embodiment of the present invention.
Figure 31B:
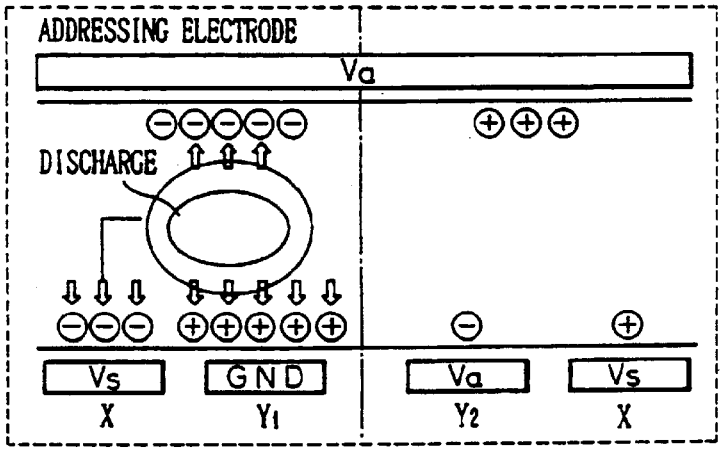
Figure 31C:
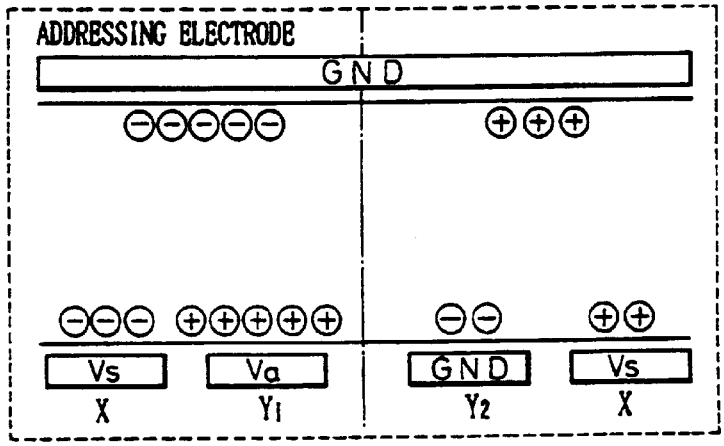

FIGS. 31(a) to 31(c) are models of the driving method (the write addressing method) of FIG. 30. FIG. 31(a) shows a state after the total write and erase operation. All cells are equalized. Under this state, the addressing electrode is at GND, and two Y electrodes ($Y_1$, $Y_2$) adjacent to the X electrodes are at Vs. In FIG. 31(b), the addressing pulse $\mathbf{93}_1$ (GND) is applied to the Y electrode $Y_1$, to carry out addressing discharge. The addressing electrode is at Va, and the electrode $Y_1$ is at GND. Under this state, positive wall charges (whose level is expressed as $V_{WY1}$ for the sake of convenience) are produced over the electrode $Y_1$ by the addressing discharge. In FIG. 31(c), the addressing pulse $\mathbf{93}_2$ (GND) is applied to the adjacent Y electrode ($Y_2$). Under this state, the voltage Vy (=Va) is applied to the electrode $Y_1$. Since the positive wall charges $V_{WY1}$ are accumulated over the electrode $Y_1$, an effective voltage applied to the discharge cavity between the electrodes $Y_1$ and $Y_2$ is given as $Va+V_{WY1}$, if no write discharge occurs between the electrode $Y_2$ and the addressing electrode. (In this case, wall charges above the electrode $Y_2$ are negligible.) Generally, $Va+V_{WY1}<Vf$(Vf being a discharge start voltage), so that abnormal discharge in the discharge space between the adjacent two Y electrodes ($Y_1$, $Y_2$) is avoidable and the wall charges $V_{WY1}$ over the electrode $Y_1$ are kept as they are.

Figure 32:
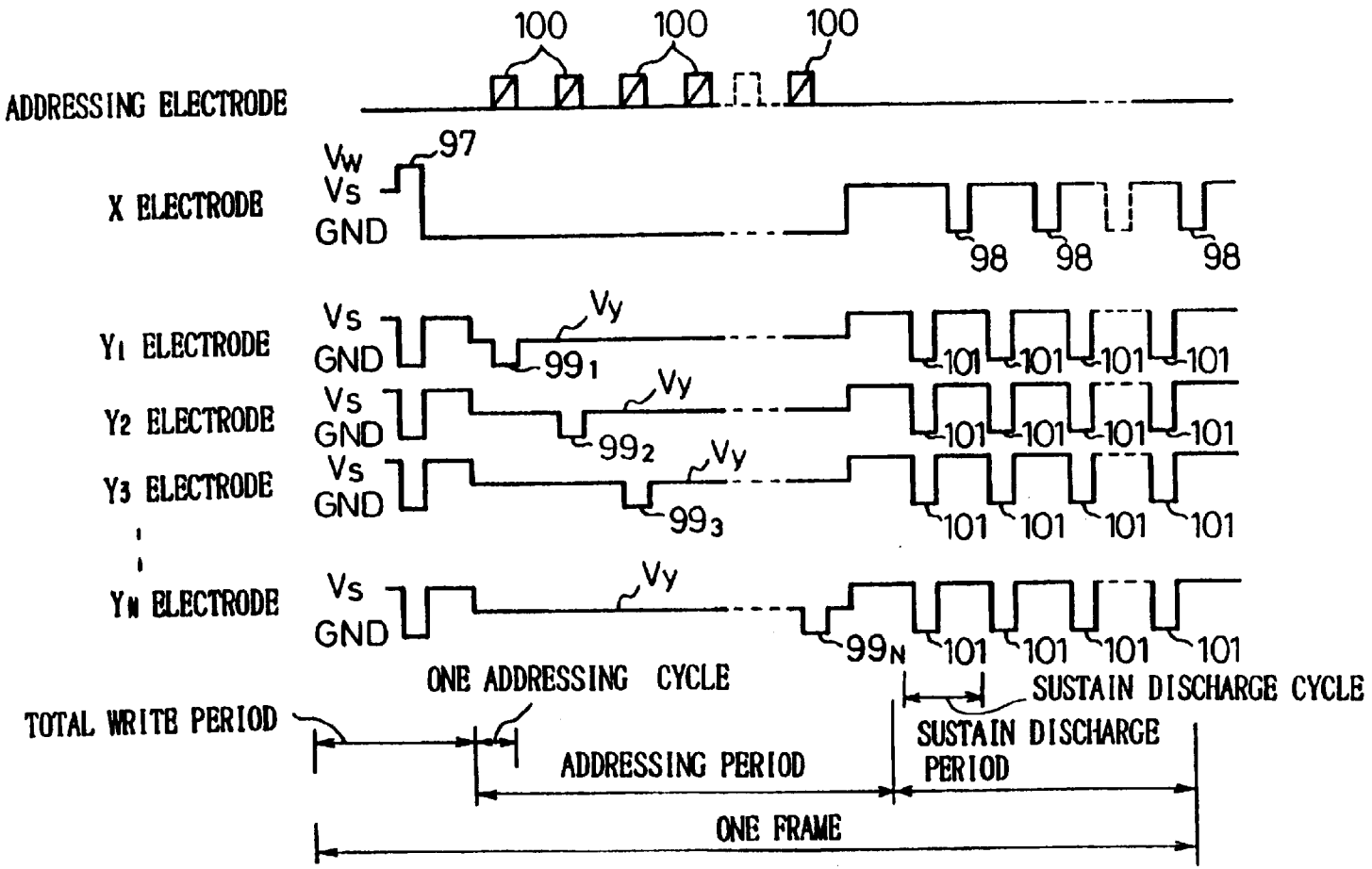
FIG. 32 is another waveform diagram showing an eighth embodiment of the present invention.

FIG. 32 is another waveform diagram according to the embodiment. The figure shows one drive cycle of an erase addressing method. Similar to FIG. 30, each frame is divided into a total write period, an addressing period, and a sustain discharge period.

During the total write period, the Y electrodes $Y_1$ to $Y_N$ are set to GND, and a write pulse 97 having a voltage of Vw is applied to the X electrode, to discharge all cells. The potential of the Y electrodes $Y_1$ to $Y_N$ is then returned to Vs, and the same potential level (GND) as that of a sustain discharge pulse 98 is applied to the X electrode, to carry out sustain discharge.

During the addressing period, display data are written to the display lines sequentially. At first, addressing pulses $\mathbf{99}_1$ to $\mathbf{99}_N$ having potential level of GND are sequentially applied to the Y electrodes $Y_1$ to $Y_N$, respectively. In each of the addressing operations, an addressing pulse 100 having a voltage of Va is applied to selected ones of the addressing electrodes $A_1$ to $A_M$ that corresponds to cells in which no sustain discharge is to be carried out, i.e., cells which are not turned ON of the addressed display line, to carry out erase discharge in these cells. Consequently, display data are written to the display lines. During the sustain discharge period, sustain discharge pulses 98 and 101 are alternately applied to the Y electrodes $Y_1$ to $Y_N$ and X electrodes, to carry out sustain discharge and display an image for one frame.

Figure 33A:
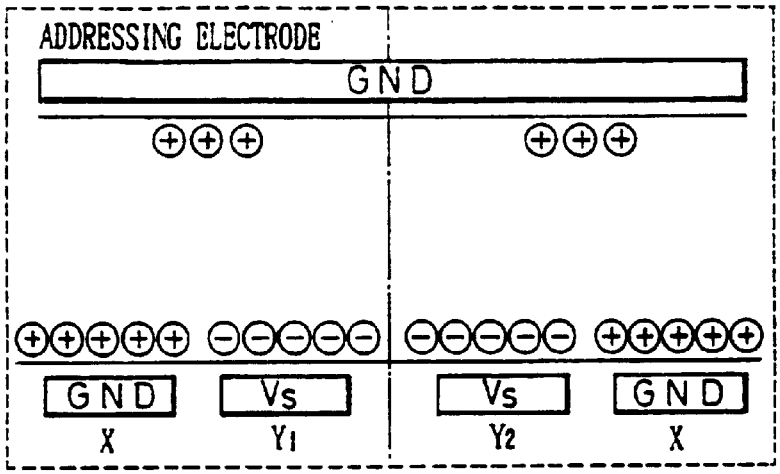
FIGS. 33(a) to 33(c) are other models each showing an operation of an eighth embodiment of the present invention.
Figure 33B:
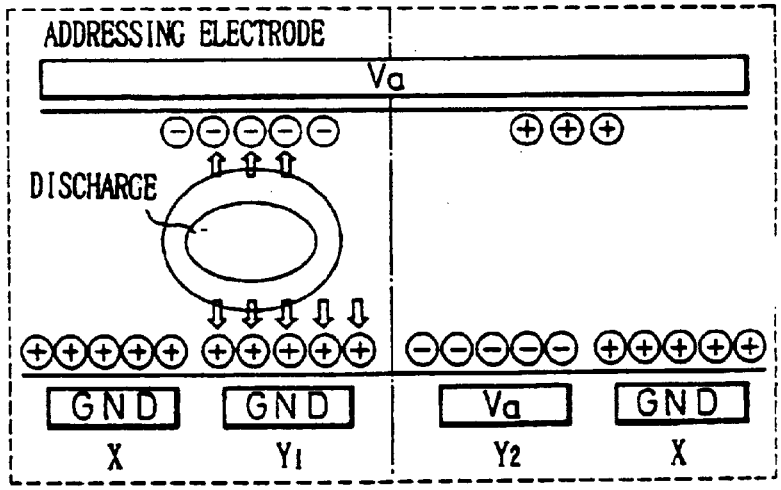
Figure 33C:
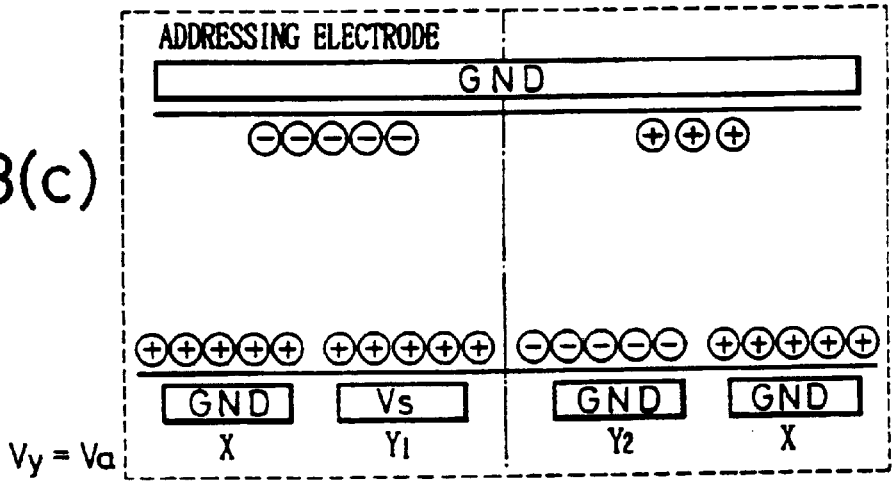

FIGS. 33(a) to 33(c) show models of the driving method (the erase addressing method) of FIG. 32. FIG. 33(a) shows a condition that wall charges have been produced in every cell by total writing and thereafter a sustain discharge has been already executed. The addressing electrode is at GND, and two Y electrodes ($Y_1$, $Y_2$) adjacent to the X electrodes are at Vs. FIG. 33(b) shows that the addressing pulse $\mathbf{99}_1$ (GND) is applied to the electrode $Y_1$ to carry out erase discharge (addressing discharge). The addressing electrode is at Va, and the electrode $Y_2$ is at Va. The discharge produces positive wall charges over the dielectric layer in the vicinity of the electrode $Y_1$. Since the positive wall charges are present over the X electrodes, the addressing discharge causes the X and $Y_1$ electrodes to have positive wall charges, so that no sustain discharge will occur thereafter even if sustain discharge pulses are applied. FIG. 33(c) shows that the addressing pulse $\mathbf{99}_2$ (GND) has been applied to the adjacent Y electrode ($Y_2$). Under this state, the electrode $Y_1$ receives a voltage of Vy (=Va), and the electrode $Y_2$ receives GND. Although the electrode $Y_1$ has the positive wall charges (whose level is expressed as $V_{WY1}$ for the sake of convenience), an effective voltage ($Va+V_{WY1}$) applied to the discharge cavity between the adjacent two Y electrodes ($Y_1$, $Y_2$) does not exceed the discharge start voltage Vf, if no write discharge occurs between the electrode $Y_2$ and the addressing electrode, so that, similar to the write addressing method, abnormal discharge is avoidable and the wall charges over the electrode $Y_1$ is kept as they are.

Figure 34:
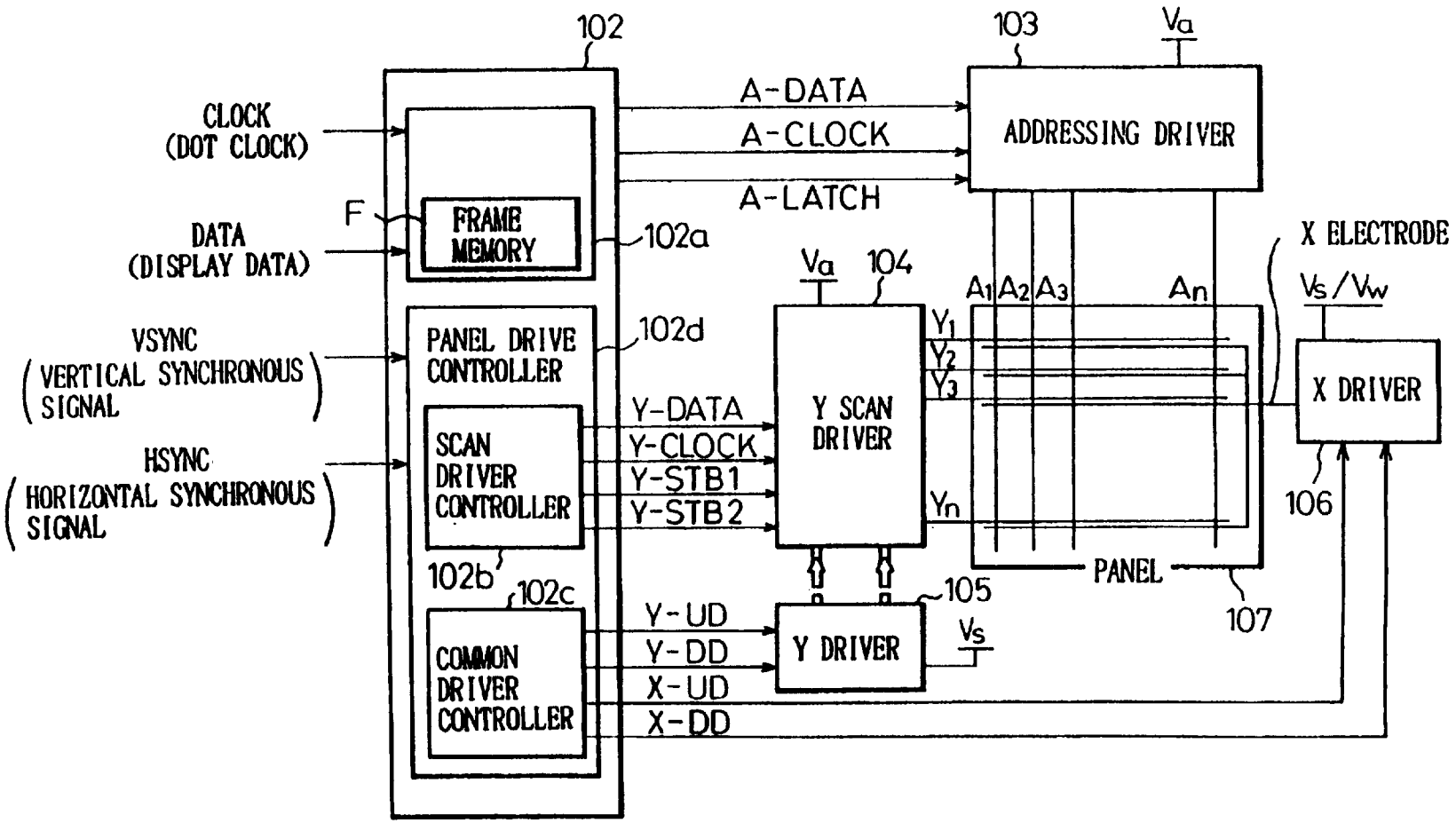
FIG. 34 is a block diagram showing a PDP employing an eight embodiment of the present invention.

FIG. 34 is a block diagram showing a PDP driven by the method of the eighth embodiment. In the figure, numeral 102 is a controller including a display data controller 102a and a panel drive controller 102d. The display data controller 102a includes a frame memory F. The panel drive controller 102d includes a scan driver controller 102b and a common driver controller 102c. Numeral 103 is an addressing driver, 104 is a Y scan driver, 105 is a Y driver, 106 is an X driver, and 107 is a display panel. The addressing driver 103 sequentially selects addressing electrodes $A_1$ to $A_M$ and applies a voltage of Va thereto, according to display data A-DATA, transfer clock A-CLOCK, and latch clock A-LATCH provided by the control circuit 102.

The Y scan driver 104, Y driver 105, and X driver 106 drive Y electrodes $Y_1$ to $Y_N$ and X electrode at predetermined voltages (Vs, Va, Vw) according to scan data Y-DATA, Y clock Y-CLOCK, first Y strobe YSTB1, second Y strobe YSTB2, Y up drive signal Y-UD, Y down drive signal Y-DD, X up drive signal X-UD, and X down drive signal X-DD provided by the control circuit 102.

Figure 35:
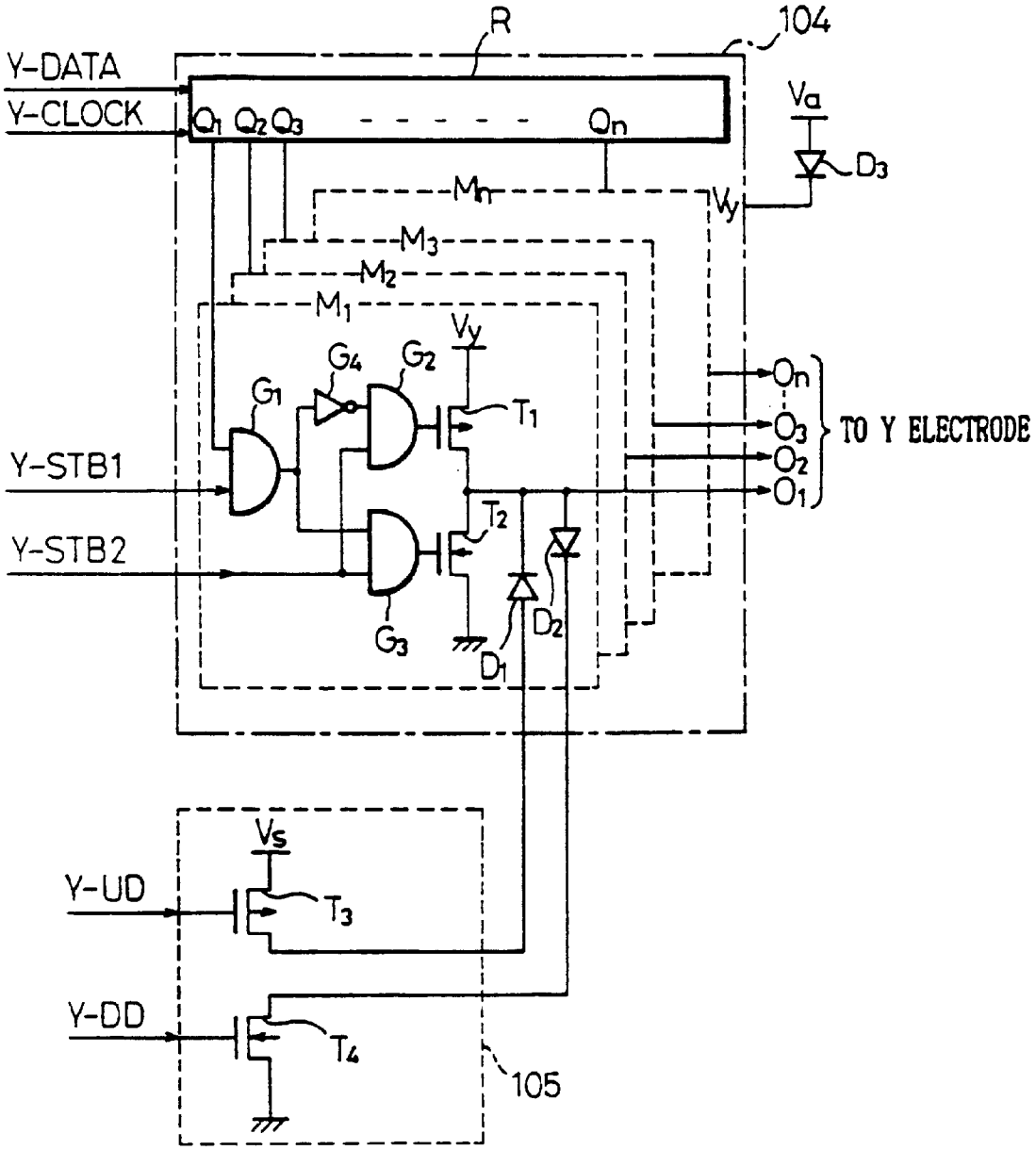
FIG. 35 is a view showing an arrangement including a Y scan driver and a Y driver.

FIG. 35 is a schematic view showing the Y scan driver 104 and Y driver 105. The Y scan driver 104 has electrode selection circuits $M_1$ to $M_n$ provided for the Y electrodes, respectively, and a shift register R for generating signals $Q_1$ to $Q_n$ for sequentially specifying the electrode selection circuits $M_1$ to $M_n$. Each ($M_1$ is shown as an example) of the electrode selection circuits complementarily turns ON and OFF two MOS transistors $T_1$ and $T_2$ (when one is ON, the other is OFF) during an addressing period according to an output of a logical circuit, which comprises three AND gates $G_1$ to $G_3$ and an inverter gate $G_4$.

When the transistor $T_1$ is ON, a predetermined voltage Vy (which is Va given through the blocking diode $D_3$) appears as an output $O_1$. When the transistor $T_2$ is ON, the ground potential GND appears as the output $O_1$. Namely, the Y scan driver 104 turns ON and OFF (ON=GND, OFF=Vy) a pulse (an addressing pulse) for selecting one of the Y electrodes during an addressing period. The output $O_1$ is connected to two MOS transistors $T_3$ and $T_4$ of the Y driver 105 through the diodes $D_1$ and $D_2$. The transistors $T_3$ and $T_4$ turn ON and OFF (ON=GND, OFF=Vs) a pulse (a sustain discharge pulse) applied to all of the Y electrodes, according to the signals Y-UD and Y-DD.

Figure 36:
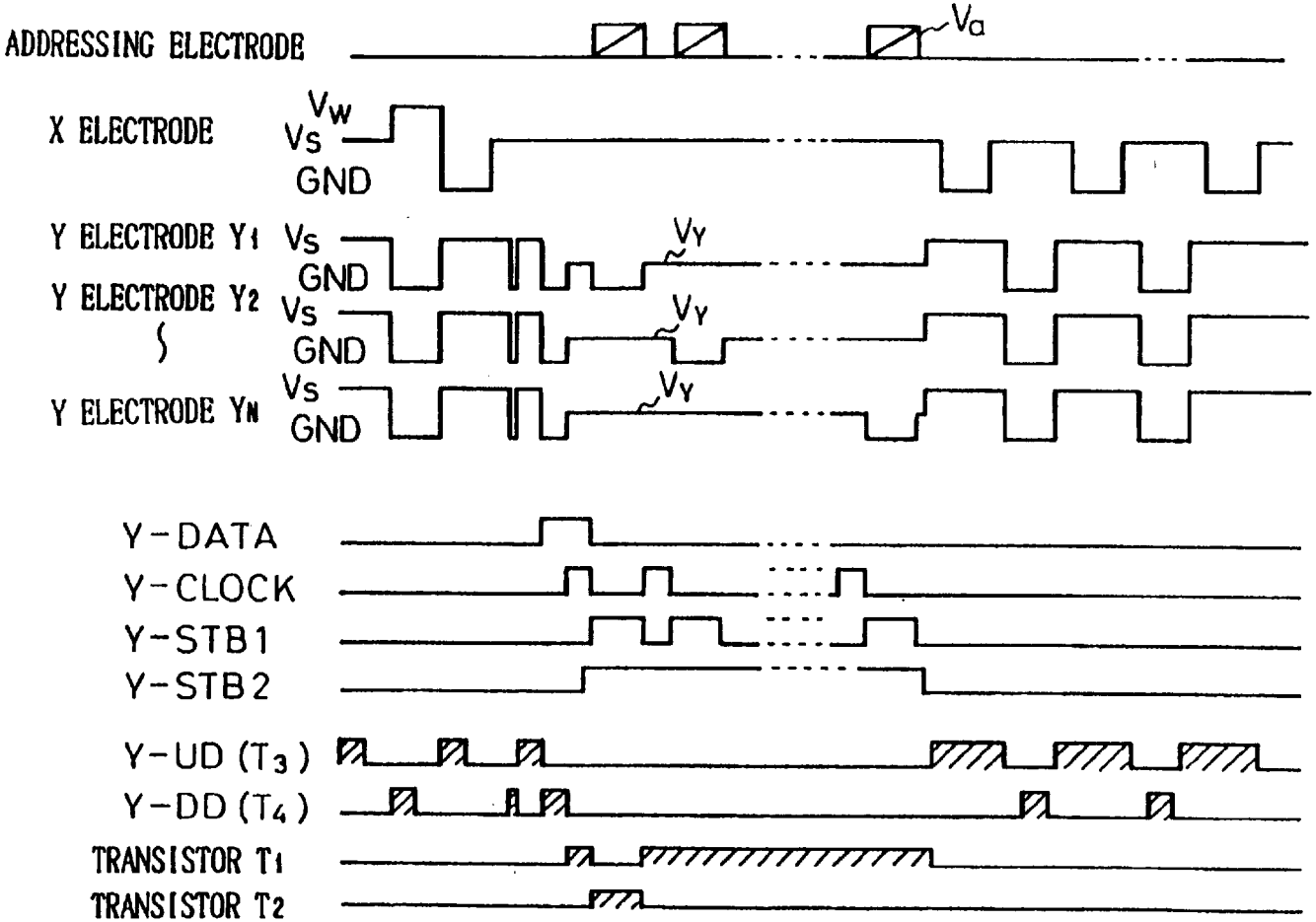
FIG. 36 is a waveform diagram showing an operation of FIG. 35.

FIG. 36 is a waveform diagram showing an operation of FIG. 35. When the signal Y-UD is at high level, the transistor $T_3$ of the Y driver 105 is turned ON to supply the voltage Vs to all Y electrodes. When the signal Y-DD is at high level, the transistor $T_4$ of the Y driver 105 is turned ON to supply the voltage GND to all Y electrodes.

During an addressing period, the two transistors $T_3$ and $T_4$ of the Y driver 105 are both turned OFF, and the two transistors $T_1$ and $T_2$ disposed in each of the electrode selection circuits $M_1$ to $M_n$ of the Y scan driver 104 are turned ON and OFF at predetermined timing.

The electrode selection circuit $M_1$ corresponding to the electrode $Y_1$ will be explained. The transistor $T_2$ of the selection circuit $M_1$ is turned ON if a logical product of Y-STB1, Y-STB2, and the signal $Q_1$ prepared by the shift register R in synchronism with Y-CLOCK is "1." The output $O_1$ is then changed to GND, which is supplied to the electrode $Y_1$.

The transistor $T_1$ of the selection circuit $M_1$ is turned ON if a logical product of the signal $Q_1$ and Y-STB1 is "0" and Y-STB2 is at high level. Then, a voltage of Vy is supplied to the electrode $Y_1$.

Figure 37:
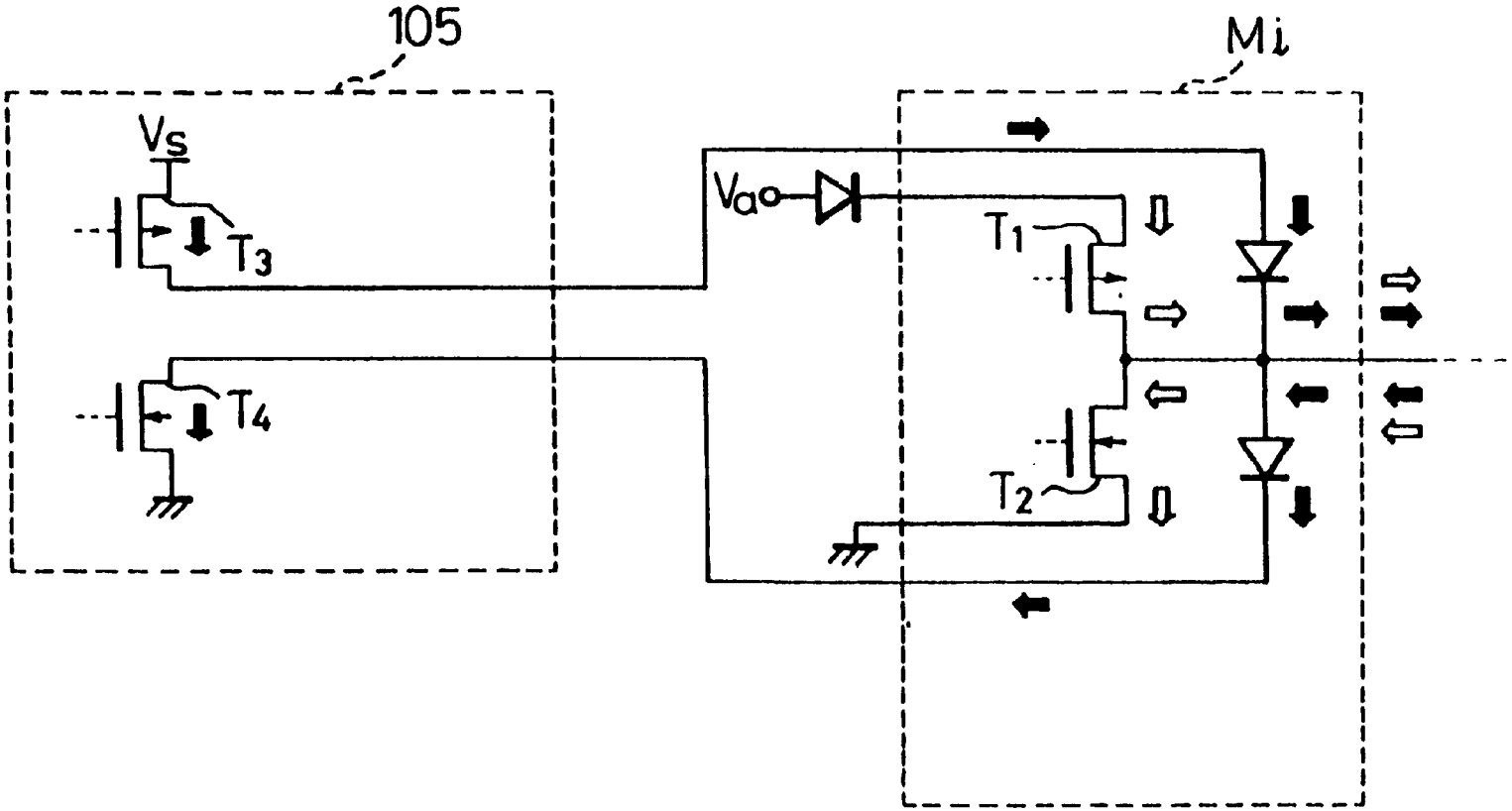
FIG. 37 is a simplified view of FIG. 35.

FIG. 37 is a simplified view of FIG. 35. In the figure, the two transistors $T_3$ and $T_4$ of the Y driver 105 are kept OFF, and the two transistors $T_1$ and $T_2$ of the selection circuit $M_i$(i being one of 1 to n) are turned ON and OFF to secure a current path (indicated with white arrow marks) for providing addressing discharge pulses. Alternatively, the two transistors $T_1$ and $T_2$ of the selection circuit $M_i$ are kept OFF, and the two transistors $T_3$ and $t_4$ of the Y driver 105 are turned ON and OFF to secure a current path (indicated with black arrow marks) for providing sustain discharge pulses.

As explained above, the embodiment sequentially applies addressing pulses $\mathbf{106}_1$ to $\mathbf{106}_N$ having a potential level of GND to the Y electrodes $Y_1$ to $Y_N$, respectively, during an addressing period. While a given Y electrode is not receiving the addressing pulse, i.e., during an unselected period of the given Y electrode, this Y electrode receives a voltage of Vy (=Va), which is substantially intermediate between GND and Vs. As a result, an effective voltage including the potential of positive wall charges accumulated due to write discharge can be reduced (compared with applying a voltage of Vs), to avoid abnormal discharge between adjacent two Y electrodes when one of them is selected (at GND). Accordingly, the wall charges are kept stabilized up to a sustain discharge period.

According to the eighth embodiment, the range of voltages handled by the Y scan driver 104 is from GND to Vy, which is about half the range of voltages (GND to Vs) handled by the Y driver 105. This helps reducing the withstand voltage of the Y scan driver 104 whose scale is increased in proportion to the number of Y electrodes, and thus contributing to high integration (LSI).

Figure 38:
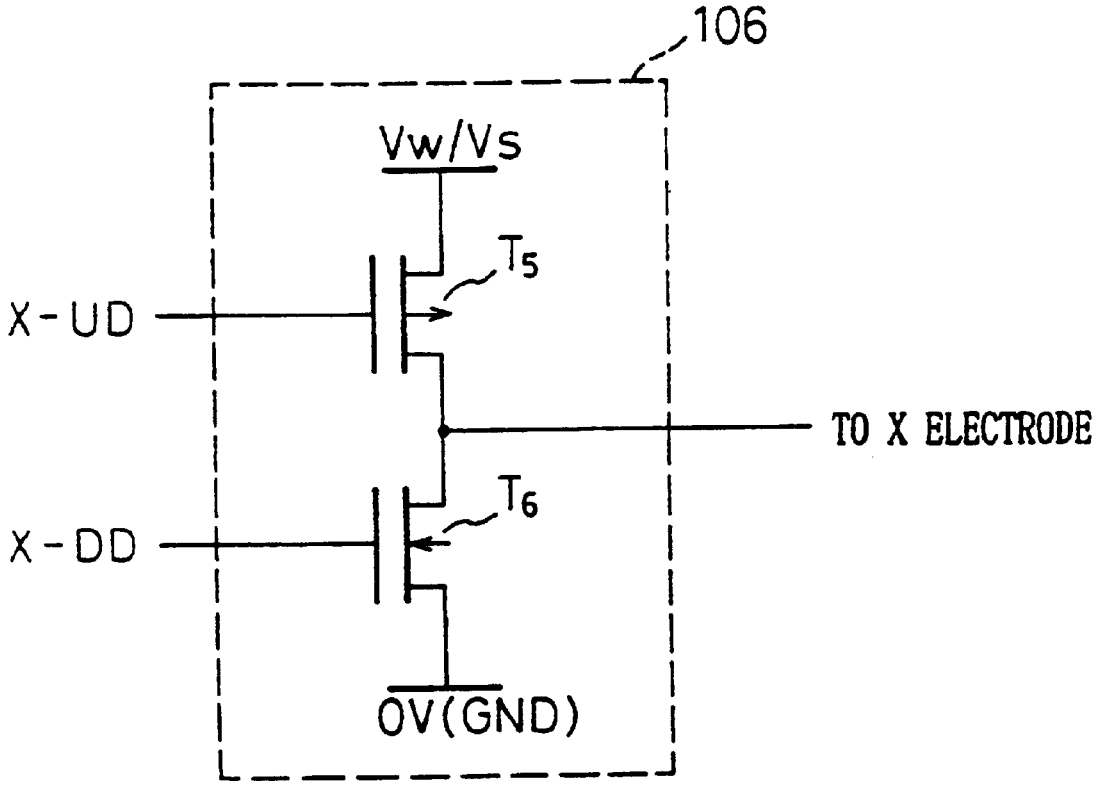
FIG. 38 is a view showing an X driver in detail.

Further, the detailed circuit diagram of the X driver 106 of FIG. 34 is illustrated in FIG. 38. This X driver 106 includes a pair of complementary MOS transistors $T_5$, $T_6$ in which switching operation under high electric power can be performed, so that a write pulse of a voltage $V_w$ and a sustain discharge of a voltage $V_s$ can be supplied to the given X electrode. Typically, the transistor $T_6$ at the upper side is composed of P-channel MOS, to which up drive signal X-UD is input, so that the voltage level of X electrode becomes $V_w$ or $V_s$. On the other hand, the transistor $T_6$ is composed of n-channel MOS, to which down drive signal X-DD is input, so that the voltage level of X electrode becomes GND (0 V). For example, in the case where the write pulse of a voltage $V_w$ is applied to the given X electrode, the power supply voltage of the transistor $T_5$, to which up drive signal X-UD is supplied, is transferred to $V_w$ in accordance with the timing of level change of up drive signal X-UD.

Figure 39:
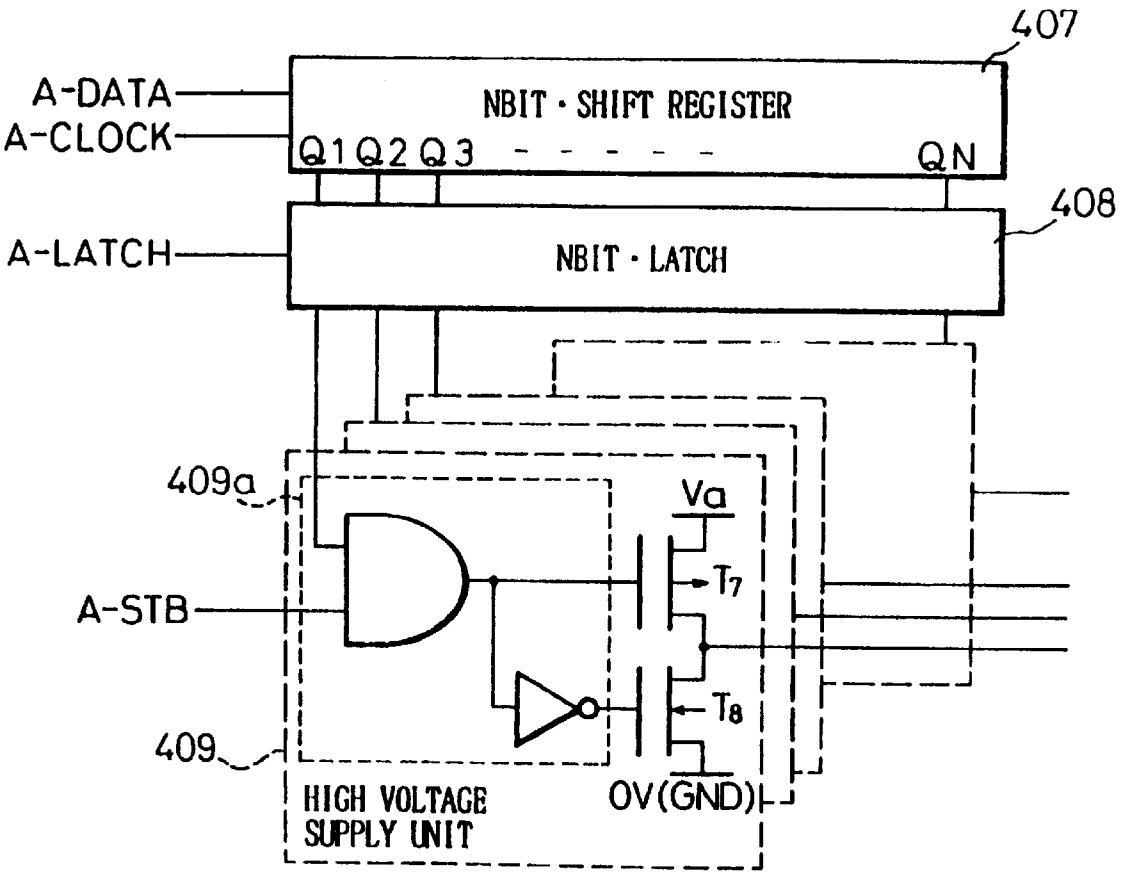
FIG. 39 is a view showing an addressing driver in detail.

Further, the detailed circuit block diagram of the addressing driver 103 of FIG. 34 is illustrated in FIG. 39. In FIG. 39, the addressing driver 103 comprises an N bit.shift register 407 which serially transfers display data of N bit, in accordance with display data A-DATA and transfer clock A-CLOCK issued from a control circuit 402. The above-mentioned addressing driver 103 further comprises an N bit.latch 408 which selects a plurality of address electrodes $A_1$ to $A_M$ sequentially in accordance with latch clock A-LATCH; and a plurality of high voltage supply units 409 which supplies relatively high voltage $V_s$ to the addressing electrode selected in accordance with output signals issued from the N bit/latch 408. Further, the high voltage supply units 409 of N are provided corresponding to the N bit data. Each of these units includes at least one logical circuit 409a composed of AND gate, etc., and a pair of complementary transistor $T_7$, $T_8$.

In this case, only when the given data which is output from the latch 408 is "1" and the corresponding addressing strobe A-STB becomes enable, the corresponding addressing pulse (outputs 1 to N) of a voltage $V_a$ is output from the corresponding high voltage supply unit 409.

Figure 40:
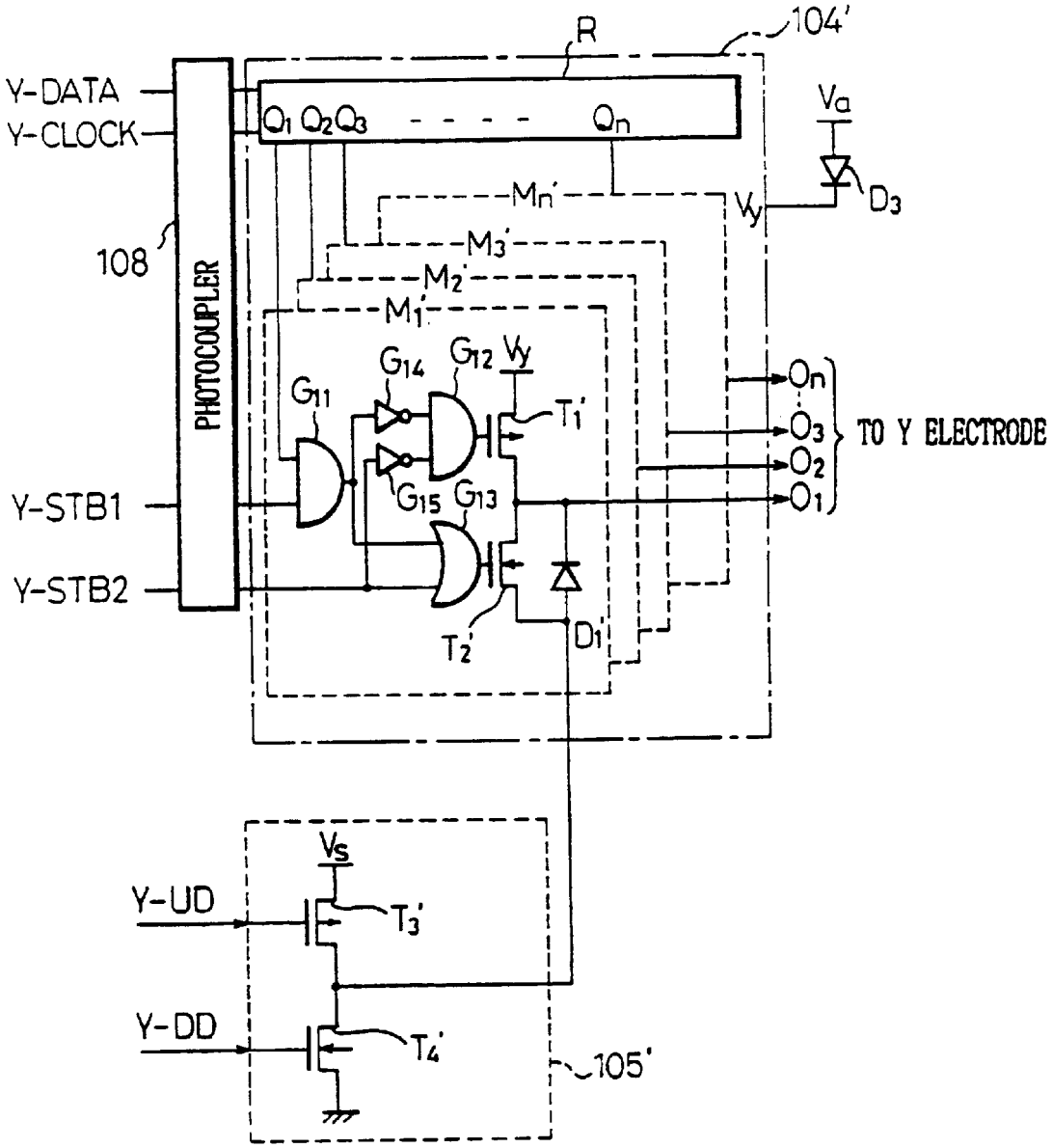
FIG. 40 is a view showing another arrangement including a Y scan driver and a Y driver.

FIG. 40 shows other arrangements of the Y scan driver and Y driver. What is different from FIG. 35 is that the Y scan driver is of floating type. Namely, two transistors $T_1'$ and $T_2'$ of the Y scan driver 104' are connected between a voltage of Vy (=Va) given through the blocking diode D3 and a voltage (Vs or GND) supplied from two transistors $T_3'$ and $T_4'$ of the Y driver 105'. The transistors $T_1'$, $T_2'$, $T_3'$, and $T_4'$ are selectively turned ON and OFF to set an output $Q_i$ of a selection circuit $M_i'$ to one of GND, Vs and Vy. Numeral 108 is an isolation photocoupler, $G_{11}$ and $G_{12}$ are AND gates, $G_{13}$ and $G_{14}$ are inverter gates, and $G_{15}$ is an OR gate.

Figure 41:
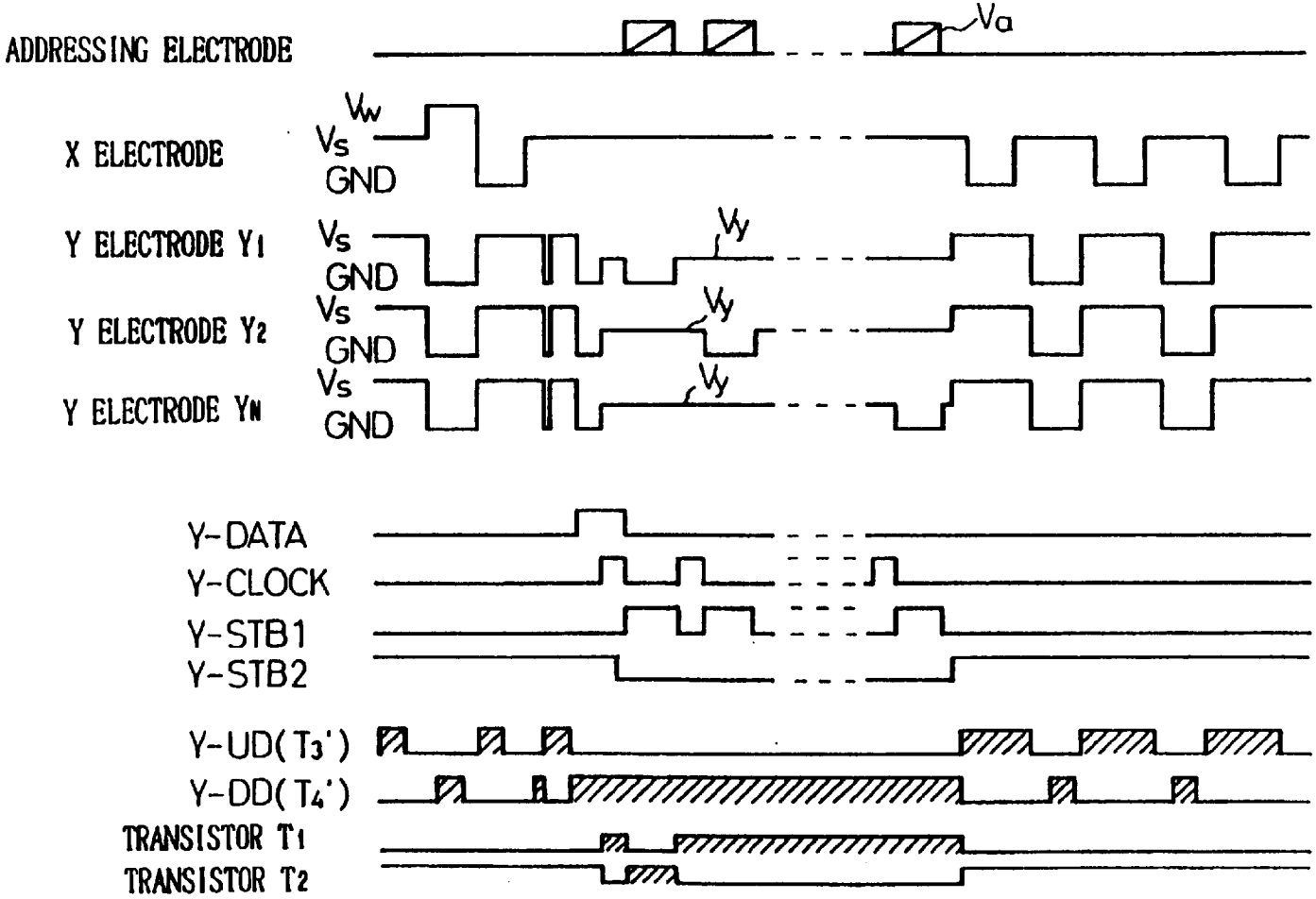
FIG. 41 is a waveform diagram showing an operation of FIG. 40.

FIG. 41 is a waveform diagram showing an operation of FIG. 40. When the signal Y-UD is at high level, the transistor $T_3'$ of the Y driver 105' is turned ON to provide all of the Y electrodes with a voltage of Vs. When the signal Y-DD is at high level, the transistor $T_4'$ of the Y driver 105' is turned ON to provide all of the Y electrodes with a potential of GND.

During an addressing period, the transistor $T_4'$ of the Y driver 105' is kept ON to fix the floating potential of the Y scan driver 104' at GND. When the transistor $T_2'$ of the selection circuit $M_i'$ is turned ON under this state, the output $O_1$ is set to GND, which is provided to the electrode $Y_1$. When the transistor $T_1'$ is turned ON, a voltage of Vy is supplied to the electrode $Y_1$ through the transistor $T_1'$.

Figure 42:
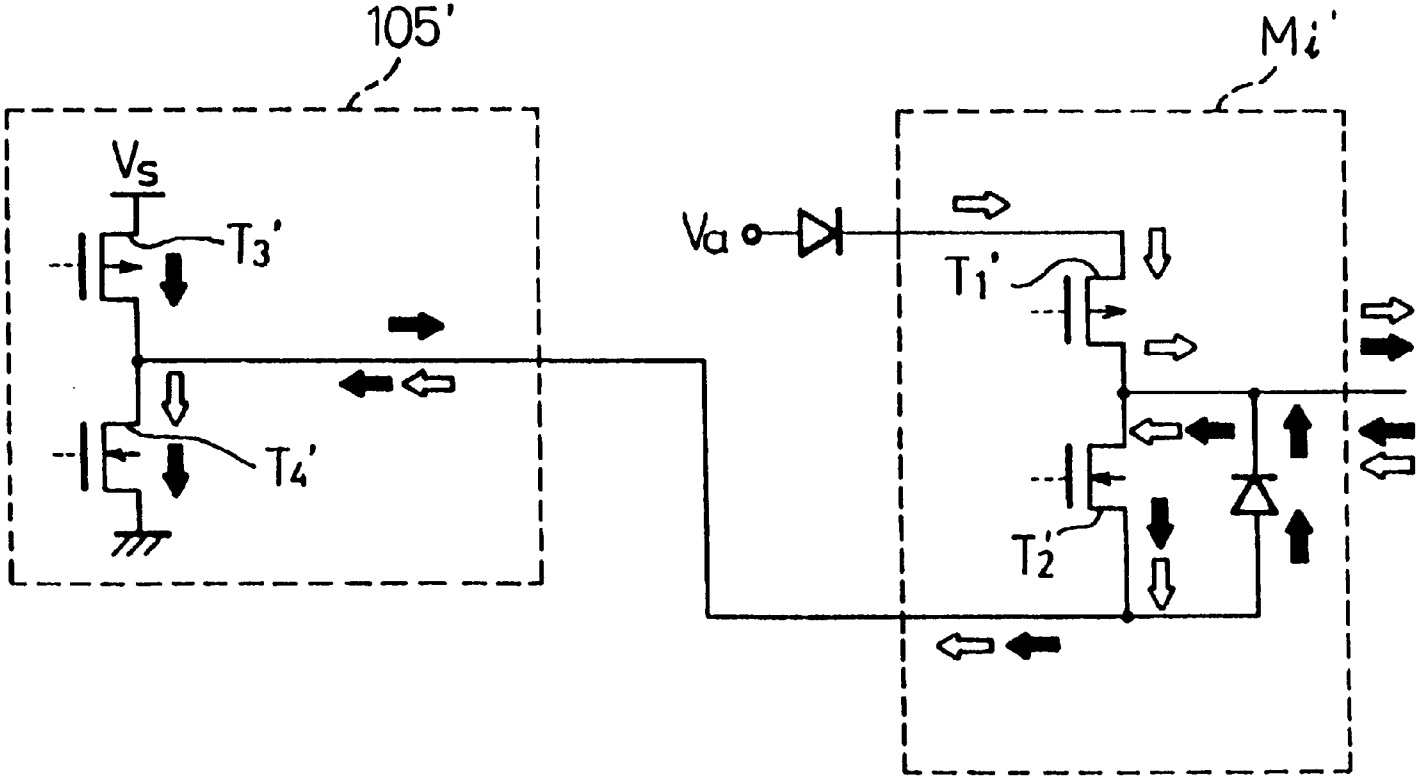
FIG. 42 is a simplified view of FIG. 40.

FIG. 42 is a simplified view of FIG. 40. When the transistor $T_4'$ of the Y driver 105' is ON, the two transistors $T_1'$ and $T_2'$ of each selection circuit $M_i'$ are turned ON and OFF, to secure a current path (indicated with white arrow marks) for providing addressing discharge pulses. When the transistor $T_2'$ of the selection circuit $M_i'$ is ON, the two transistors $T_3'$ and $T_4'$ of the Y driver 105' are turned ON and OFF, to secure a current path (indicated with black arrow marks) for providing sustain discharge pulses.

Figure 43:
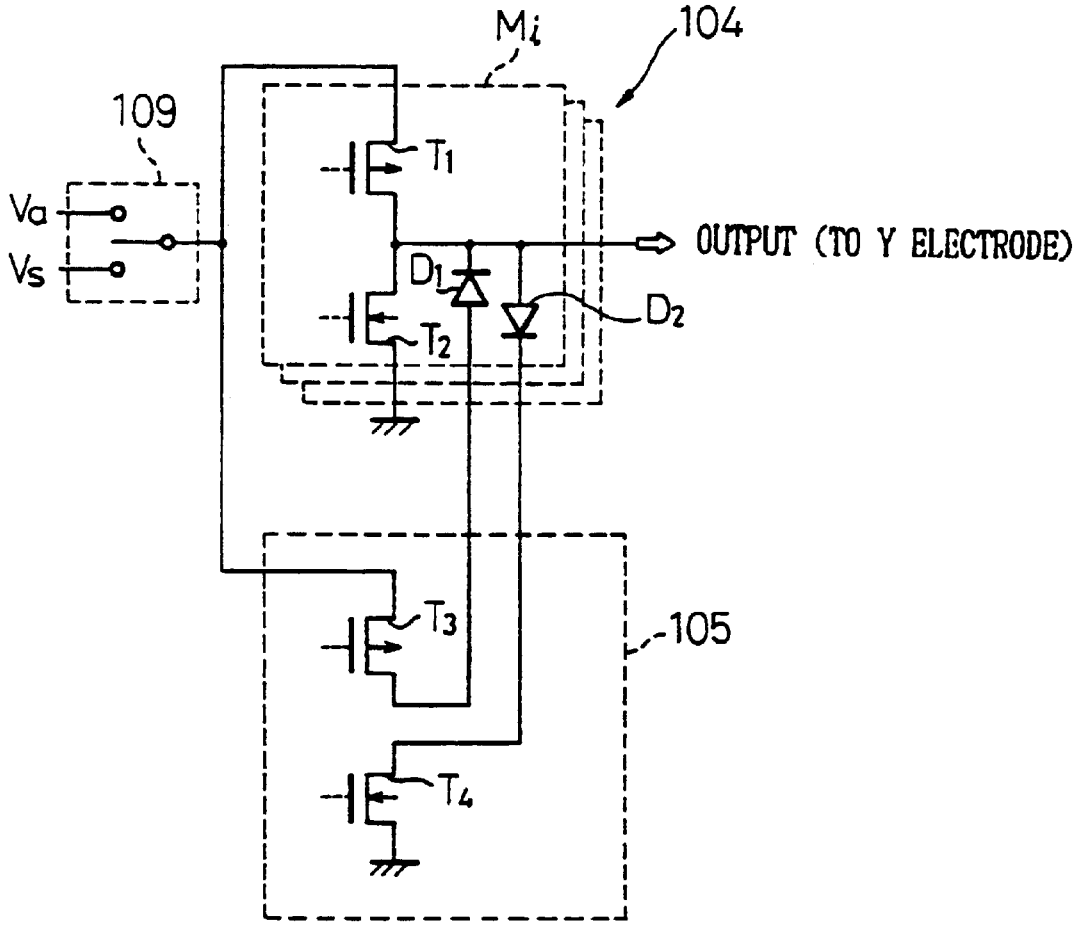
FIG. 43 is a view showing still another arrangement including a Y scan driver and a Y driver.

FIG. 43 shows a modification of FIG. 35. A switch 109 switches two voltages Va and Vs from one to another. During an addressing period, the voltage Va is selected, and during other periods, the voltage Vs is selected.

Figure 44:
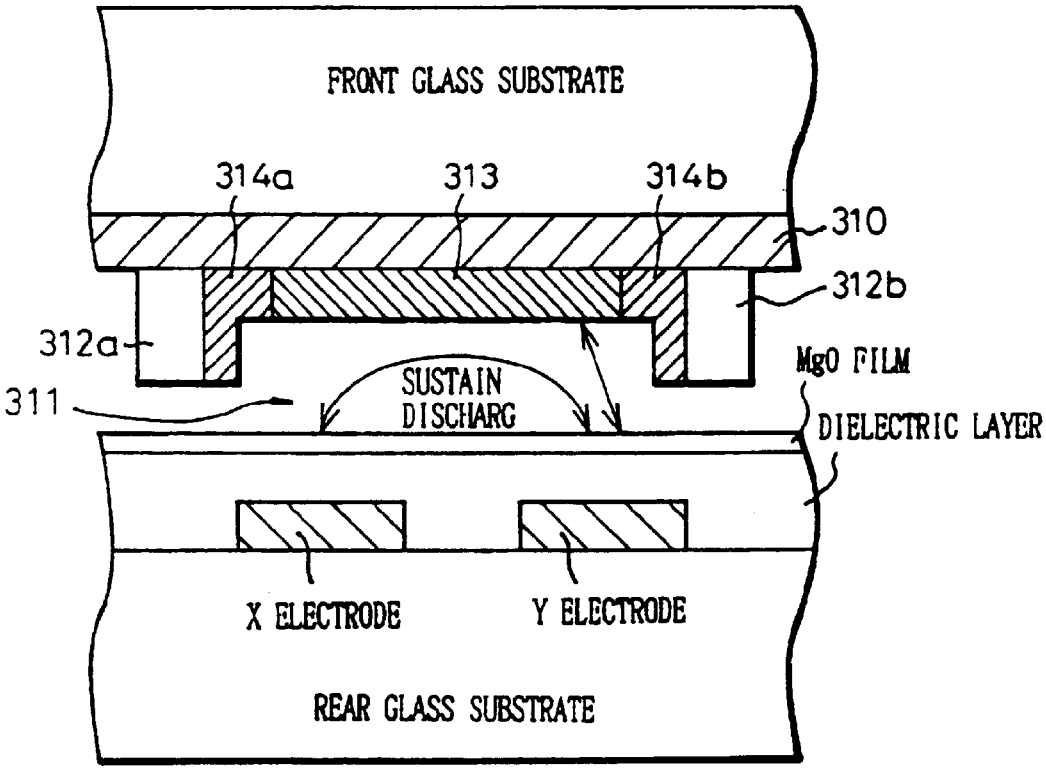
FIG. 44 is a sectional view showing a preferable PDP cell.

FIG. 44 is a sectional showing a cell of a preferable PDP applicable for the above embodiments. This PDP cell has a novel structure around an addressing electrode, to positively accumulate wall charges on a dielectric layer over the addressing electrode, thereby increasing a margin in an applied voltage between the addressing electrode and a Y electrode during write discharge, and reducing an applied voltage between the addressing electrode and the Y electrode during selective discharge.

In FIG. 44, the addressing electrode 310 is separated from a discharge space 311 by completely filling a gap between walls 312a and 312b with a dielectric layer 313 and phosphors 314a and 314b. The phosphors 314a and 314b may be made of ceramics such as:

(Green) $Zn_2SiO_4$:Mn (Red) $Y_2O_3$:Eu (Blue) $BaMgAl_{14}4O_{23}$:$Eu^{2+}$

The thickness of the phosphors is set to be sufficient to isolate the addressing electrode from the discharge space and accumulate charges. If these conditions are satisfied, a phosphor may be disposed in place of the dielectric layer 313, to accumulate charges.

To sequentially drive display lines of the PDP having such arrangement, write discharge is firstly carried out between the X electrode and a selected Y electrode, to promote discharge between each addressing electrode and the X electrode and form spatial charges. The polarities of the spatial charges are negative on the X electrode and positive on the addressing electrode and on the Y electrode. Electrons (negative charges) are accumulated over the X electrode, and ions (positive charges) are accumulated over the addressing electrode and over the Y electrode.

When a sustain discharge pulse causes sustain discharge in every cell, wall charges having an inverted polarity are accumulated, so that an erase pulse applied to the Y electrodes causes erase discharge in every cell. The erase discharge reduces the wall charges, so that no sustain discharge will occur even with the application of sustain discharge pulses, because an effective voltage is insufficient. The effective discharge voltage for causing write discharge between a selected Y electrode and an addressing electrode is a sum of the potential of wall charges accumulated over the addressing electrode and a voltage (an addressing voltage) applied to the addressing electrode, so that even a low addressing voltage can surely cause write discharge.

Figure 45:
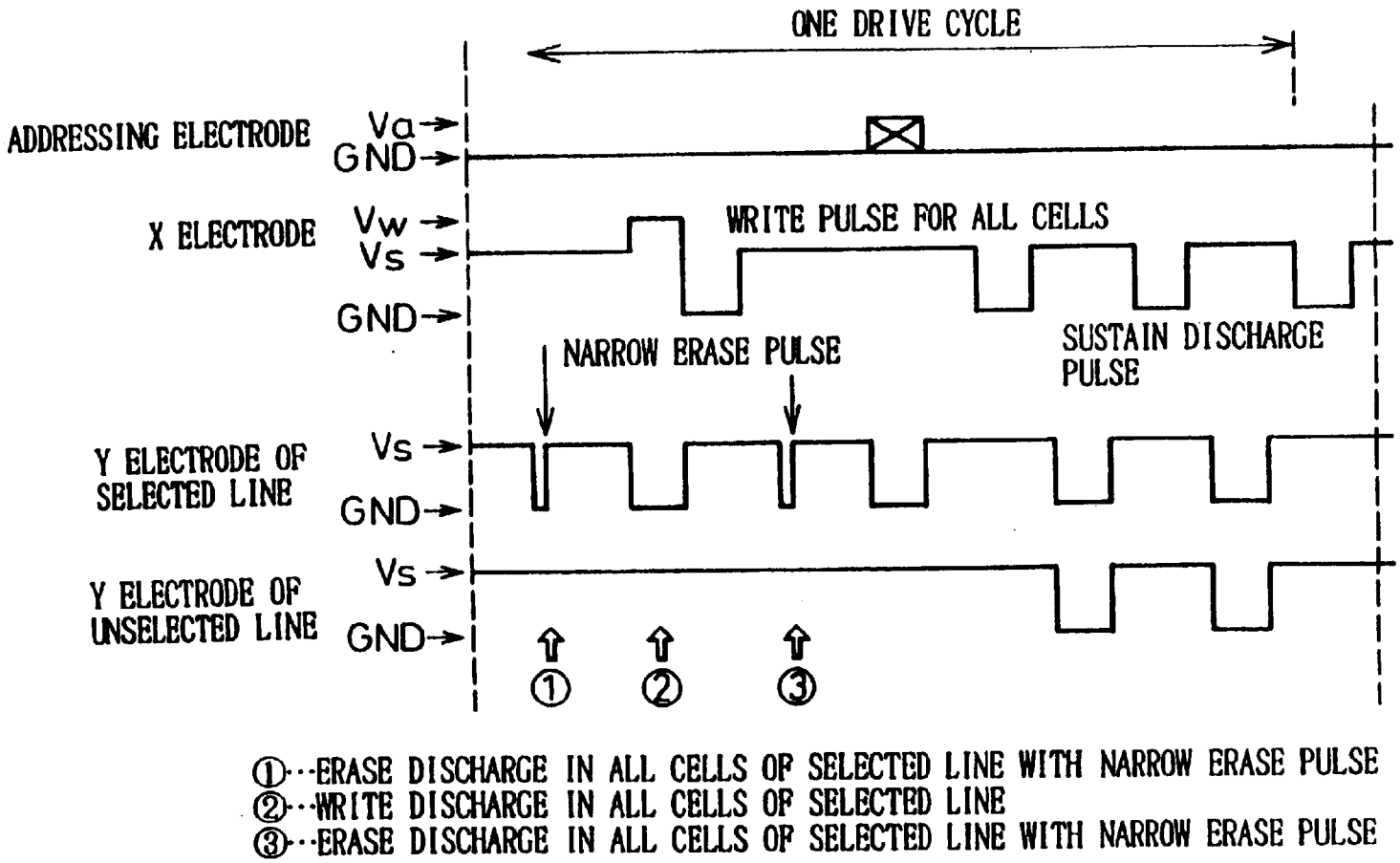
FIG. 45 is a waveform diagram a ninth embodiment of the present invention.

Ninth Embodiment of FIG. 45

FIG. 45 is a waveform diagram showing a ninth embodiment of the present invention.

According to the first to eighth embodiments as described before, the method for driving a display panel such as PDP carries out write discharge in all cells at the first stage to accumulate wall charges on an insulation layer covering addressing electrodes. These wall charges effectively work and enhance a voltage applied to the addressing electrodes to carry out addressing write discharge for selecting cells. This results in decreasing the addressing voltage.

This method, however, is likely to cause some troubles if the wall charges are excessively formed on the insulation layer on the addressing electrodes. These excessive wall charges may cause excessive addressing write discharge to write even unselected cells. The excessive addressing write discharge also produces a large amount of wall charges, which may cause self-erase (self-extinguish) discharge just after the application of the write addressing pulse.

There are several reasons why such excessive wall charges are formed on the insulation layer on the addressing electrodes by the write discharge carried out in each cell. When a cell has been ON in the preceding frame, wall charges remaining in the cell from the preceding frame is added to a total write pulse applied to the cell through the X electrode. Namely, the effective voltage in the discharge space of the cell will be a sum of the applied voltage and the voltage of the remaining wall charges, to cause very strong discharge.

In this case, positive charges, i.e., ions hit the insulation layer, which may be made of phosphor, on the addressing electrodes. The phosphor is vulnerable to the ions so that its composition will be changed by the hitting ions, to deteriorate its light emitting performance.

To address these troubles, as shown in FIG. 45, it is preferable that an erase discharge is carried out in cells which have been ON in the preceding frame, to erase or reduce wall charges in these cells, and total write discharge for all these cells is carried out.

In such a method, irrespective of ON and OFF states of cells in the preceding frame, it is possible for uniform total write discharge to be carried out in every cell, to thereby prevent extremely strong discharge, which may otherwise cause addressing errors, the erroneous writing of adjacent cells, unwanted self-erase discharge, and damage to phosphor. The ninth embodiment thus stabilizes images displayed on a display panel and extends the service life of the panel.

To be more specific, the ninth embodiment shown in FIG. 45 applies an erase discharge pulse to the Y electrode of the selected display line just before a write pulse to the X electrode. This erase discharge pulse erases or reduces wall charges in cells of the selected display line that have been ON in the preceding frame. As a result, excessively strong total write discharge will never occur in any cell.

Figure 46:
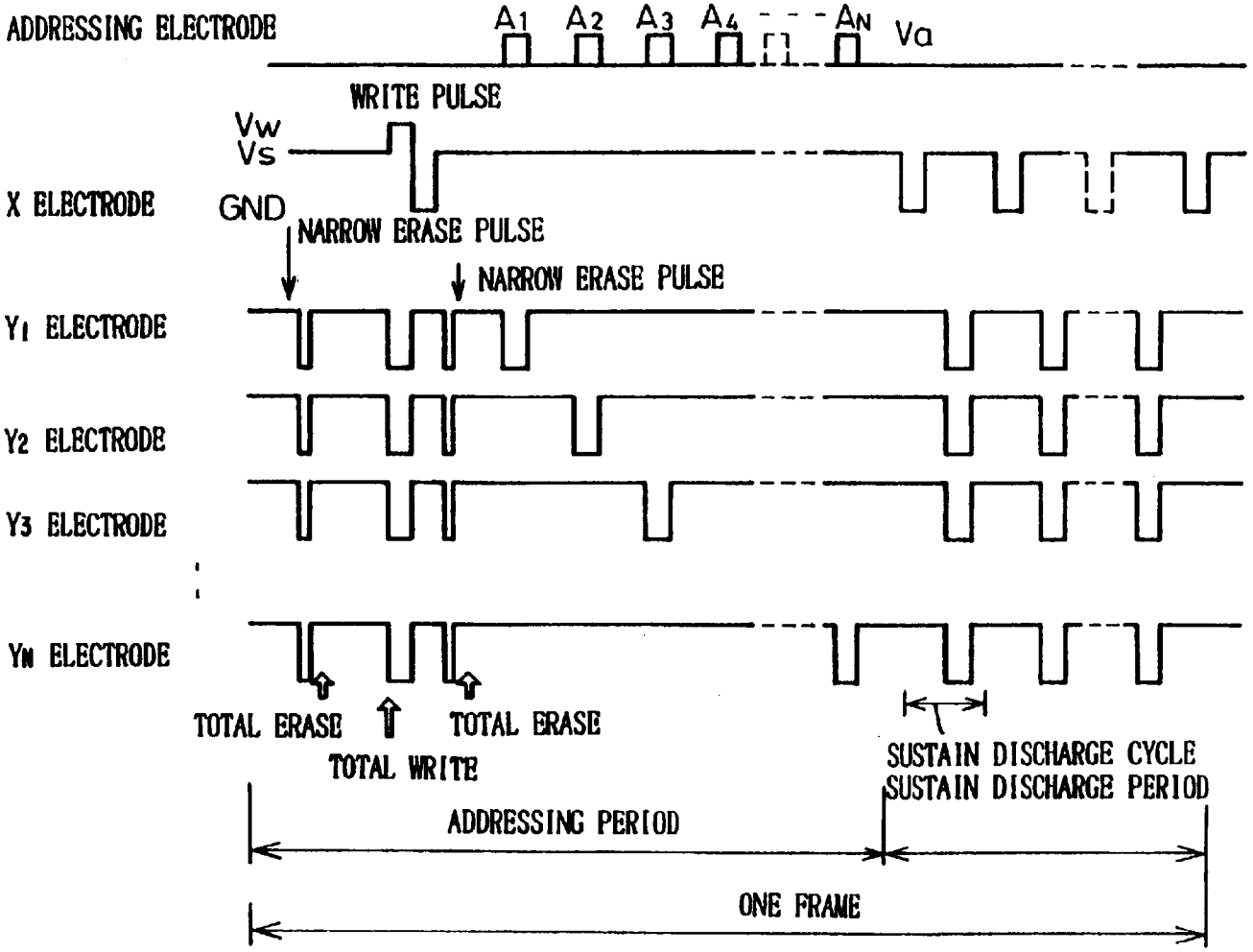
FIG. 46 is a waveform diagram of a tenth embodiment of the present invention.

Tenth Embodiment of FIG. 46

FIG. 46 shows drive waveforms of a tenth embodiment. This embodiment applies an erase pulse to the Y electrode of every display line just before total write discharge. Similar to the ninth embodiment, the total write discharge will never be too strong in any cell.

According to the above-mentioned ninth and tenth embodiments, an erase pulse is inserted just before a total write operation, to prevent excessively strong total write discharge and addressing errors, and extend the service life of phosphor of a display panel.

Figure 47:
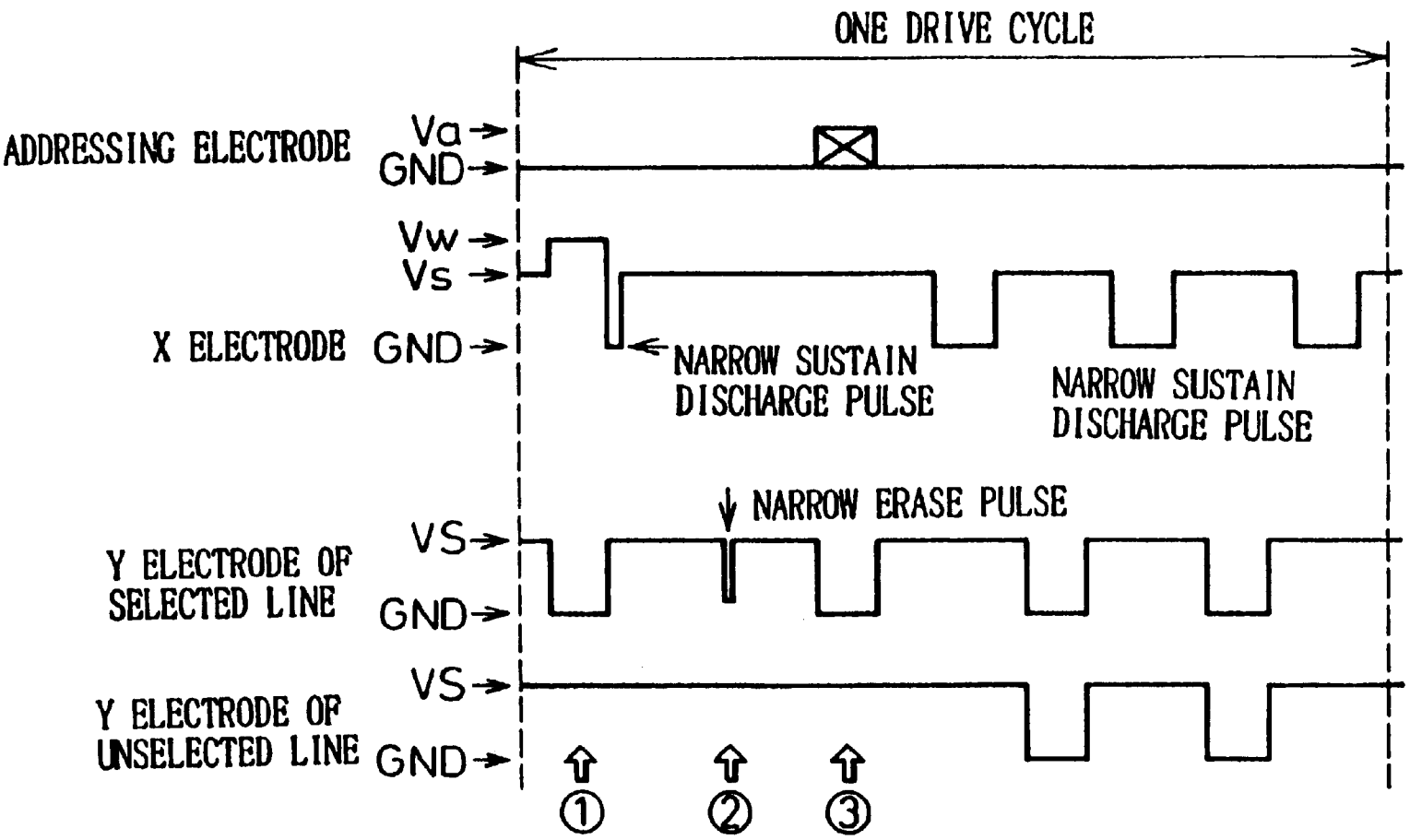
FIG. 47 is a waveform diagram of an eleventh embodiment of the present invention.
Figure 48:
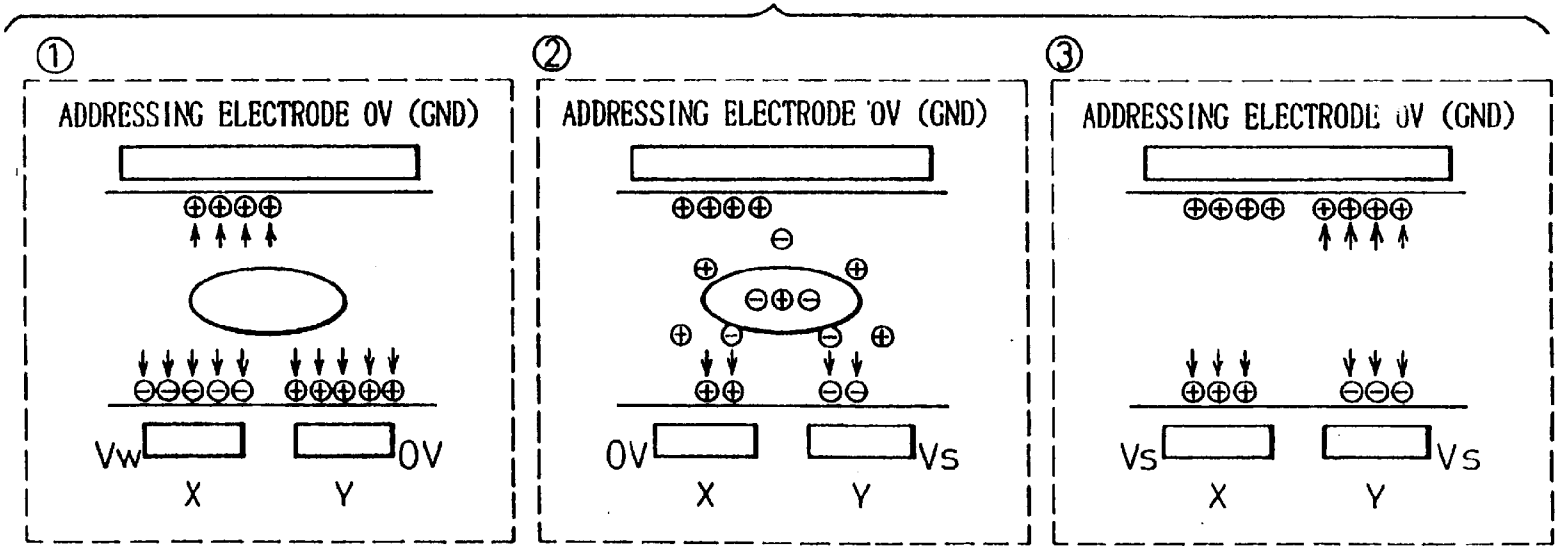
FIG. 48 is an operational model in driving an eleventh embodiment of the present invention shown in FIG. 47.

Eleventh Embodiment of FIGS. 47 and 48

FIG. 47 is a waveform diagram showing an eleventh embodiment of the present invention. In this embodiment, in the case where a write discharge for all cells is carried out, the method is adapted to accumulate charges on an insulating layer made of, for example, phosphor covering addressing electrodes. The accumulated charges advantageously work in the next addressing write discharge. This results in further reducing the addressing voltage Va.

The novel means utilized in the eleventh embodiment additionally accumulates charges by a sustain discharge to be carried out after the total write discharge. The charges thus accumulated more advantageously work in the addressing write discharge, to thereby help further decrease the addressing voltage. Such a lowered addressing voltage enables the addressing drivers to be integrated, images to be displayed with full colors and multiple intensity levels, and power consumption to be reduced.

In FIG. 47, it should be noted that a sustain discharge pulse applied to an X electrode just after a write pulse is narrow. FIG. 48 is a model of an operation of the eleventh embodiment involving the narrow sustain discharge pulse. At the first stage (①), write discharge carried out in all cells accumulates positive charges on an insulation layer covering addressing electrodes in the vicinity of the X electrode. Since addressing write discharge is going to be carried out between the addressing electrodes and a Y electrode, it is preferable if the charges on the insulation layer are located in the vicinity of the Y electrode. At the second stage (②), when the narrow sustain discharge pulse is applied, the X electrode is set to GND (0 V) to carry out sustain discharge. Immediately after this, i.e., before space charges produced by the discharge entirely accumulate as wall charges on the X and Y electrodes to extinguish the space charges, the narrow sustain discharge pulse disappears. As a result, the X and Y electrodes are set to a potential level of Vs, and only the addressing electrodes are returned to GND. Positive charges among the remaining space charges accumulate on the insulation layer covering the addressing electrodes at a position having the lowest potential, in particular, in the vicinity of the Y electrode. Thereafter, at the third stage (③), an erase discharge is carried out between the X and Y electrodes. Lastly, addressing write discharge is carried out. At this time, the positive wall charges on the addressing electrodes in the vicinity of the Y electrode advantageously work. This results in remarkably reducing the externally applied addressing voltage.

Figure 49:
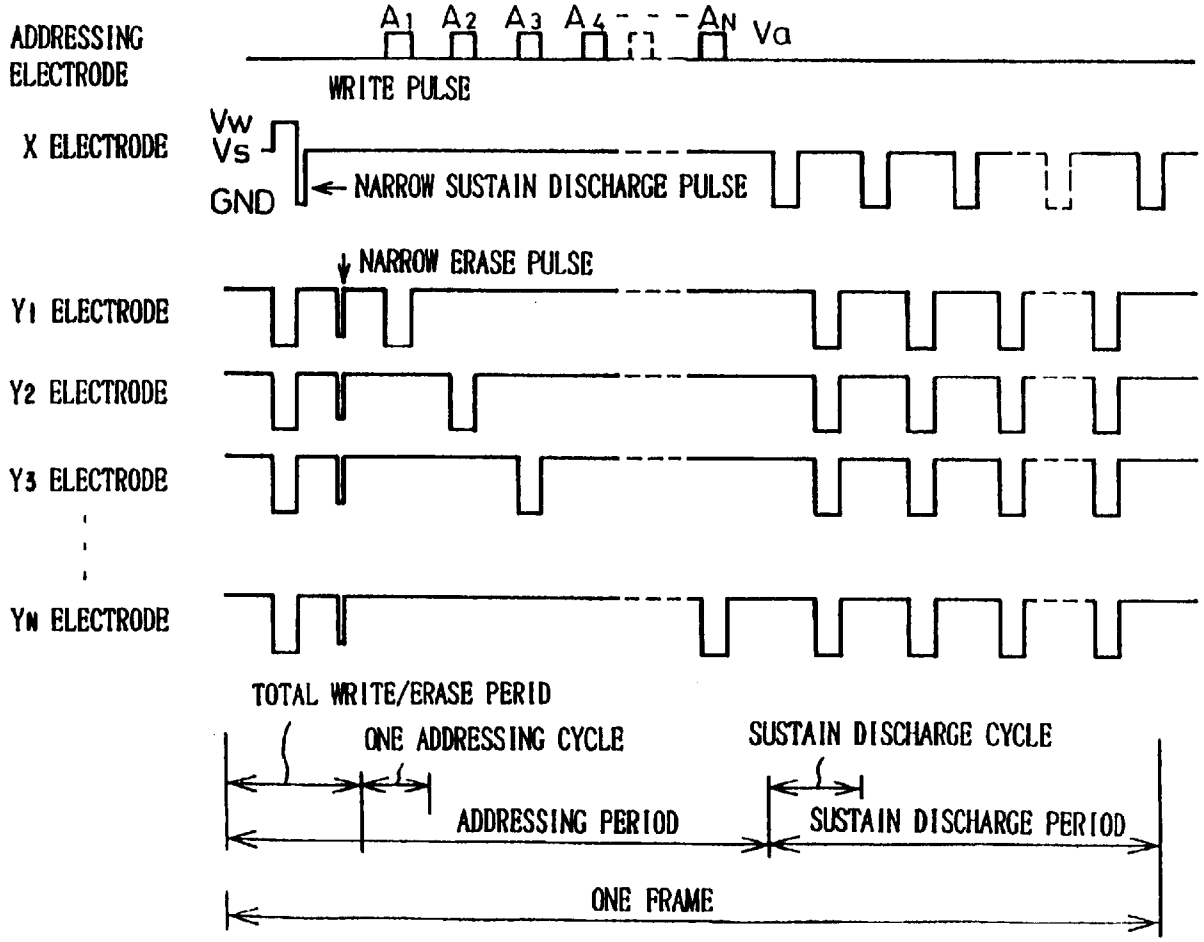
FIG. 49 is a waveform diagram of a twelfth embodiment of the present invention.

Twelfth Embodiment of FIG. 49

FIG. 49 shows drive waveforms of a twelfth embodiment. This embodiment also applies a narrow sustain discharge pulse after a total write operation, to provide the same effect as in the eleventh embodiment.

The twelfth embodiment employs a narrow sustain discharge pulse to accumulate wall charges that advantageously work in addressing the write discharge.

Figure 50:
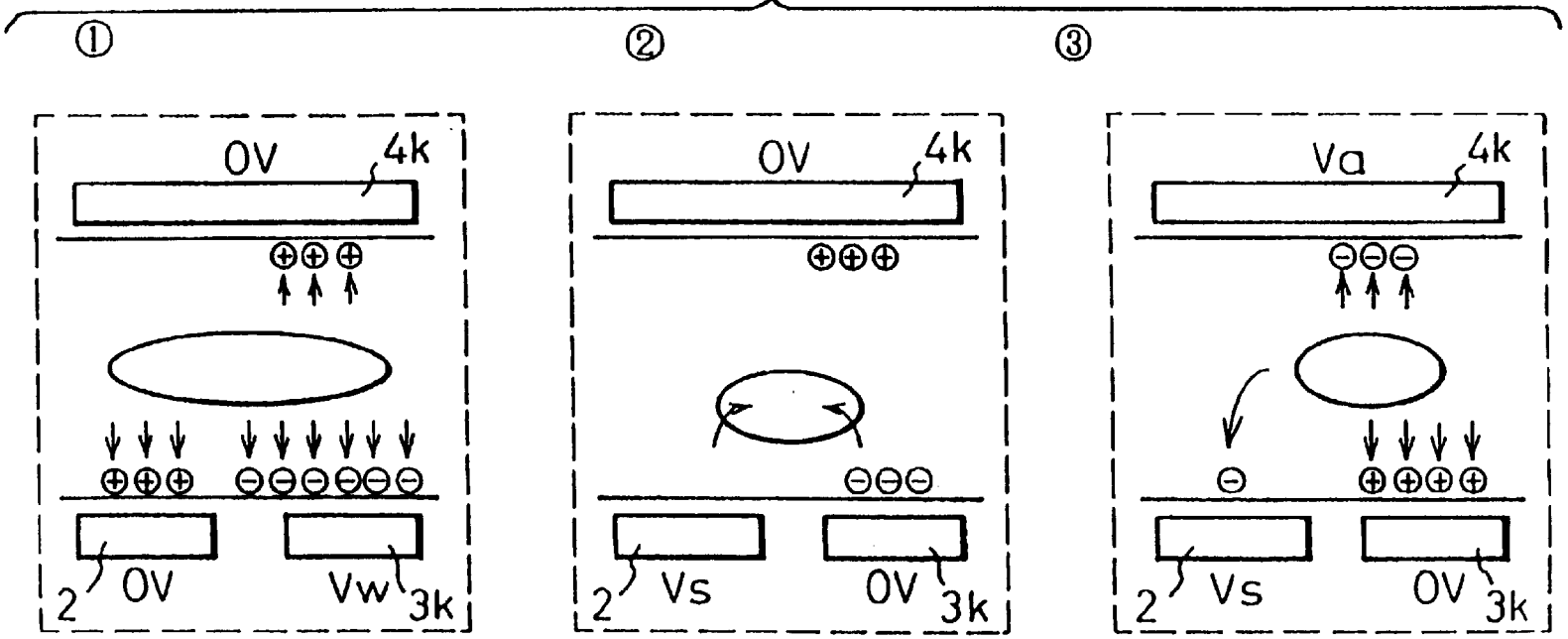
FIG. 50 is an operational model in driving a thirteenth embodiment of the present invention.
Figure 51:
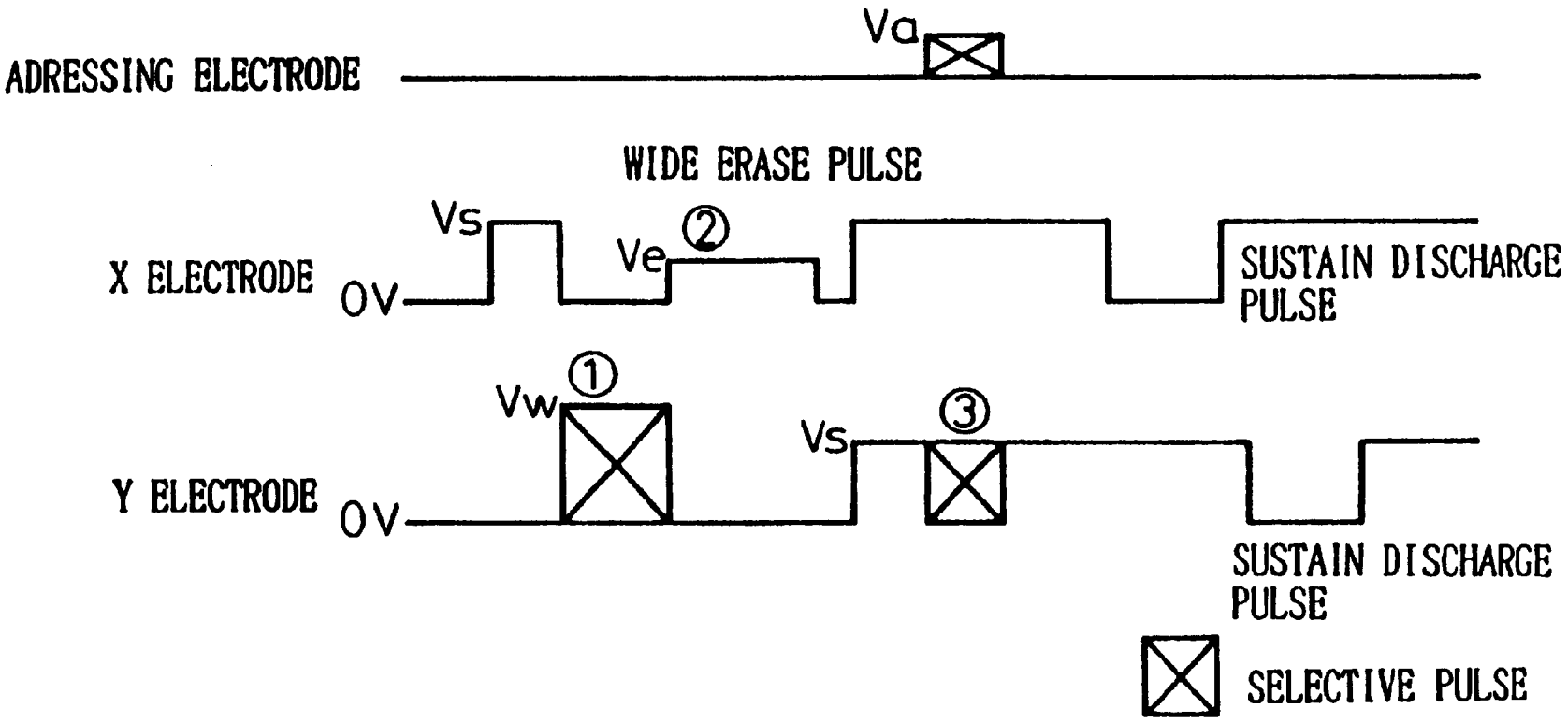
FIG. 51 is a waveform diagram of a thirteenth embodiment of the present invention.

Thirteenth Embodiment of FIGS. 50 and 51

FIGS. 50 and 51 show an operational model and drive waveforms of a thirteenth embodiment, respectively.

In all the embodiments described before, a display panel is constructed such that the write pulse of a voltage Vw is applied to X electrodes. However, also in the construction that the write pulse is applied to Y electrodes, instead of X electrodes, that is shown in FIGS. 50 and 51, it is expected to accumulate wall charges over the addressing electrode, similar to other embodiments.

Hereinafter, a concrete example, in which a method and apparatus according to the present invention are applied to the adjusting of luminance of an AC PDP will be described with reference to the accompanying drawings.

Figure 52:
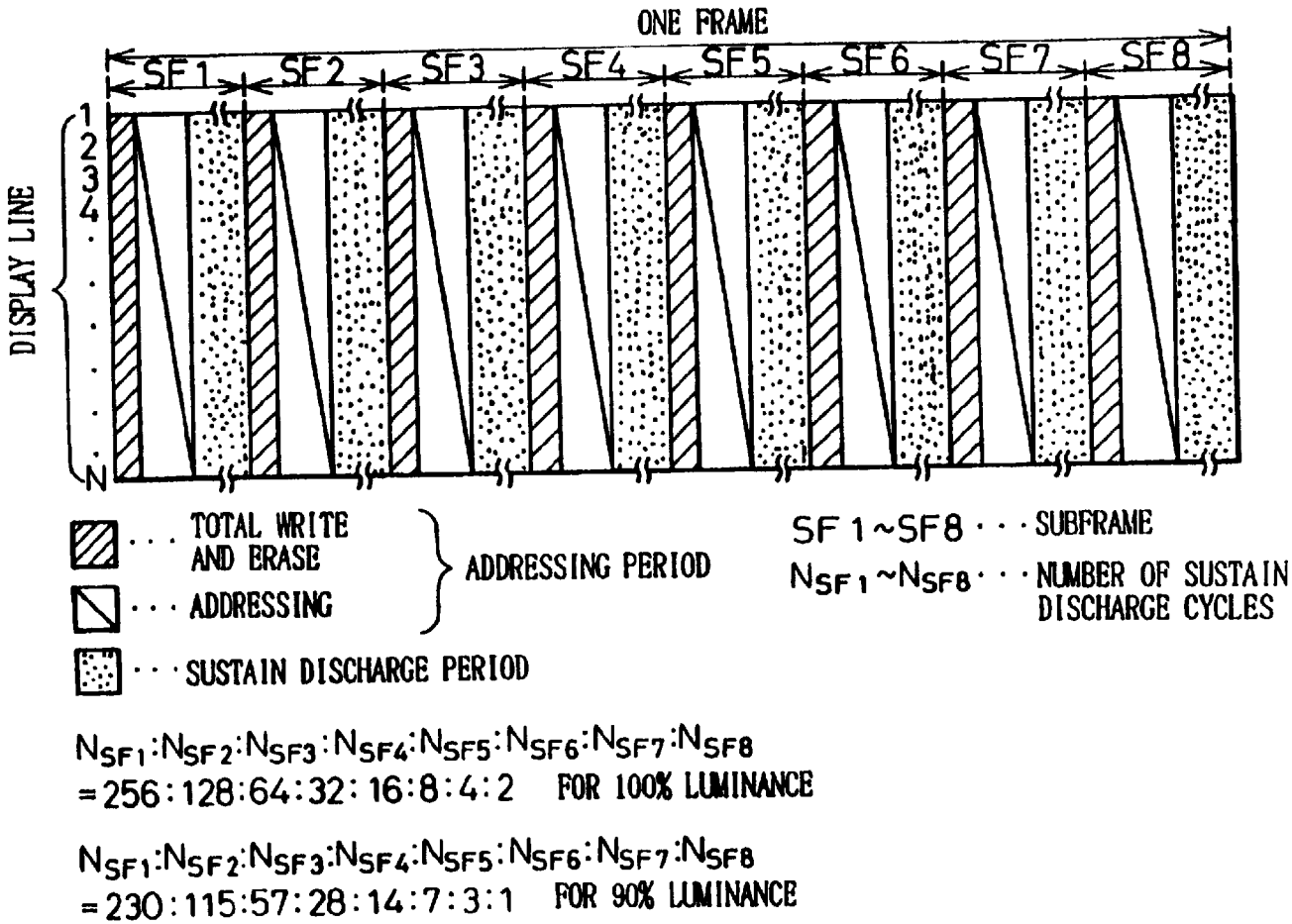
FIG. 52 is a timing chart for explaining an example in which the present invention is applied to the adjusting of luminance of a PDP.

FIG. 52 is a timing chart showing an AC PDP driving method for adjusting luminance of the PDP invention.

This method handles 256 intensity levels and operates at 30.6 KHz in the maximum frequency of sustain discharge (a frame frequency of 60 Hz).

In the figure, a frame that forms an image plane is composed of subframes SF1 to SF8. The weight of luminance of the subframe SF1 is maximum, and the number of sustain discharge cycles thereof is $N_{SF1}$, which is 256.

When an image is displayed with maximum luminance, the number of sustain discharge cycles in the subframe SF1 is 256, and the number of sustain discharge cycles ($N_{SF2}$) in the next subframe whose weight of luminance is the second largest is half of $N_{SF1}$, i.e., 128. In this way, the numbers $N_{SF1}$ to $N_{SF8}$ of sustain discharge cycles in the subframes SF1 to SF8 are determined as follows:

$$N_{SF1}:N_{SF2}:N_{SF3}:N_{SF4}:N_{SF5}:N_{SF6}:N_{SF7}:N_{SF8}= 256:128:64:32:16:8:4:2$$

If it is required to reduce the luminance by, for example, 10%, the number $N_{SF1}$ of sustain discharge cycles in the subframes SF1 is reduced to 230 (256×0.9). The numbers $N_{SF1}$ to $N_{SF8}$ of sustain discharge cycles of the subframes SF1 to SF8 are determined by successively halving higher numbers as follows:

$$N_{SF1}:N_{SF2}:N_{SF3}:NF_4:N_{SF5}:N_{SF6}:N_{SF7}:N_{SF8}= 256:115:57:28:14:7:3:1$$

In this way, the numbers of sustain discharge cycles (the numbers of sustain emission operations) in the subframes SF1 to SF8 are increased or decreased (in the above example, decreased to 0.9) to adjust the luminance. When displaying an image on a PDP with multiple intensity levels, the present invention shown in FIG. 52 adjusts the luminance in multiple levels by digital control, to thereby make the display unit comparable to a CRT.

Figure 53:
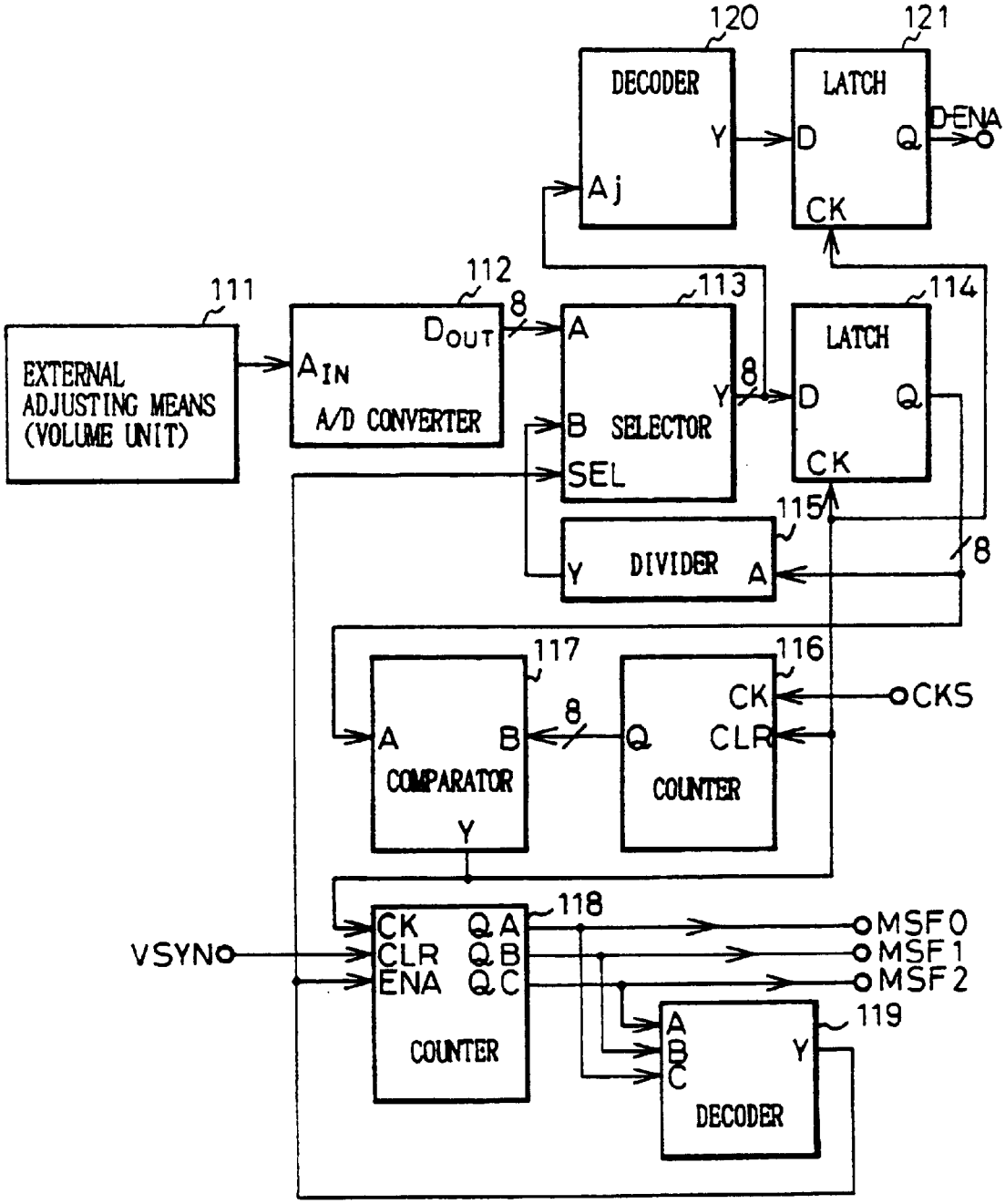
FIG. 53 is a block diagram showing a circuit that achieves the driving method of FIG. 52.

FIG. 53 shows a circuit for determining the numbers of sustain discharge cycles in the respective subframes.

In the figure, adjusting means (a volume unit) 111 enables a user to freely set a luminance value from the outside. An A/D converter 112 converts an analog voltage signal set through the volume unit 111 into an 8-bit digital signal. A selector 113 selects an input A (an output of the A/D converter 112) or an input B (an output Y of a divider 115) in response to a selection signal SEL (an output Y of a decoder 119). A latch 114 latches an output Y of the selector 113 in response to a clock input CK (an output Y of a comparator 117). The latch 114 comprises a D flip-flop for holding a value that determines the number of sustain discharge cycles of the next subframe. The divider 115 halves an input A (an output Q of the latch 114). The divider 115 comprises, for example, a shift register whose output Y (=A/2) is connected to the input B of the selector 113. If the halved input A provides fractions, the divider 115 discards the fractions.

An 8-bit 256-base counter 116 is reset in response to a clear input CLR (the output Y of the comparator 117). The counter 116 counts the number of sustain discharge cycles in response to a clock input CK (a clock signal CKS provided by a drive waveform generator). The comparator 117 compares an input A (the output Q of the latch 114) with an input B (an output Q of the counter 116). A 3-bit octal counter 118 is reset in response to a clear input CLR (a vertical synchronous signal VSYN) and is activated in response to an enable signal ENA (the output Y of the comparator 117) for specifying a subframe. The NAND logic decoder 119 responds to three output bits QA, QB, and QC of the counter 118. An OR logic decoder 120 responds to the 8-bit output of the selector 113. A latch 121 holds an output Y of the decoder 120 in response to a clock input CK (the output Y of the comparator 117). An output Q of the latch 121 provides a high-voltage circuit with a disable signal D-ENA for disabling a high-voltage drive waveform.

Operations of the circuit of FIG. 53 will be explained. The volume unit 111 determines the potential of an analog signal provided to the A/D converter 112. The A/D converter 112 provides an 8-bit output. If the input signal is at the maximum level, the A/D converter 112 will provide a digital value of 255. This "255" determines the number of sustain discharge cycles of the subframe SF1 having the maximum luminance. The counter 116 counts 256 counts ranging from 0 to 255, each of which corresponds to the number of sustain discharge cycles.

When the subframe SF1 is started, the subframe specifying counter 118 must have been just cleared in response to the vertical synchronous signal VSYN, and therefore, the counter 118 provides 0 (QA to QC). Namely, signals MSF0 to MSF2 are each 0, and therefore, the output Y of the decoder 119 will be 1 due to NAND logic. Accordingly, the selector 113 selects the input B is response to "1" of the output Y (the selection signal SEL) of the decoder 119. Before this, the decoder 119 has provided the selector 113 with "0" for the subframe SF8 (the last subframe) in a preceding frame. Due to this "0", the selector 113 has selected the input A (the output of the A/D converter 112), which has been temporarily stored in the latch 114.

The output Q (255 at present) of the latch 114 and the output Q (the number of sustain discharge cycles) of the counter 116 are simultaneously provided to the inputs A and B of the comparator 117, respectively, and compared with each other. Once sustain discharge is repeated 256 times, the counter 116 provides "255" so that A=B in the comparator 117, which then activates the output Y.

In response to the activated output Y of the comparator 117, the counter 118 is incremented by one. As a result, the subframe SF1 is complete, and the next subframe SF2 is started. The latch 114 holds a new value. When the subframe SF1 is started, the output Y of the decoder 119 is changed to "1", and the selector 113 selects the input B, i.e., the output Q f the latch 114 halved by the divider 115. Accordingly, the latch 114 holds "127" obtained by halving "255".

When sustain discharge is repeated 128 times in the subframe SF2, the next subframe SF3 is started. After all subframes SF1 to SF8 are complete, the operations are stopped until the next frame is started in response to the vertical synchronous signal VSYN.

To adjust luminance, the volume unit 111 is controlled to change an analog voltage value provided to the A/D converter 112.

According to the luminance adjusting method of the present invention, there will be one or a plurality of subframes involving no sustain discharge after the decrease of luminance. In this case, the number of sustain discharge cycles ins zeroed sequentially from a subframe involving a smaller number of sustain discharge cycles.

If the number of sustain discharge cycles is zeroed in a subframe, the addressing period of the subframe will be entirely useless because no sustain discharge nor emission display operation are carried out even if cells are selected by addressing discharge in the subframe. In spite of this, the conventional driving method employing the addressing method explained above turns ON all cells and then carries out erase discharge to extinguish cells to be turned OFF. Accordingly, even the cells to be turned OFF will slightly emit light (so-called "back-ground emission") during the addressing period, to deteriorate contrast. When display luminance is increased, the background emission will not cause a big problem in the contrast because there is a large difference between the display luminance and the background luminance. When the display luminance is decreased, the background luminance may deteriorate the contrast because the background luminance is unchanged with respect to the decreased display luminance. This results in deteriorating the quality of an image displayed.

To solve this problem, the present invention does not carry out the operation (the display data rewriting operation) to be carried out during the addressing period in a subframe that carries out no sustain discharge.

The number of sustain discharge cycles of the next subframe is obtainable during the present subframe. Namely, if the output Y of the selector 3 is zero in a subframe "N", the number of sustain discharge cycles in a subframe "N+1" will be one. Accordingly, the numbers of sustain discharge cycles of subframes following the subframe "N+1" are each zero, so that these subframes do not require the addressing operation.

To realize this sort of control, the present invention of FIGS. 52 and 53 employs the decoder 120, which computes an OR logic of an 8-bit input (bits A0 to A7), i.e., the value (the output Y of the selector 113) that determines the number of sustain discharge cycles of the next subframe. If this value becomes zero, the latch 121 holds the value when the next subframe is started, and the output Q of the latch 121 provides the disable signal D-ENA for disabling a high-voltage drive waveform. In the following subframes, the output Q of the latch 114, the output Y of the divider 115, the output Y of the selector 113, and the output Y of the decoder 120 are zeroed, so that the high-voltage drive waveform is continuously disabled. In the subframe SF1 of the next frame, the disabled state is canceled.

Stopping high-voltage pulses in subframes which do not carry out sustain discharge eliminates useless power consumption, to thereby drive the PDP with less power. Since the total write operation is not carried out in these subframes, contrast is not deteriorated, and a quality image is displayed with high contrast even under low luminance.

As explained above, the present invention drives a display panel with use of separate addressing and sustain emission (discharge) periods to display a full color image with multiple intensity levels and adjust luminance in multiple levels.

The present invention of FIGS. 52 and 53 decreases the luminance of the display panel without increasing reactive power and drives the display panel with low power depending on the luminance. If the present invention is applied for an AC PDP involving a total write operation, it improves contrast under low luminance.

Further, to clarify the characteristics of the method of adjusting the luminance of an AC PDP according to the present invention, some conventional methods (prior arts) of adjusting the luminance of AC PDP will be briefly described with reference to FIGS. 54 to 61 mentioned below.

FIG. 54 is a timing chart showing an example of a conventional method of driving a monochrome PDP that does not adjust luminance.

In the figure, "W" is a write cycle in which write discharge may be carried out, "S" is a sustain discharge cycle for turning ON cells that have been written during the write cycle W, and "S" is a sustain discharge cycle for turning ON cells that have been written during a write cycle in a preceding frame.

Each frame involves a write discharge, a sustain discharge, and an erase discharge. When achieving the maximum luminance, the erase discharge is not carried out, and only a rewriting operation is carried out according to new data in a write cycle of the next frame.

There are two methods to reduce the maximum luminance. One achieves a predetermined number of sustain discharge cycles and then an erase discharge cycle by inserting an erase pulse, to stop the sustain discharge. The other periodically thins out sustain discharge cycles.

Figure 55:
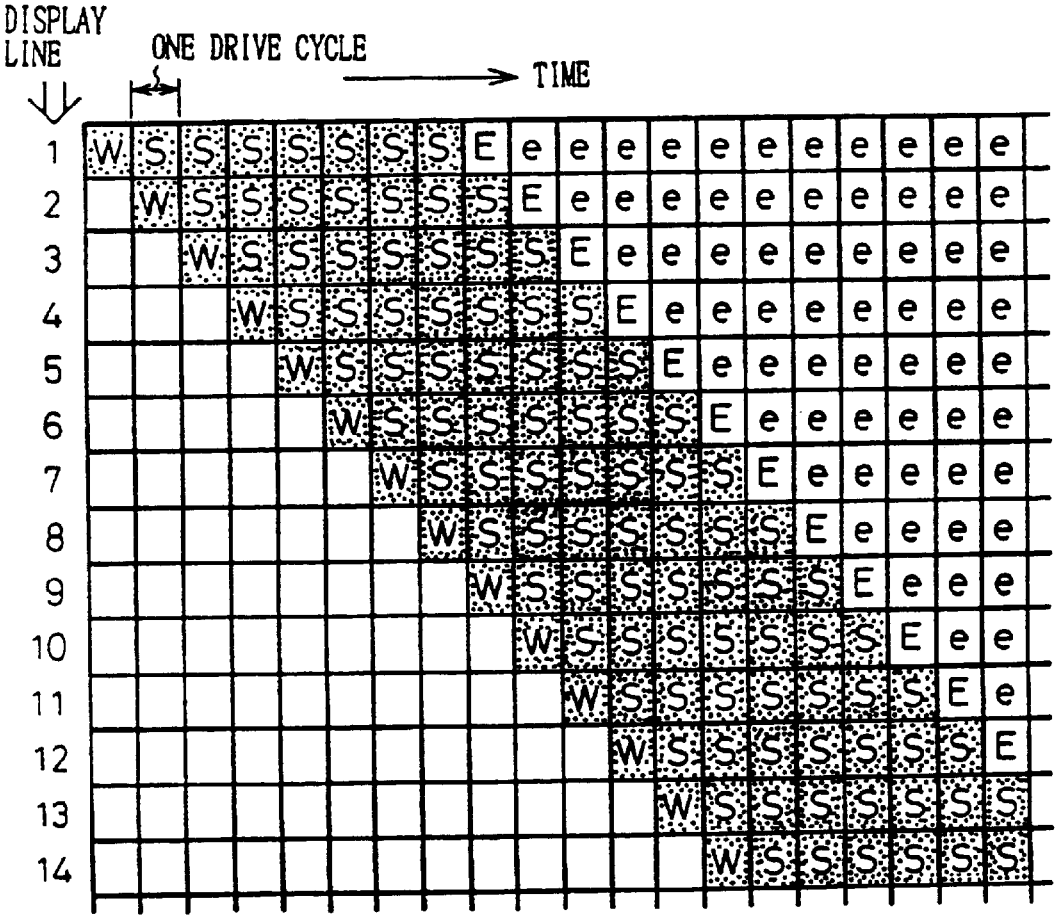
Fig. 55 PRIOR ART
FIG. 55 is a timing chart explaining a conventional method of driving a PDP with the luminance thereof being adjusted by erase discharge.
Figure 56:
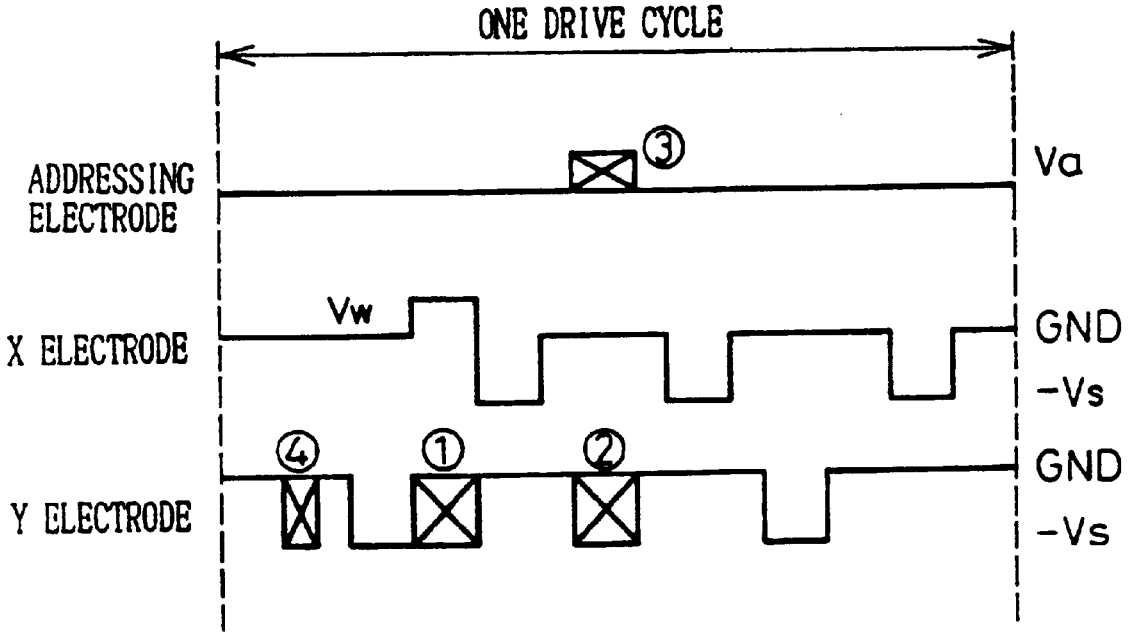
Fig. 56 PRIOR ART
FIG. 56 is a view showing drive waveforms of the method of FIG. 55.

FIG. 55 is a timing chart showing an example of the former method (the erase pulse inserting method), and FIG. 56 shows drive waveforms of FIG. 55.

In FIG. 55, rewrite cycles W and sustain discharge cycles S are the same as those of FIG. 54. "E" is an erase discharge cycle for applying an erase pulse, and "e" is a sustain discharge cycle. In the cycle e, a cell is not turned ON (kept OFF) because it has been extinguished in the preceding erase cycle. In FIG. 56, a write pulse (1) is applied to a Y-electrode to carry out write discharge in all cells of a corresponding line. Selective erase pulses (2) and (3) are applied to the Y-electrode and A-electrodes. Cells selected by the pulse (3) are extinguished. The pulses (1) to (3) are applied during the cycle W. An erase pulse (4) is applied during the cycle E.

Figure 57:
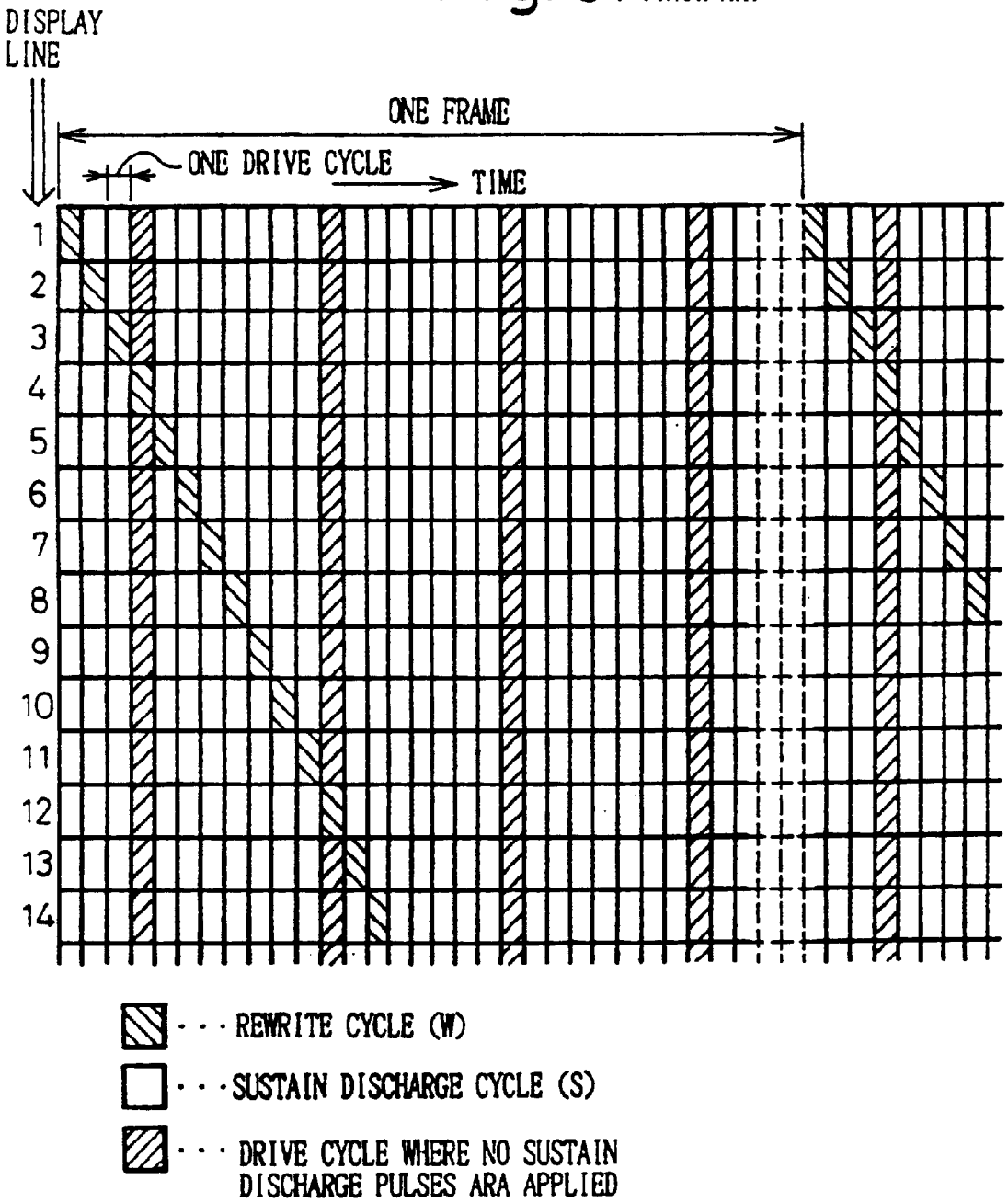
Fig. 57 PRIOR ART
FIG. 57 is a timing chart for explaining a conventional method of driving a PDP with the luminance thereof being adjusted by thinning out sustain discharge cycles.
Figure 58:
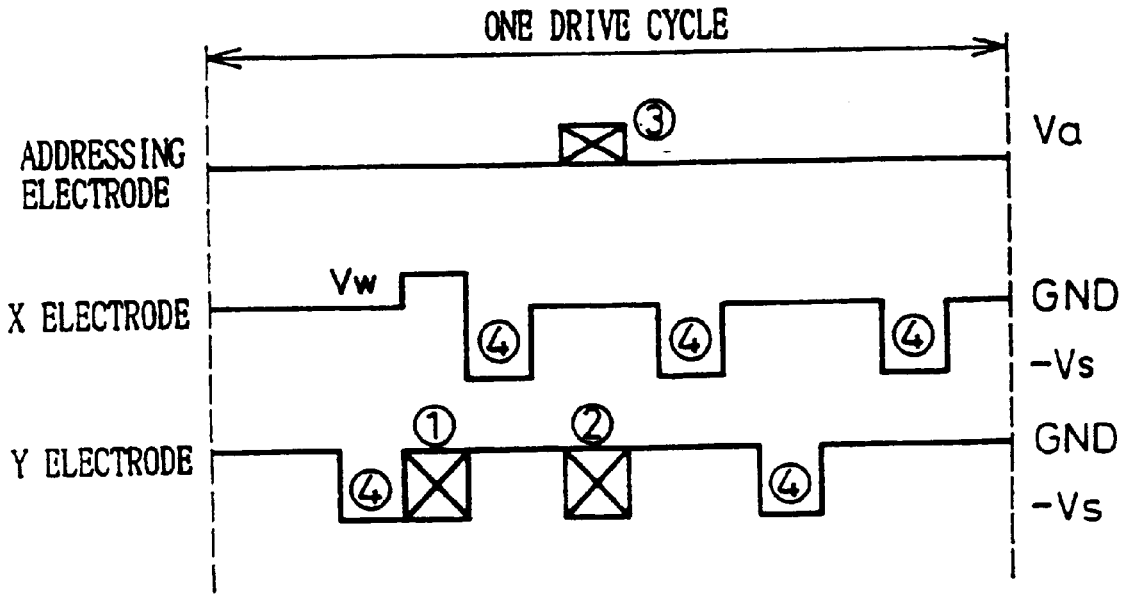
Fig. 58 PRIOR ART
FIG. 58 is a view showing drive waveforms of the method of FIG. 57.

According to this method, an emission period is equal to a sustain discharge period that starts with a write pulse and ends with an erase pulse. Namely, luminance is controllable depending on a position where the erase pulse is inserted after the write cycle. FIG. 57 is a timing chart showing an example of the latter method (the sustain discharge thinning method), and FIG. 58 shows drive waveforms of FIG. 57.

In FIG. 57, cycles W and S are the same as those of FIGS. 54 and 55. If a cycle for applying no sustain discharge pulses coincides with a cycle W, only a re-writing operation is carried out therein. In FIG. 58, pulses (1) to (3) are the same as those of FIG. 56. Sustain discharge pulses (4) are not applied in the sustain discharge pulse thinned cycles shown in FIG. 57.

If thinning intervals according to this method are eight cycles, the luminance is adjustable in eight levels.

The above two known methods are widely used for adjusting luminance in AC PDPs.

Luminance adjustment and intensity levels will be explained.

Figure 59:
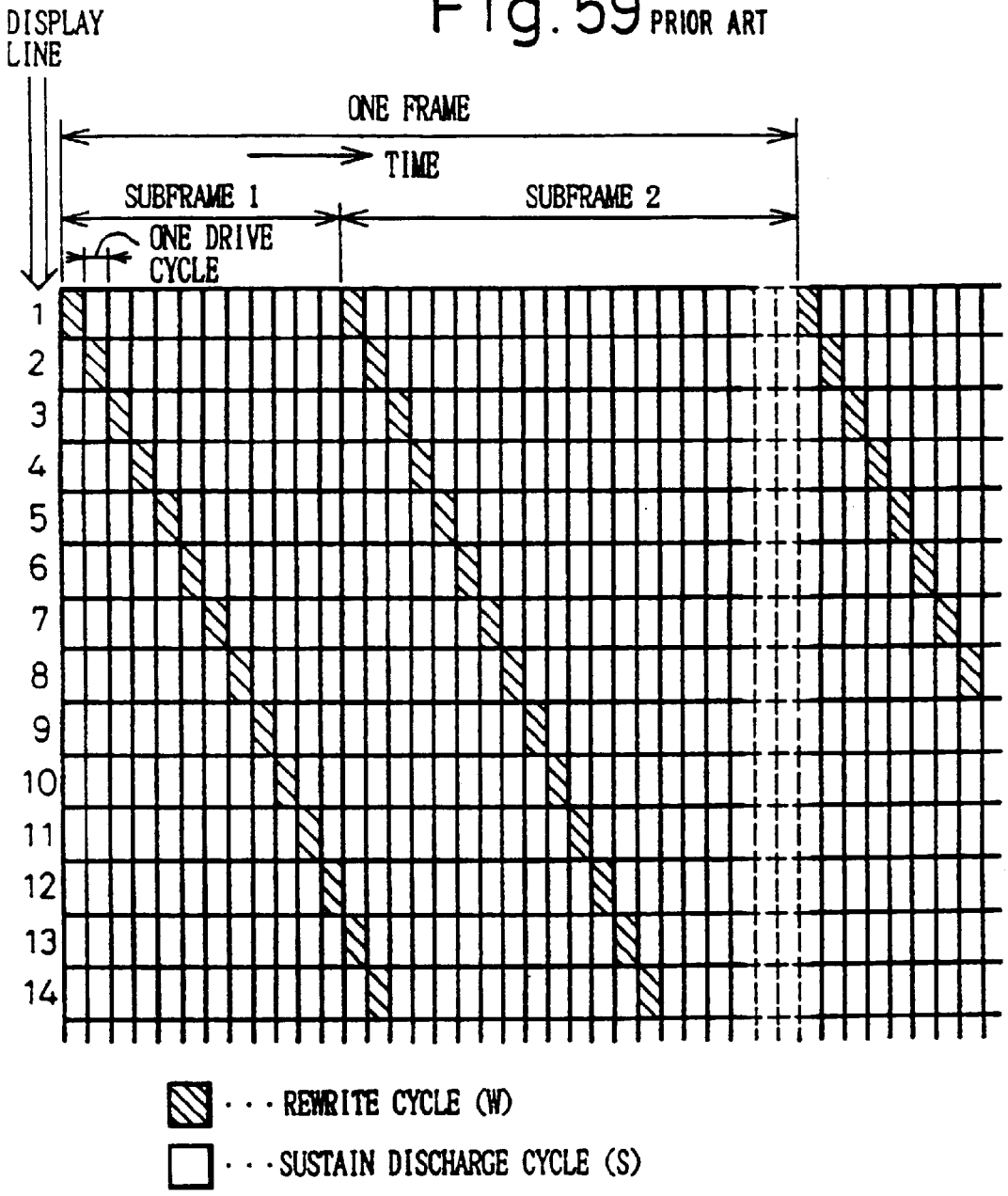
Fig. 59 PRIOR ART
FIG. 59 is a timing chart for explaining a conventional method of driving a PDP involving intensity levels and luminance adjustment.

FIG. 59 is a timing chart showing a method of driving a PDP, which adjusts luminance and displays a plurality (4 to 16) of intensity levels.

In the figure, cycles W and S are the same as those of FIG. 55.

This method selects (addresses) two lines per drive cycle, so that it must apply two selective erase pulses per drive cycle. This means that there is no temporal margin for inserting an erase pulse, and therefore, sustain discharge pulses are thinned out to adjust luminance.

To maintain a ratio of intensity levels, intervals of thinning sustain discharge pulses must be a divisor of the number of drive cycles in a subframe whose weight of luminance is minimum (LSB). For example, if 16 intensity levels are employed and if a frame comprises 480 drive cycles (the frequency of a horizontal synchronous signal), a ratio of drive cycles of subframe will be 1:2:4:8. Namely, the subframe involve 32, 64, 128, and 256 drive cycles, respectively. In this case, luminance is adjustable in 32 levels because the minimum (LSB) subfield involves 32 cycles.

For displaying an image with full colors, each color must involve 64 to 256 intensity levels. This is not achievable by the conventional multiple addressing method of FIG. 59. Accordingly, the applicant of the present invention has proposed a panel driving method, which controls intensity levels with use of separate addressing and sustain emission (discharge) periods (Japanese Unexamined Patent Publication (KOKAI) No. 4-195188).

Figure 60:
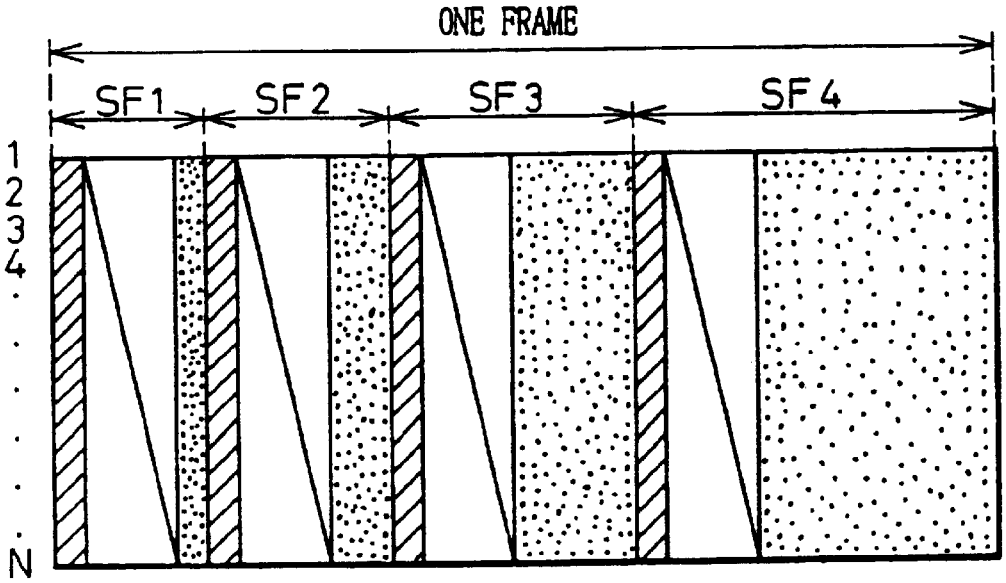
Fig. 60 PRIOR ART
FIG. 60 is a timing chart explaining a conventional method of driving a PDP realizing intensity levels with use of separate addressing and sustain discharge periods.
Figure 61:
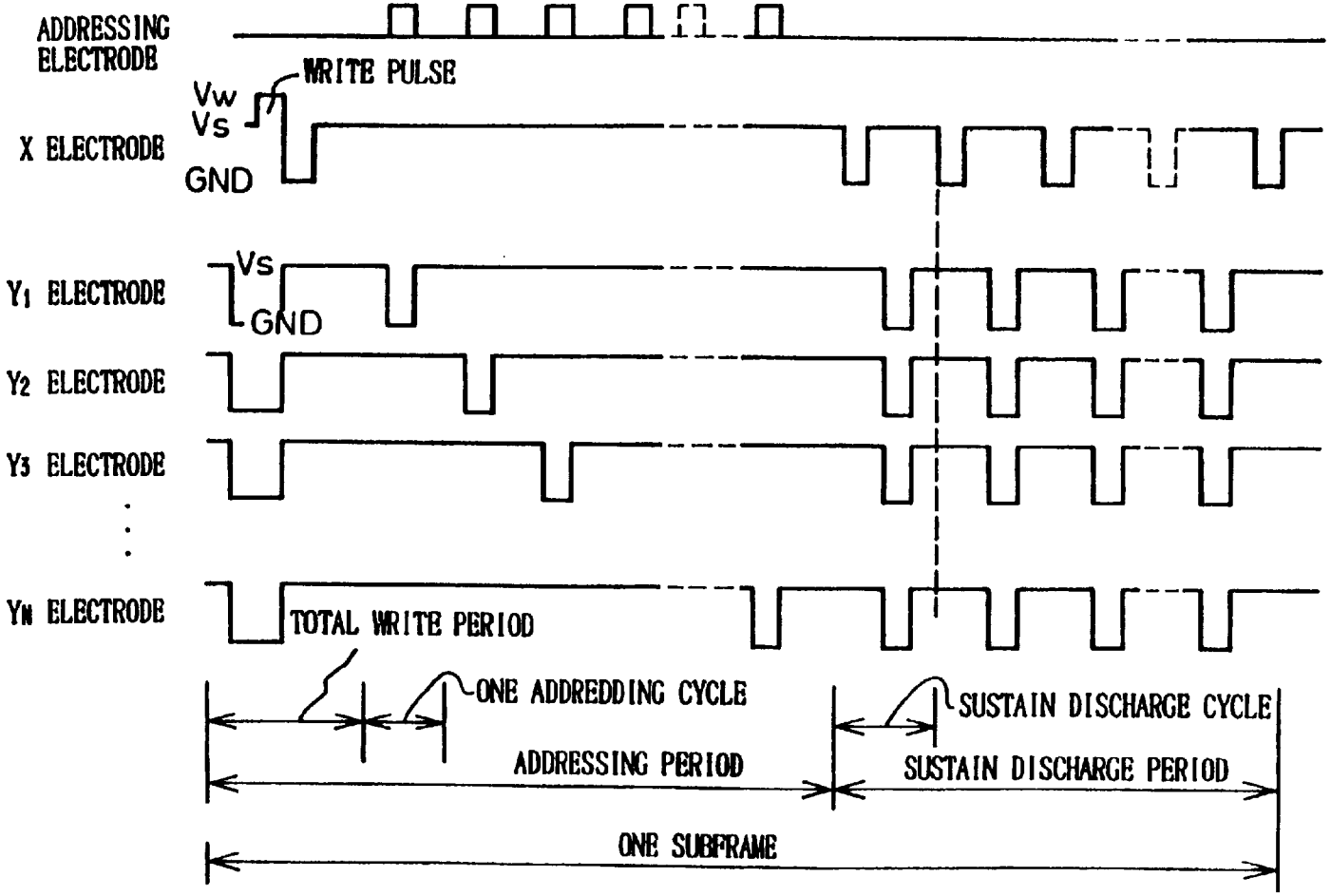
Fig.61 PRIOR ART
FIG. 61 is a view showing drive waveforms of the method of FIG. 60.

FIG. 60 is a timing chart showing this proposal, and FIG. 61 shows driving waveforms of the proposal.

In FIG. 60, subframes SF1 to SF4 are temporally separated from one another over a full image plane. Each of the subframes involves an addressing period for rewriting display data and a sustain emission (discharge) period for carrying out an emission display operation according to the rewritten display data. Reference marks $N_{SF1}$ to $N_{SF4}$ are the numbers of sustain discharge cycles carried out in the subframes SF1 to SF4, respectively. In this example, $N_{SF1}:N_{SF2}:N_{SF3}:N_{SF4}=1:2:4:8$.

In FIG. 61, a total write operation is carried out at first. Therefore, lines are sequentially selected one by one, and erase discharge is selectively carried out in cells not to be turned ON of the selected line according to display data. After the selective erase discharge is carried out in every line, sustain discharge is carried out. The numbers of sustain discharge cycles of the subframes differ from one another. If there are 256 intensity levels, a ratio of the sustain discharge cycles of the subframes will be 1:2:4:8:16:64:128.

The number of sustain discharge cycles per frame is usually about 500. If the frequency of frames is 60 Hz, the frequency of sustain discharge cycles is 30 KHz.

Instead of changing the numbers of sustain discharge cycles in the subframes to adjust luminance, there is a method of changing the level of an input signal (display data). Parallel display panels such as PDPs mostly employ digital control. Accordingly, an analog input signal (display data) is converted into a digital signal, which is supplied to a control circuit. In this case, luminance is adjustable by controlling the amplitude of the analog data just before the AD conversion. Alternatively, the digital data after the AD conversion may be multiplied by 0 to 100%, to control the level of the signal.

In any case of the conventional methods for adjusting luminance as shown in FIGS. 54 to 61, a function that luminance of each subframe can be controlled substantially linearly is not provided, utilizing the wall charges accumulated over addressing electrodes. Therefore, in the conventional method not utilizing a process of accumulating wall charges in advance of selective write discharge, it is difficult for luminance to be accurately adjusted.

In the case where the adjusting of luminance with multiple intensity levels is carried out, if each color involves 256 intensity levels, 16.76 million colors will be displayable. It is said that human eyes discriminate 10 million colors in the best environment. This is why a high-definition television needs 256 intensity levels. 128 intensity levels are insufficient because they provide only 2 million colors.

When luminance is lowered, it is not necessary to provide 16.76 million colors (=256 intensity levels), because the discrimination capacity of human eyes is far less than 10 million colors under the low luminance.

Taking this into account, 128 intensity levels will be sufficient under 50% luminance with respect to the 256 intensity levels for the maximum luminance. If the luminance is far lower, for example 10% of the maximum luminance, 16 intensity levels (=4096 colors) will do.

These facts provide an idea of controlling luminance in multiple levels.

As explained above, according to the present invention, it is possible for the wall charges that work effectively on a selective write discharge to be accumulated over address electrode before the selective write discharge is executed in a display panel such as an AC PDP. Therefore, the voltage of addressing pulse can be reduced and a write error in displaying data due to an erase error can be prevented. As a means for realizing process of accumulating wall charges, a write discharge for all cells and a erase discharge for all cells are executed.

Further, the present invention carries out a write discharge and then an erase discharge in all cells of a selected display line, to equalize these cells before writing display data thereto. The sequential line driving method according to the present invention, therefore, prevent a write error in displaying data and displays a quality image.

Further, the present invention carries out the write discharge and then the erase discharge in all cells of selected plural display lines, to equalize these cells before writing display data thereto. The sequential multiple line driving method according to the present invention, therefore, prevents a write error and displays a quality image.

Further, the present invention carries out the write discharge and then the erase discharge in all cells of all display lines, to equalize these cells before writing display data thereto. The separately addressing and sustain discharging method according to the present invention, therefore, prevents a write error and displays a quality image.

Further, the present invention carries out the write discharge and then the erase discharge in all cells of all display lines, to equalize these cells before writing display data thereto. The separately addressing and sustain-discharging method according to the fourth invention, therefore, prevents a write error and displays a quality image. The present invention sequentially selects the display lines one by one, carries out write discharge in cells to be turned ON of the selected display line with use of the Y and addressing electrodes, to thereby write display data to the selected display line, and immediately applies a sustain discharge pulse to the X electrode, to carry out the sustain discharge for stabilizing wall charges and maintaining the stabilized wall charges up to a sustain discharge period.

Further, the present invention groups the display lines into a plurality of blocks and connects X electrodes together in each of the blocks. This PDP is driven by, for example, the driving method of the present invention, to avoid a write error, display a quality image, and stabilize wall charges up to a sustain discharge period. The arrangement of the present invention helps reducing the power consumption of sustain discharge pulses for stabilizing wall charge during an addressing period. Namely, the present invention applies, during an addressing period in which display data are written, sustain discharge pulses for stabilizing wall charges only to the X electrode of the block that includes a display line to which the display data is written but not to the X electrodes of blocks that do not include the display line to which the data is written.

Further, the present invention sets a voltage applied to the second electrodes of unselected lines to be lower than the potential of a sustain discharge pulse, or equal to an addressing voltage, to thereby decrease an effective voltage applied to a discharge space between adjacent Y electrodes lower than a discharge start voltage and avoid abnormal discharge between the adjacent Y electrodes.

Further, in the case where the present invention is applied to the adjusting of luminance, the present invention drives a display panel with use of separate addressing and sustain discharge periods to display a full color image with multiple intensity levels and to adjust luminance in multiple levels with high accuracy.

The above arrangement increases or decreases the numbers of sustain emission operations in the respective subframes at the same ratio, to digitally control in multiple levels, the luminance of a display plane involving, for example, 64 to 256 intensity levels, to thereby realize a display comparable to a CRT.

Further, the present invention may additionally employ means for stopping original operations (for example, high-voltage pulse applying operations) in subframes that do not require sustain discharge, to eliminate wasteful power consumption. Therefore, it becomes possible to drive the display unit with remarkly low power, by means of the effect of accumulating the wall charges. Further, in a subframe in which sustain discharge is executed, a write discharge for all cells and an erase discharge for all cells are also not executed. Therefore, the number of discharge in a background can be reduced. Consequently, the deterioration of the contrast in display panel can be prevented, and it is also possible for a display panel with high contrast to be realized even at the time of low luminance.

I claim:

1. A method for driving a display panel having a first substrate, at least one display line involving first electrodes and second electrodes disposed in parallel with each other on said first substrate, a second substrate facing said first substrate, and third electrodes disposed on said second substrate and extending orthogonally to said first and second electrodes, in which a display by means of a light emission and write operation of display data are executed by carrying out a write discharge utilizing a memory function for cells of said at least one display line and by carrying out a sustain discharge for sustaining said write discharge, wherein said method includes:

a step of executing a write discharge for all cells of at least one display line selected by either one of said first and second electrodes and by said third electrode with use of said first and second electrodes; and a step of executing an erase discharge for all cells of said selected display line with use of said first and second electrodes, said two steps being adapted to be carried out before said write discharge utilizing said memory function is executed.

2. A method as set forth in claim 1, wherein said display panel is composed of a set of display elements having a memory function, in which a frame that forms an image plane is made of a plurality of subframes, each of said subframes provides different luminance and includes an addressing period for rewriting display data and a sustain emission period for repeating an emission display operation according to said rewritten data, and the addressing and sustain emission periods are temporally separated from each other over said display elements, to provide said display elements with intensity levels and enable the adjustment of luminance of said image plane, wherein said method is adapted to increase or decrease the numbers of sustain emission operations of the respective subframes at the same ratio, thereby controlling the luminance of said image plane.

3. A method as set forth in claim 2, wherein, when providing the display elements with intensity levels, the number of sustain emission operations of a given subframe is determined according to the number of sustain emission operations of another subframe whose weight of luminance is one rank heavier than that of the given subframe, namely, the number of sustain emission operations of a subframe whose weight of luminance is the heaviest among the subframes is determined at first, and according to this number, the number of sustain emission operations of another subframe whose weight of luminance is the second heaviest among the subframes is determined, and so on.

4. A method as set forth in claim 3, wherein the number of sustain emission operations of a given subframe is set to be half of that of another subframe whose weight of luminance is one rank heavier than that of the given subframe.

5. A method as set forth in claim 4, wherein fractions, if any, are rounded up or discarded when halving the number of sustain emission operations of a subframe whose weight of luminance is one rank heavier than that of a given subframe.

6. A method as set forth in claim 1, wherein said display panel is constituted by an alternating current plasma display panel in which the memory function of each cell can be realized by wall charges accumulated by means of a write discharge.

7. A method as set forth in claim 2, wherein said display panel is constituted by an alternating current plasma display panel in which the memory function of each cell can be realized by wall charges accumulated by means of a write discharge.

8. A method for driving a display panel which is constituted by an alternating current plasma display panel having a first substrate, at least one display line involving first electrodes and second electrodes disposed in parallel with each other on said first substrate, a second substrate facing said first substrate, and third electrodes disposed on said second substrate and extending orthogonally to said first and second electrodes, in which a display by means of a light emission and write operation of display data are executed by carrying out a write discharge utilizing a memory function for cells of said at least one display line and by carrying out a sustain discharge for sustaining said write discharge, said memory function being realized by wall charges accumulated by means of said write discharge, wherein said method includes:

a step of executing a write discharge for all cells of at least one display line selected by either one of first and second electrodes and by the third electrode with use of the first and second electrodes; and a step of executing an erase discharge for all cells of said selected display line with use of said first and second electrodes, said two steps being adapted to be carried out before said write discharge utilizing said memory function is executed, and adapted to accumulate wall charges working effectively for said write discharge over at least said third electrodes in advance.

9. A method as set forth in claim 8, wherein said first electrodes are connected all together, and said second electrodes disposed in the respective display lines are independent of one another, said method comprising:

sequentially selecting said display lines one by one, carrying out a write discharge in all cells of the selected display line with use of the first and second electrodes, carrying out or not carrying out a sustain discharge, applying an erase pulse to said second or first electrode of said selected display line, to carry out an erase discharge in all cells of the selected display line, and carrying out a write discharge in cells to be turned ON of said selected display line with use of said second and third electrodes, to thereby write said display data to said selected display line.

10. A method as set forth in claim 8, wherein said first electrodes are connected all together, and said second electrodes disposed in the respective display lines are independent of one another, said method comprising:

sequentially selecting a plurality of the display lines, carrying out a write discharge in all cells of said selected display lines with use of said first and second electrodes, carrying out or not carrying out a sustain discharge, applying an erase pulse to said second or first electrodes of said selected display lines, to carry out an erase discharge in all cells of said selected display lines, and carrying out a write discharge in cells to be turned ON of said selected display lines with use of said second and third electrodes, to thereby write said display data to said selected display lines.

11. A method as set forth in claim 8, wherein said first electrodes are connected all together, and said second electrodes disposed in the respective display lines are independent of one another, said method comprising:

carrying out a write discharge in all cells of all of said display lines with use of said first and second electrodes, carrying out or not carrying out a sustain discharge, applying an erase pulse to said second or first electrode of every display line, to carry out an erase discharge in all cells of all of said display lines, sequentially selecting said display lines one by one, carrying out a write discharge in cells to be turned ON of said selected display line with use of said second and third electrodes, to thereby write said display data to said selected display line, and after said display data are written to all of said display lines, carrying out a sustain discharge in said cells turned ON of all of said display lines with use of said first and second electrodes.

12. A method as set forth in claim 8, wherein said first electrodes are connected all together, the second electrodes disposed in the respective display lines are independent of one another, said method comprising:

carrying out a write discharge in all cells of all of said display lines with use of said first and second electrodes, carrying out or not carrying out a sustain discharge, applying an erase pulse to said second or first electrode of every display line, to carry out an erase discharge in all cells of all of said display lines, sequentially selecting said display lines one by one, carrying out a write discharge in cells to be turned ON of said selected display line with use of said second and third electrodes, to thereby write said display data to said selected display line, immediately applying a sustain discharge pulse to said first electrode, to carry out a sustain discharge for stabilizing wall charges, and after said display data are written to all of said display lines, carrying out sustain discharge in said cells turned ON of all of said display lines with use of said first and second electrodes.

13. A method as set forth in claim 8, wherein said display lines are grouped into a plurality of blocks, said first electrodes are connected together in each of the blocks, and said second electrodes disposed in the respective display lines are independent of one another.

14. A method as set forth in claim 8, wherein said display lines are grouped into a plurality of blocks, said first electrodes are connected together in each of the blocks, and said second electrodes disposed in the respective display lines are independent of one another, said method comprising:

carrying out a write discharge in all cells of all of said display lines with use of said first and second electrodes, carrying out or not carrying out a sustain discharge, applying an erase pulse to said second or first electrode of every display line, to carry out an erase discharge in all cells of all of said display lines, sequentially selecting said display lines one by one, carrying out a write discharge in cells to be turned ON of said selected display line with use of said second and third electrodes, to thereby write said display data to said selected display line, immediately applying a sustain discharge pulse to said first electrode of the block that contains said cells just turned ON, to carry out a sustain discharge for stabilizing wall charges, and after display data are written to all of said display lines, carrying out a sustain discharge in said cells turned ON of all of said display lines with use of said first and second electrodes.

15. A method as set forth in claim 8, wherein said display panel has a plurality of second electrodes that are sequentially selected and driven line by line and first electrodes that are driven by a single driver circuit and are disposed between every two adjacent ones of said second electrodes, and method comprising:

setting a voltage applied to said second electrodes of unselected lines to be lower than the potential of a sustain discharge pulse for executing said sustain discharge, or equal to an addressing voltage for executing said write discharge *when the write operation of display data is executed by carrying out the write discharge* utilizing said memory function.

16. A method as set forth in claim 9, wherein an erase discharge is carried out with use of said first and second electrodes, just before said write discharge for all cells is executed.

17. A method as set forth in claim 10, wherein an erase discharge is carried out with use of said first and second electrodes, just before said write discharge for all cells is executed.

18. A method as set forth in claim 11, wherein an erase discharge is carried out with use of said first and second electrodes, just before said write discharge for all cells is executed.

19. A method as set forth in claim 12, wherein an erase discharge is carried out with use of said first and second electrodes, just before said write discharge for all cells is executed.

20. A method as set forth in claim 14, wherein an erase discharge is carried out with use of said first and second electrodes, just before said write discharge for all cells is executed.

21. A method as set forth in claim 9, wherein a sustain discharge is carried out by applying a narrow pulse such that an erase discharge is not executed, immediately after said write discharge for all cells is executed.

22. A method as set forth in claim 10, wherein a sustain discharge is carried out by applying a narrow pulse such that an erase discharge is not executed, immediately after said write discharge for all cells is executed.

23. A method as set forth in claim 11, wherein a sustain discharge is carried out by applying a narrow pulse such that an erase discharge is not executed, immediately after said write discharge for all cells is executed.

24. A method as set forth in claim 12, wherein a sustain discharge is carried out by applying a narrow pulse such that an erase discharge is not executed, immediately after said write discharge for all cells is executed.

25. A method as set forth in claim 14, wherein a sustain discharge is carried out by applying a narrow pulse such that an erase discharge is not executed, immediately after said write discharge for all cells is executed.

26. An apparatus for driving a display panel having a first substrate, at least one display line involving first electrodes and second electrodes disposed in parallel with each other on said first substrate, a second substrate facing said first substrate, and third electrodes disposed on said second substrate and extending orthogonally to said first and second electrodes, in which a display by means of a light emission and write operation of display data are executed by carrying out a write discharge utilizing a memory function for cells of said at least one display line and by carrying out a sustain discharge for sustaining said write discharge, wherein said apparatus comprises:

driving means which supplies a plurality of driving voltage pulses for executing write operation of said display data for said first, second and third electrodes; and control means which controls a sequence of supplying these plurality of driving voltage pulses, and wherein said control means is operative to apply a write pulse for executing a write discharge for all cells of at least one display line selected by either one of said first and second electrodes and by said third electrode with use of said first and second electrodes, and to apply an erase pulse for executing an erase discharge for all cells of said selected display line with use of said first and second electrodes, before said write discharge utilizing said memory function is carried out.

27. An apparatus as set forth in claim 26, wherein said apparatus is composed of a set of display elements having a memory function, in which a frame that forms an image plane is made of a plurality of subframes, each of the subframes provides different luminance and includes an addressing period for rewriting display data and a sustain emission period for repeating an emission display operation according to said rewritten data, and said addressing and sustain emission periods are temporally separated from each other over said display elements, to provide said display elements with intensity levels and enable the adjustment of luminance of said image plane, sand wherein said apparatus further comprises:

first means for determining the number of sustain emission operations of a subframe whose weight of luminance is the heaviest among the subframes; and second means for determining, according to the above determined number, the number of sustain emission operations of a subframe whose weight of luminance is the next heaviest among said subframes.

28. An apparatus as set forth in claim 27, wherein said apparatus further comprises means for stopping operations carried out in a subframe, if the number of sustain emission operations to be carried out in this subframe is zero as a result of luminance adjustment carried out by said first and second means.

29. An apparatus as set forth in claim 28, wherein said apparatus further comprises:

means for holding data according to which the number of sustain discharge operations of the next subframe is determined;

means for counting the number of sustain discharge operations carried out in the present subframe;

means for comparing said counted value with said held data; and means for providing an instruction to start the next subframe if the comparison means indicates agreement.

30. An apparatus as set forth in claim 27, wherein said first means has means for optionally setting the number of sustain emission operations of a subframe whose weight of luminance is the heaviest.

31. An apparatus as set forth in claim 26, wherein said display panel is an alternating current plasma display panel, and the memory function of each cell of said display panel is achieved by wall charges accumulated by a write discharge.

32. An apparatus as set forth in claim 27, wherein said display panel is an alternating current plasma display panel, and the memory function of each cell of said display panel is achieved by wall charges accumulated by a write discharge.

33. An apparatus for driving a display panel which is constituted by an alternating current plasma display panel having a first substrate, at least one display line involving first electrodes and second electrodes disposed in parallel with each other on said first substrate, a second substrate facing said first substrate, and third electrodes disposed on said second substrate and extending orthogonally to said first and second electrodes, in which a display by means of a light emission and write operation of display data are executed by carrying out a write discharge utilizing a memory function for cells of said at least one display line and by carrying out a sustain discharge for sustaining said write discharge, said memory function being realized by wall charges accumulated by means of a write discharge, wherein said apparatus comprises:

driving means which supplies a plurality of driving voltage pulses for executing write operation of said display data for said first, second and third electrodes; and control means which controls a sequence of supplying these plurality of driving voltage pulses, wherein said control means is operative to apply a write pulse for executing a write discharge for all cells of at least one display line selected by either one of said first and second electrodes and by said third electrode with use of said first and second electrodes, and to apply an erase pulse for executing an erase discharge for all cells of said selected display line with use of said first and second electrodes, before said write discharge utilizing said memory function is carried out, so that wall charges working effectively for said write discharge are accumulated over at least said third electrodes in advance.

34. An apparatus as set forth in claim 33, wherein said control means is operative to sequentially select the display lines one by one, to apply a write pulse for carrying out a write discharge in all cells of said selected display line with use of said first and second electrodes, to apply a sustain discharge pulse selectively for carrying out a sustain discharge, to apply an erase pulse to said second or first electrode of said selected display line, to apply an erase pulse for carrying out an erase discharge in all cells of the selected display line, and to carry out a write discharge in cells to be turned ON of said selected display line with use of said second and third electrodes, to thereby write display data to said selected display line, by means of said driving means.

35. An apparatus as set forth in claim 33, wherein said control means is operative to sequentially select a plurality of the display lines, to apply a write pulse for carrying out a write discharge in all cells of said selected display lines with use of said first and second electrodes, to apply a sustain pulse selectively for carrying out a sustain discharge, to apply an erase pulse to said second or first electrodes of said selected display lines, apply an erase pulse for to carrying out an erase discharge in all cells of said selected display lines, and to apply a write pulse for carrying out a write discharge in cells to be turned ON of the selected display lines with use of said second and third electrodes, to thereby write said display data to said selected display lines, by means of said driving means.

36. An apparatus as set forth in claim 33, wherein said display panel comprises an insulation layer, which separates said third electrode from a discharge space formed between said third electrode and said first and second electrodes, so that said wall charges can be accumulated on said insulation layer.

*37. Apparatus for driving a display panel which is constituted by an alternating current plasma display panel having a first substrate, a plurality of display lines having first electrodes and second electrodes disposed to extend alongside one another on said first substrate, a second substrate facing said first substrate, and third electrodes disposed on said second substrate and crossing said first and*

*second electrodes, in which a write discharge for executing a write operation of display data is carried out for cells of said at least one display line selected by one of said first and second electrodes and by said third electrodes, and a sustain discharge for executing a display of said display data is carried out by utilizing a memory function, said memory function being realized by wall charges accumulated by a write discharge, wherein said apparatus comprises:*

*a plurality of driver circuits which supply plural kinds of driving voltage pulses to said first, second and third electrodes for executing a write operation of said display data by said electrodes; and*

*a sequence controller which controls a sequence of supplying said plural kinds of driving voltage pulses to said electrodes, said sequence controller including a first control circuit for causing said plurality of driver circuits to apply a write pulse across first and second electrodes to execute a write discharge for all cells of a selected display line, and a second circuit for causing said plurality of driver circuits to apply an erase pulse across first and second electrodes for executing an erase discharge for all cells of said selected display line, said sequence controller being operable for causing said plurality of driver circuits to apply said write and erase pulses before said write operation is carried out in cells of said selected display line, so that wall charges working effectively for said write operation are accumulated in advance of said write operation over at least said third electrodes.*

*38. Apparatus as set forth in claim 37,*

*wherein said write discharge for executing said write operation is sequentially carried out for cells of each of a plurality of selected display lines with use of said second and third electrodes for every selected display line one by one, and said write operation of display data is executed, and after said write operation of display data is completed for all the selected display lines, said sustain discharge is carried out for cells of all the selected display lines with use of said first and second electrodes, and*

*wherein said control circuit allows said plurality of driver circuits to apply said write pulse for executing said write discharge for all cells of all display lines with use of said first and second electrodes, to apply or not to apply a sustain discharge pulse selectively for executing said sustain discharge, to apply said erase pulse for executing said erase discharge for all cells corresponding to said second electrodes or said first electrodes on all display lines, to apply said write pulse for carrying out said write operation for cells of each of said selected display lines with use of said second and third electrodes for every selected display lines one by one, and to apply said sustain discharge for cells of all display lines with use of said first and second electrodes.*

*39. A method for driving an alternating current plasma display panel having a first substrate, a plurality of display lines, each of which display lines comprises a first electrode and a second electrode disposed to extend alongside one another on said first substrate, a second substrate facing said substrate, and a plurality of third electrodes disposed on said second substrate so as to extend across said first and second electrodes, said display lines each including a plurality of cells formed at respective areas where a corresponding third electrode crosses the first and second electrodes of the panel, said method comprising:*

*selecting a display line from said plurality thereof for writing data;*

*choosing a cell of the selected display line;*

*conducting a write discharge for writing data in the chosen cell by conducting an addressing procedure comprising applying a selective write discharge voltage between said corresponding third electrode of the chosen cell and one of said second electrodes;*

*conducting and maintaining a sustain discharge in the chosen cell for displaying data by applying a sustain discharge voltage between said first electrode and said second electrode; and*

*applying a predetermined voltage to a second electrode of a display line which has not been selected for writing data during said addressing procedure such that the resulting potential difference between said second electrode of a display line which has not been selected for writing data and a second electrode of a display line which has been selected for writing data is less than the potential difference brought about between said first and second electrodes for executing said sustain discharge, or equal to a voltage applied to each of said third electrodes for executing said selective write discharge.*

*40. An apparatus for driving a display panel which is constituted by an alternating current plasma display panel having a first substrate, a plurality of display lines, each including first and second electrodes disposed to extend alongside one another on said first substrate, a second substrate facing said first substrate, and a plurality of third electrodes disposed on said second substrate so as to cross said first and second electrodes, said display lines each including a plurality of cells formed at respective areas where a third electrode crosses first and second electrodes, in which apparatus a write discharge for executing a write operation of display data brought about using a selected third electrode and one of said second electrodes is carried out for selected cells of at least one display line selected by one of said second electrodes and by said third electrodes, and a sustain discharge for executing a display of said display data is carried out utilizing a memory function, wherein said apparatus comprises:*

*a plurality of selection circuits which are respectively connected to second electrodes, and which supply second electrodes corresponding to said selected cells of said at least one display line with a write pulse for executing said write discharge; and*

*a common driver circuit connected to said selection circuits, and which supplies said second electrodes corresponding to said selected cells with a sustain discharge pulse for executing said sustain discharge,*

*wherein a voltage applied between a second electrode of an unselected display line and a second electrode of a selected display line during said write operation is set at a level that is lower than a voltage applied between first and second electrodes for executing said sustain discharge, or is equal to a potential applied to said third electrodes for executing a write discharge.*

*41. An apparatus as set forth in claim 40, wherein at least one of said selection circuits includes a pair of switching elements connected in a push-pull form, respectively.*

*42. An apparatus as set forth in claim 40, wherein each of said selection circuits includes a pair of switching elements connected in a push-pull form, respectively.*

*43. An apparatus as set forth in claim 40, wherein said driver circuit includes a pair of switching elements connected in a push-pull form, respectively.*

*44. An apparatus as set forth in claim 41, wherein said driver circuit includes a pair of switching elements connected in a push-pull form, respectively.*

*45. An apparatus as set forth in claim 42, wherein said driver circuit includes a pair of switching elements connected in a push-pull form, respectively.*

*46. An apparatus as set forth in claim 45, wherein said driver circuit is connected to one side of said pair of switching elements in each of said selection circuits.*

*47. An apparatus as set forth in claim 45, wherein a first diode is connected to one side of said pair of switching elements in each of said selection circuits, and wherein a potential applied to each of said second electrodes on said unselected display lines is supplied to each of said second electrodes, via said first diode.*

*48. An apparatus as set forth in claim 46, wherein a first diode is connected to another side of said pair of switching elements in each of said selection circuits, and wherein a potential applied to each of said second electrodes on said unselected display lines is supplied to each of said second electrode, via said first diode.*

*49. An apparatus as set forth in claim 47, wherein each of said selection circuits includes a second diode which is connected in parallel with another side of said pair of switching elements, and wherein said sustain discharge pulse applied to each of said second electrodes is supplied to each of said second electrodes, via said second diode.*

*50. An apparatus as set forth in claim 48, wherein each of said selection circuits includes a second diode which is connected in parallel with said one side of said pair of switching elements, and wherein said sustain discharge pulse applied to each of said second electrodes is supplied to each of said second electrodes, via said second diode.*

*51. A circuit for driving a display panel having a plurality of display lines including respective electrodes, said circuit comprising:*

*a plurality of selection circuits, each including a pair of first switching elements connected in a push-pull form;*

*a driver circuit including a pair of second switching elements connected in a push-pull form, which is connected to one side of said pair of first switching elements and supplies a sustain discharge pulse necessary for a sustain discharge for executing a display of display data on at least one selected display line of said panel to each of said electrodes, via said selection circuits; and*

*a first diode which is connected to another side of said pair of first switching elements, and supplies a given voltage applied to unselected display lines of said panel to each of said electrodes, via said first diode.*

*52. A circuit as set forth in claim 51, wherein each of said selection circuits includes a second diode which is connected in parallel with one side of said pair of first switching elements, and wherein said sustain discharge pulse is supplied to said second diode.*

*53. A method for driving a display panel which is constituted by an alternating current plasma display panel having first electrodes and second electrodes each constituting a pair for carrying out discharge, each pair of said first and second electrodes disposed to extend alongside one another and corresponding to a display line, and third electrodes disposed crossing said first and second electrodes, and cells formed at intersections of said first and second electrodes with said third electrodes, wherein said method includes:*

*sequentially selecting a second electrode corresponding to each display line during an addressing period, and writing display data for said each display line; and*

*repeatedly applying sustain discharge pulses during a sustain discharge period, to maintain a sustain discharge to emit light,*

*wherein a potential difference between a second electrode of each display line which has not been selected and the second electrode of each display line which has been selected during the addressing period, is set to be lower than a difference between a maximum voltage of each of the sustain discharge pulses and a minimum voltage thereof.*

*54. A method for driving a display panel which is constituted by an alternating current plasma display panel having first electrodes and second electrodes each constituting a pair for carrying out discharge, each pair of the first and second electrodes disposed to extend alongside one another and corresponding to a display line, and third electrodes disposed crossing the first and second electrodes, and two first electrodes disposed adjacently and two second electrodes disposed adjacently, and the two adjacent ones of said first electrodes and the two adjacent ones of said second electrodes disposed alternately, wherein said method includes:*

*sequentially selecting a second electrode corresponding to each display line during an addressing period, and writing display data for said each display line; and*

*repeatedly applying sustain discharge pulses during a sustain discharge period, to maintain a sustain discharge to emit light,*

*wherein a potential difference between a second electrode of each display line which has not been selected and the second electrode of each display line which has been selected during the addressing period, is set to be lower than a difference between a maximum voltage of each of the sustain discharge pulses and a minimum voltage thereof.*

*55. A method as set forth in claim 54, wherein the first electrodes are connected all together, and the second electrodes are disposed independent of one another.*

* * * * *